US012254739B2

(12) United States Patent
Shigehito et al.

(10) Patent No.: US 12,254,739 B2
(45) Date of Patent: *Mar. 18, 2025

(54) GAMING SYSTEM, CONTROL METHOD FOR GAMING SYSTEM, AND PROGRAM FOR GAMING MACHINE, FOR PROVIDING A GAME WITH A BONUS OPPORTUNITY

(71) Applicant: Konami Gaming, Inc., Las Vegas, NV (US)

(72) Inventors: Mukasa Shigehito, Zama (JP); Osaki Yukihiro, Zama (JP); Ueki Kyohei, Zama (JP); Tada Ikki, Zama (JP); Tezuka Yoshiaki, Zama (JP); Mizoguchi Masao, Zama (JP); Mizoguchi Toshiyuki, Zama (JP)

(73) Assignee: Konami Gaming, Inc., Las Vegas, NV (US)

( * ) Notice: Subject to any disclaimer, the term of this patent is extended or adjusted under 35 U.S.C. 154(b) by 102 days.

This patent is subject to a terminal disclaimer.

(21) Appl. No.: 17/112,900

(22) Filed: Dec. 4, 2020

(65) Prior Publication Data

US 2021/0350658 A1 Nov. 11, 2021

Related U.S. Application Data

(63) Continuation of application No. 16/409,023, filed on May 10, 2019, now Pat. No. 10,885,738, which is a (Continued)

(51) Int. Cl.
*G07F 17/32* (2006.01)

(52) U.S. Cl.
CPC ...... *G07F 17/3223* (2013.01); *G07F 17/3225* (2013.01); *G07F 17/3262* (2013.01); *G07F 17/3267* (2013.01); *G07F 17/3288* (2013.01)

(58) Field of Classification Search
CPC ............ G07F 17/3223; G07F 17/3225; G07F 17/3262; G07F 17/3267; G07F 17/3288
See application file for complete search history.

(56) References Cited

U.S. PATENT DOCUMENTS 6,210,275 B1 4/2001 Olsen
2001/0016509 A1 8/2001 Kusuda
(Continued)

FOREIGN PATENT DOCUMENTS

CN 1179346 A 4/1998
CN 101927090 A 12/2010
(Continued)

*Primary Examiner* — Robert J Utama
*Assistant Examiner* — Jeffrey K Wong
(74) *Attorney, Agent, or Firm* — Howard & Howard Attorneys PLLC

(57) ABSTRACT

A gaming system provides a center control unit and a plurality of gaming stations. The center control unit is provides a main game to a plurality of players. The center control unit is configured to randomly establish an outcome of the main game from a plurality of potential outcomes. The gaming stations accept a wager on the main game from respective players, receives the outcome of the main game and pays an award to one of the players as a function of the outcome of the main game. The center control unit randomly establishes one of the players as eligible for a bonus game, selects one of the potential outcomes of the main game as a bonus game eligible outcome, and if the bonus game eligible outcome is the outcome of the main game, provides a bonus game to the bonus game eligible player.

20 Claims, 50 Drawing Sheets

Related U.S. Application Data continuation of application No. 15/492,899, filed on Apr. 20, 2017, now Pat. No. 10,332,339.

(60) Provisional application No. 62/336,335, filed on May 13, 2016.

(56) References Cited

U.S. PATENT DOCUMENTS

| | | | | |
|---|---|---|---|---|
| 2004/0072607 | A1 | 4/2004 | Thomas et al. | |
| 2005/0079911 | A1 | 4/2005 | Nakatsu | |
| 2008/0227508 | A1* | 9/2008 | Tomaru | G07F 17/3211 463/6 |
| 2009/0054132 | A1 | 2/2009 | Saito | |
| 2009/0054133 | A1 | 2/2009 | Saito | |
| 2009/0233671 | A1* | 9/2009 | Tsukahara | 463/31 |
| 2011/0117981 | A1* | 5/2011 | Baerlocher | G07F 17/3267 463/16 |
| 2015/0115533 | A1* | 4/2015 | Alvarez | A63K 3/00 273/445 |
| 2015/0262452 | A1 | 9/2015 | Corckran et al. | |
| 2015/0348366 | A1 | 12/2015 | Baerlocher et al. | |
| 2017/0330411 | A1 | 11/2017 | Shigehito et al. | |

FOREIGN PATENT DOCUMENTS

| | | | |
|---|---|---|---|
| JP | 2008-522744 | A | 7/2008 |
| JP | 2009-045314 | A | 3/2009 |
| JP | 2009-045316 | A | 3/2009 |
| JP | 2009-045322 | A | 3/2009 |
| JP | 2009-045349 | A | 3/2009 |

* cited by examiner

FIG. 15
114
110C
100,447.67
Unicorn Power Cup Classic Trial B
LIVE
DEMO
7,387.67
2,447.67
WIN
PLACE
QUINELLA

110E

110F

110G

GAMING SYSTEM, CONTROL METHOD FOR GAMING SYSTEM, AND PROGRAM FOR GAMING MACHINE, FOR PROVIDING A GAME WITH A BONUS OPPORTUNITY

CROSS-REFERENCE TO RELATED APPLICATION

This application is a continuation of U.S. patent application Ser. No. 16/409,023, filed May 10, 2019, which is a continuation of U.S. patent application Ser. No. 15/492,899, filed Apr. 20, 2017 (now U.S. Pat. No. 10,332,339, issued Jun. 25, 2019), which claims the benefit of U.S. Patent Application Ser. No. 62/336,335, filed May 13, 2016, the disclosures of which are hereby incorporated by reference in their entirety.

TECHNICAL FIELD

The present invention relates to a gaming system, a control method for a gaming system, and a program for a gaming system.

SUMMARY OF INVENTION

In one aspect of the present invention, a gaming system is provided. The gaming system includes a center control unit and a plurality of gaming stations. The center control unit is configured to provide a main game to a plurality of players. The main game has a plurality of virtual participants. The center control unit is configured to randomly establish an outcome of the main game from a plurality of potential outcomes. Each gaming station is configured to accept a wager on the main game from a respective one of the plurality of players, to receive the outcome of the main game from the center control unit and pay an award to at least one of the players as a function of the outcome of the main game. The center control unit is further configured to:

- randomly establish one of the players as eligible for a bonus game,
- for the bonus game eligible player, select one of the potential outcomes of the main game as a bonus game eligible outcome, and
- if the bonus game eligible outcome is the outcome of the main game, provide a bonus game to the bonus game eligible player.

In another aspect of the present invention, a method is provided. The method includes the steps of providing a main game to a plurality of players using a center control unit, randomly establishing an outcome of the main game from a plurality of potential outcomes, accepting a wager on the main game from a plurality of players at respective gaming stations, receiving at the gaming stations the outcome of the main game from the center control unit and paying an award to at least one of the players as a function of the outcome of the main game. The method further includes the steps of randomly establishing one of the players as eligible for a bonus game, selecting one of the potential outcomes of the main game as a bonus game eligible outcome, and if the bonus game eligible outcome is the outcome of the main game, provide a bonus game to the bonus game eligible player.

In still another aspect of the present invention, a program for a gaming system for providing a game to a player is provided. The gaming system includes a center control unit and a plurality of gaming stations. The center control unit is configured to provide a main game to a plurality of players. The program of the gaming system performs the steps of providing a main game to a plurality of players using the center control unit, randomly establishing an outcome of the main game from a plurality of potential outcomes, accepting a wager on the main game from a plurality of players at a respective gaming station, receiving, at each of the gaming stations, the outcome of the main game from the center control unit and paying an award to at least one of the players as a function of the outcome of the main game. The program of the gaming machine further performs the steps of randomly establishing one of the players as eligible for a bonus game, selecting one of the potential outcomes of the main game as a bonus game eligible outcome, and if the bonus game eligible outcome is the outcome of the main game, provide a bonus game to the bonus game eligible player.

DETAILED DESCRIPTION OF EMBODIMENTS

Figure 1:
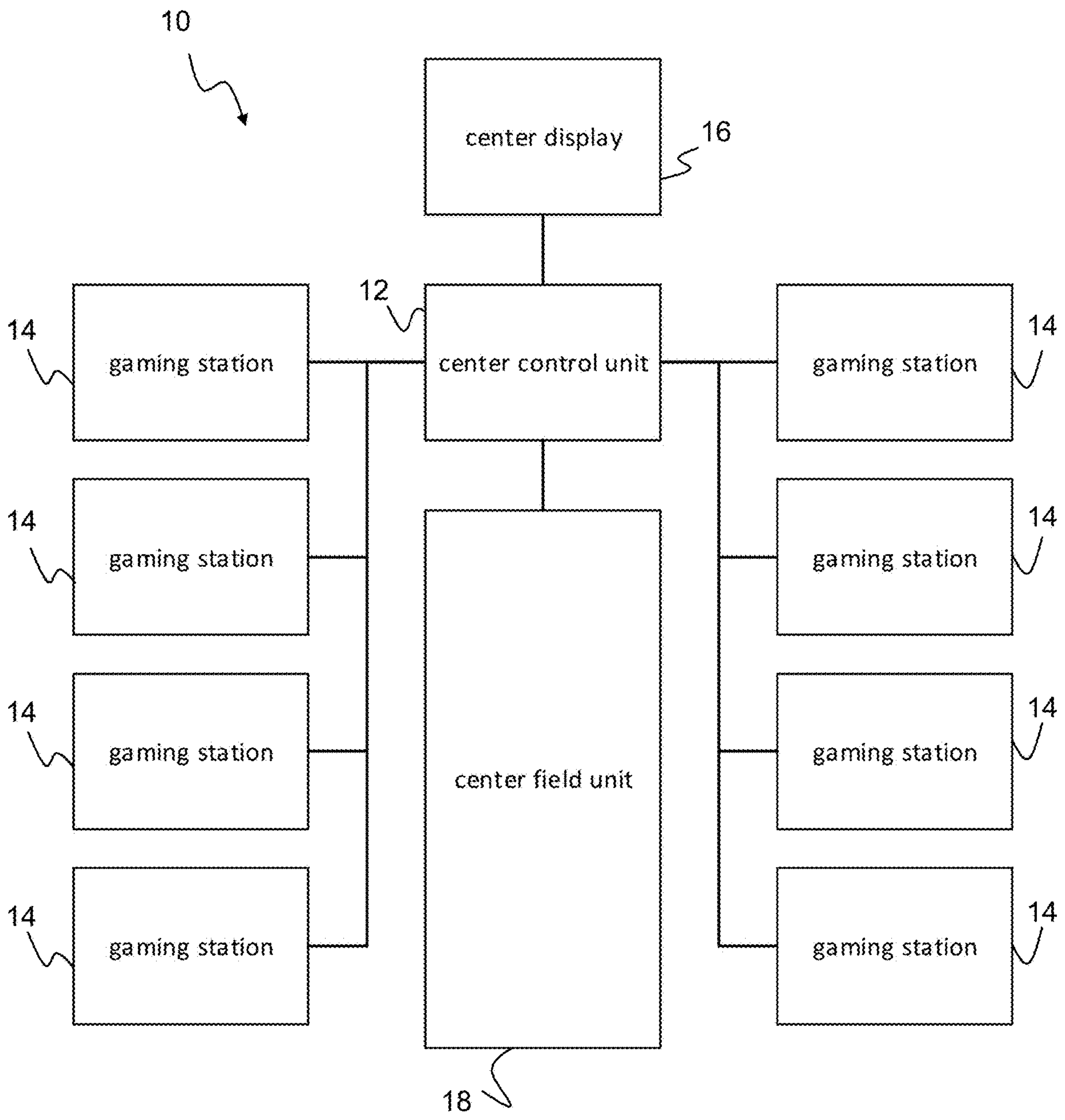
FIG. 1 is a block diagram of a gaming system including a center control unit, center display, center field unit and a plurality of gaming stations, according to an embodiment of the present invention.

A gaming system, according to an embodiment of the present invention, referencing the attached figures is described in detail below. Further, duplicated descriptions will be omitted for identical attached symbols in identical or corresponding parts in each figure.

With reference to the drawings, and in operation, the present invention is directed towards a gaming system 10, a control method M10 for a gaming system, and a program for a gaming system 10 that provides a game to a player. In one embodiment, the gaming system 10 includes a center control unit 12 and a plurality of gaming stations 14. The center control unit 12 is configured to provide a main game to a plurality of players. The main game has a plurality of virtual participants. The center control unit 12 is configured to randomly establish an outcome of the main game from a plurality of potential outcomes. Each gaming station 14 is configured to accept a wager on the main game from a respective one of the plurality of players, to receive the outcome of the main game from the center control unit 12 and pay an award to at least one of the players as a function of the outcome of the main game. The center control unit 12 is further configured to randomly establish one of the players as eligible for a bonus game, for the bonus game eligible player, select one of the potential outcomes of the main game as a bonus game eligible outcome, and if the bonus game eligible outcome is the outcome of the main game, to provide a bonus game to the bonus game eligible player.

In one embodiment of the present invention, the main game is a simulated racing game, for example, a simulated horse racing game. In general, a player may make a wager on the simulated racing game at a respective gaming station 14. The center control unit 12 randomly determines the outcome of the racing game and awards at least one of the players an award based on the outcome of the racing game (see below). The center control unit 12 may also provide a bonus award or bonus game to at least one of the players (see below). In general, the gaming stations 14 provide to the players a user interface (see below) to allow the player to make wagers on the main game, to provide any award to the player, and to receive race result and video data from the center control unit 12. The race result data may include race progression data that is related to the virtual participants of the racing game, and in particular, each of the virtual participants' actions and progression (e.g., position and/or speed and/or acceleration) during the race. The video data may include a simulated video of the racing game for display at each of the gaming stations 14 and/or the center display 16.

Figure 4:
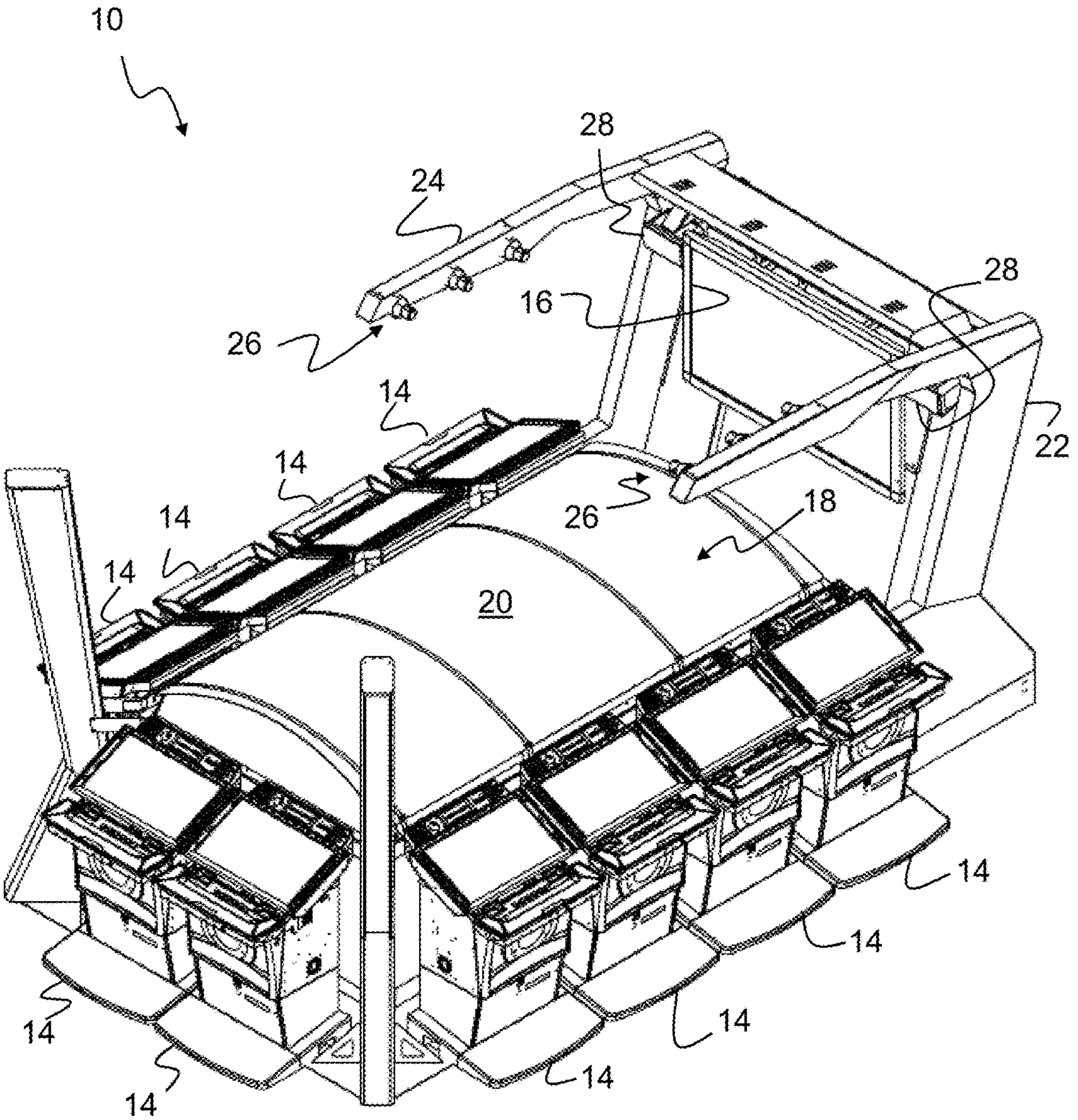
FIG. 4 is a perspective view of the gaming system, according to an embodiment of the present invention.
Figure 5:
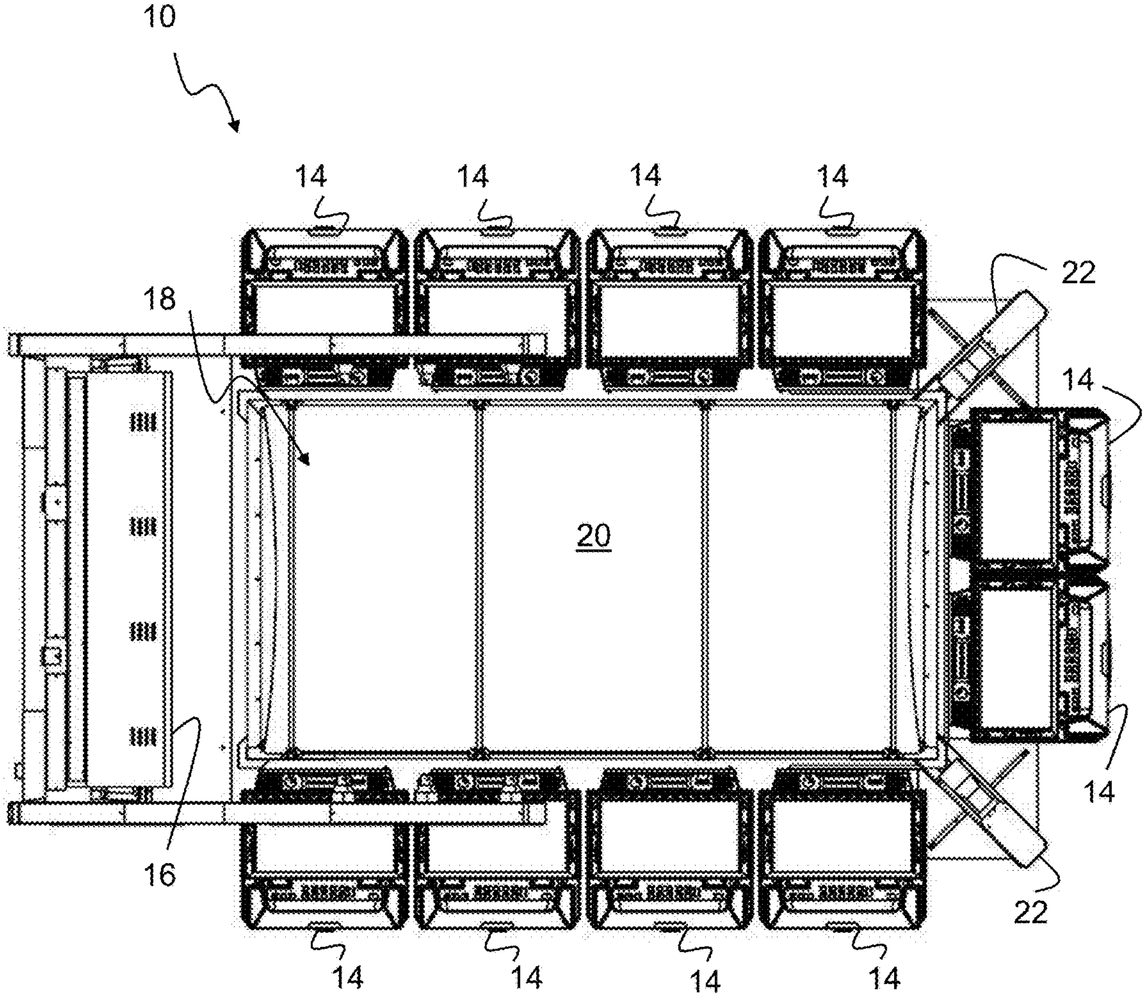
FIG. 5 is a top view of the gaming system, according to an embodiment of the present invention.
Figure 6:
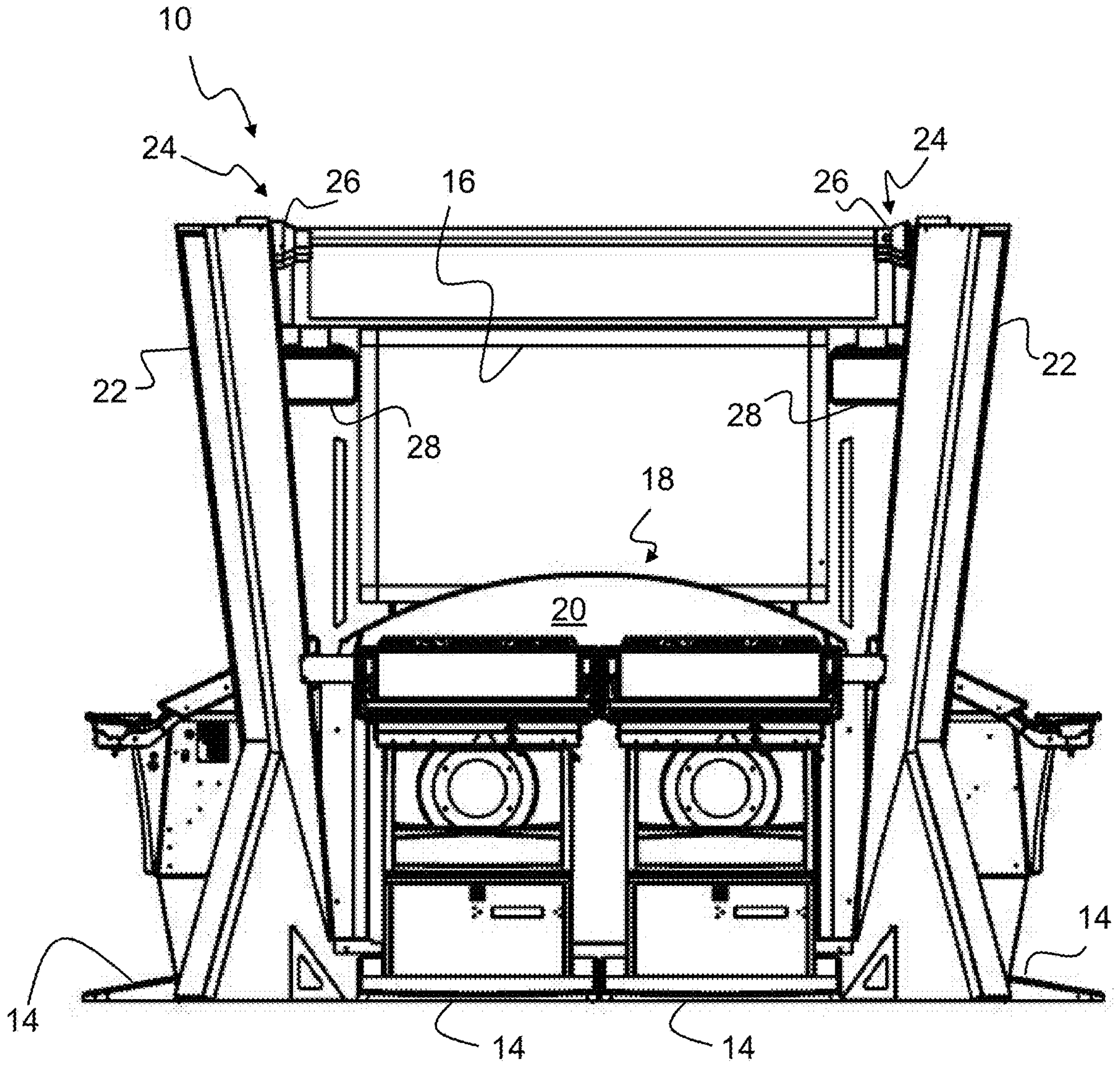
FIG. 6 is a front view of the gaming system, according to an embodiment of the present invention.

The gaming system 10 may also include a center display 16 and a center field unit 18 coupled to the center control unit 12. The center control unit 12 controls the center display 16 and the center field unit 18. The center display 16 may be used to display information related to the main game and the bonus game. As shown in FIGS. 4, 5, and 6, the center display 16 is positioned relative to the gaming stations 14 such that the center display 16 is visible by the players and other non-players positioned near or adjacent the gaming system 10.

Figure 9:
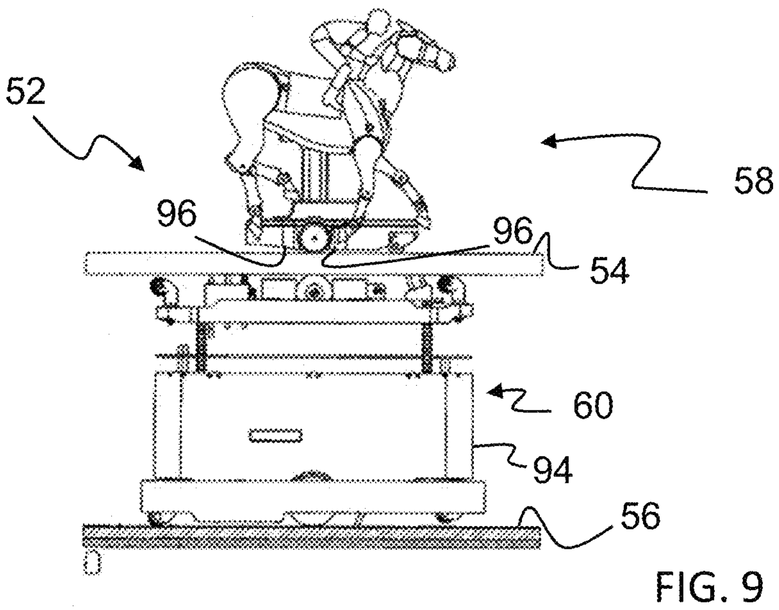
FIG. 9 is an illustration of a race unit associated with the center field unit of FIG. 1, according to an embodiment of the present invention.

As discussed in more detail below, the center field unit 18, under control by the center control unit 12 shows progression of the (virtual) participants in the race using physical models of the participants, e.g., models of the horses and respective jockey (see FIG. 9). The center field unit 18 is described in further detail below.

In an alternative embodiment, the center field unit 18 may be omitted. The center control unit 12 shows progression of the virtual participants in the race via video which may be displayed on the center display 16 and/or at each gaming station 14.

As mentioned above, the gaming system 10 may provide both a main game and a bonus game to the players. In one aspect of the present invention, a bonus chance symbol is randomly assigned to at least one of the virtual participants or horses before the race. A bonus chance is provided to at least one of the players if a symbol assigned horse wins the race.

The main game may include one or more preliminary races and a final race. For the preliminary races, the participants in the race may be randomly selected from ranks or groups of potential participants. For instance, in one embodiment, a single or multiple participants may be randomly selected from each of a plurality of ranks or groups of participants. The participants may be grouped or ranked based on predefined parameters of the participants. For example, participants in one rank or group may have an increased likelihood of winning the race. However, the potential payout for a participant with higher likelihood of winning will generally be lower than the potential payout for another participant lower likelihood of winning the race.

In another aspect of the present invention, race result data is transmitted from the center control unit 12 to the gaming stations 14 via a connection mode protocol, e.g., TCP/IP. The connection mode protocol chosen to transmit the race result data enables accurate and reliable communications for important or essential data, such as the race result data. Race video data, and other non-essential (or less essential data) may be transmitted from the center control unit 12 to the gaming stations 14 via a connectionless mode protocol, e.g., UDP, to provide efficient transmission.

Each gaming station, according to the present embodiment, may receive a game value or wager from the player. The wagers are sent to the center control unit 12 which generates a game result or outcome. The game result is sent to the gaming stations 14 and the gaming stations may provide a payout to the respective player according to the game result.

The gaming system 10, including the center control unit 12, the gaming stations 14, the center display 16 and the center field unit 18 may be provided in a common structure. The center field unit 18 forms the center or focus of the gaming system 10. As explained further below, the center field unit 18 includes an upper and lower field covered by a transparent field cover 20 which, in the illustrated embodiment, is formed by three separate pieces. The center display 16 is mounted to a frame 22 located at one end of the center field unit 18 (see FIGS. 4-6). Also mounted to the frame 22 is an illumination unit 24 with a plurality of lighting devices 26 mounted thereon. As shown, the gaming stations 14 are positioned along the other sides of the center field unit 18. In the illustrated embodiment, the gaming system 10 includes gaming stations 14, although, a different number of gaming stations 14 may be included. A plurality of speakers 28 may also be mounted to the frame 22.

Figure 2:
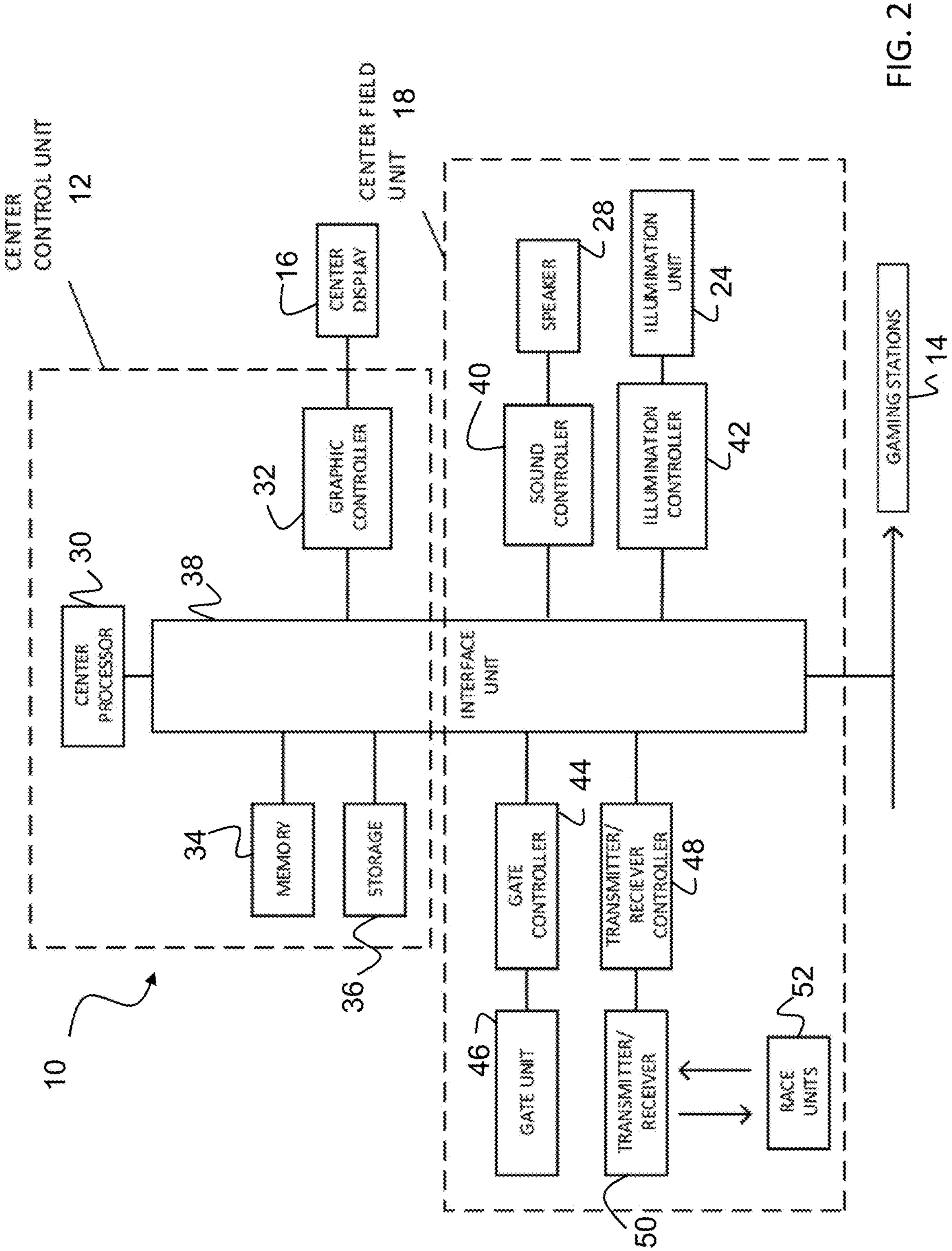
FIG. 2 is a block diagram of the center control unit and the center field unit of the gaming system of FIG. 1, according to an embodiment of the present invention.

With reference to FIG. 2, a block diagram of the center control unit 12 and the center field unit 18 is shown. As shown in one embodiment, the center control unit 12 includes a center processor 30, a graphic controller 32, memory 34, and storage 36. An interface unit 38 provides communications between the center control unit 12, the center field unit 18 and the gaming stations 14. The center processor 30 controls the operation of the gaming system 10, the center field unit 18 and communications between the center field unit 18 and the gaming stations 14, as well as playing the main game and the bonus game by executing computer program instructions recorded in the memory 34 and/or the storage 36. The center processor 30 also implements a random number generator (RNG) that is used during operation of the game.

The center processor 30, in part, is configured as the interface unit 38, including a chip set providing communication functions of the center processor 30, a memory bus connected to a CPU, various expanding buses, serial interfaces, USB interfaces, Ethernet (registered trademark) interfaces or wireless LAN interfaces and the like, and a computer unit where the center processor 30 may also provide the addressable memory 34 and the storage 36 through the interface unit 38. The memory 34 can be configured to include RAM that is a volatile storage medium, ROM that is a nonvolatile storage medium, and EEPROM that is a rewritable nonvolatile storage medium. The storage 36 provides the center control unit 12 an external storage device function, can use reading devices such as a memory card that is a removable storage medium, and/or a magneto optical disk and the like, and/or disk drives such as hard disk drives (HDD) and/or steady state drives (SSD).

Figure 7:
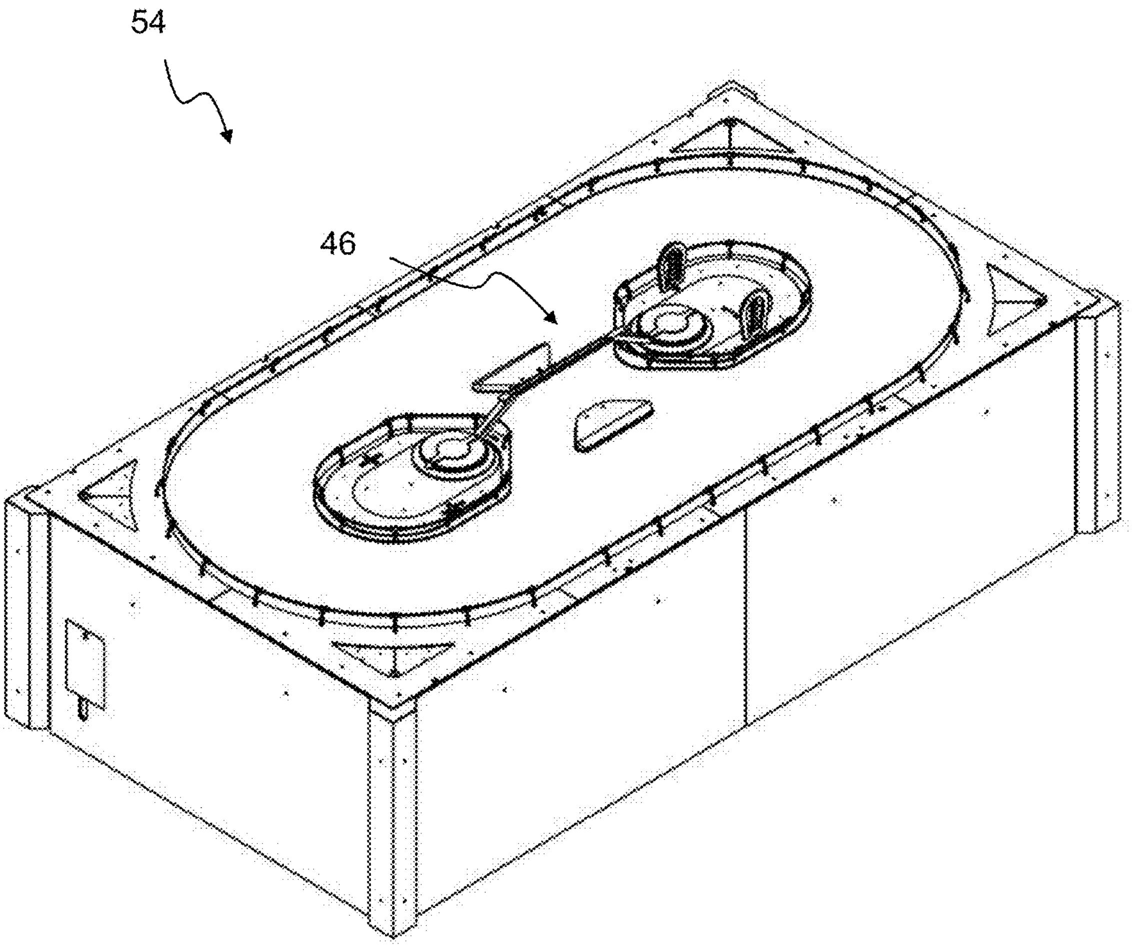
FIG. 7 is a perspective view of an upper field of the center field unit of FIG. 1, according to an embodiment of the present invention.
Figure 8:
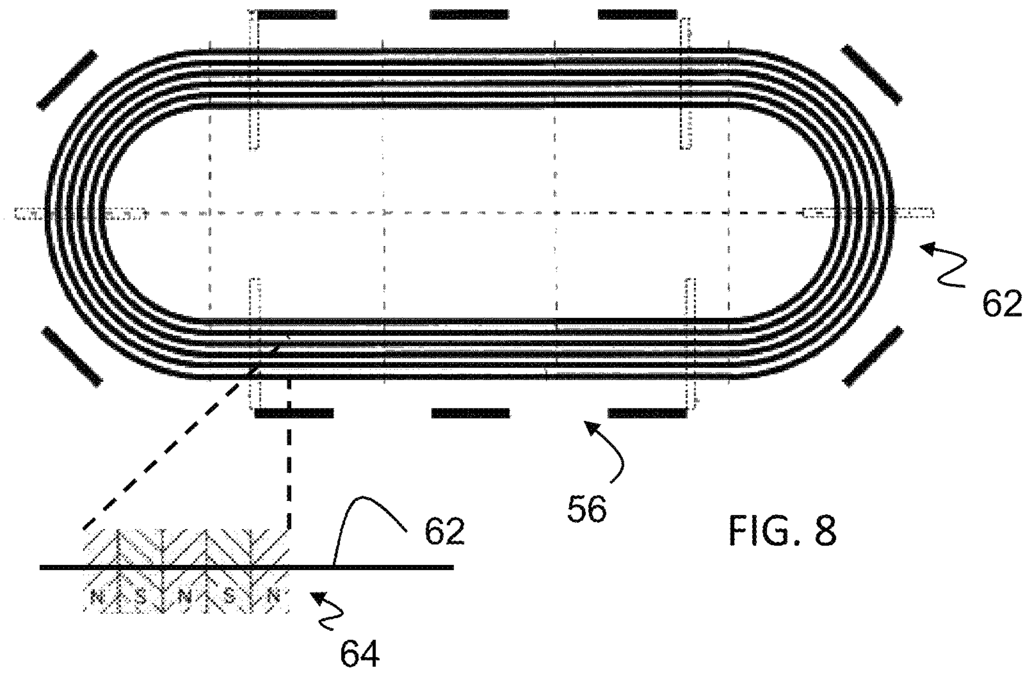
FIG. 8 is a diagrammatic illustration of a lower field of the center field unit of FIG. 1, according to an embodiment of the present invention.

The center processor 30 controls the components of the center field unit 18 through respective controllers. Sound is provided and generated through the speaker 28 under control of the center processor 30 through a sound controller 40. The illumination unit 24 is controlled by the center processor 30 through an illumination controller 42. With reference to FIGS. 7, 8, and 9, in one embodiment the center field unit 18 includes an upper field 54, a lower field 56, and a race unit 52. The upper field 54 presents a view of a model racetrack and the race or horse race using a plurality of participants, horse model, or race models 58 of race units 52. The lower field 56 is located under the upper field 54. As is explained in more depth below, the race units 52 include lower field driving units 60 that guide the race models 58 on the upper field 54 by, for example, magnetic force. Each lower-field driving unit 60 detects at least one of the guidelines 62 with its optical sensor (see below). The lower field 56 includes a plurality of guidelines 62. Each lower field driving unit 60 detects at least one of the guidelines 62 with an optical sensor. The lower field 56 includes a plurality of magnetic progress lines 64 placed generally perpendicular to the guidelines 62. The lower field driving units 60 detect the magnetic progress lines 64 with a magnetic sensor.

The upper field 54 further includes a gate unit 46. The gate unit 46 is controlled by the center processor 30 via a gate controller 44. The gate unit 46 acts as the start gate and the end or goal gate for the simulated race. The gate unit 46 is movable and is position at the center of the upper field 54 before a race starts. The gate unit 46 is positioned at a start positioned before a race starts and is positioned at a goal position before the race ends.

The center processor 30 communicates with the race units 52 through the transmitter/receiver 50. The center processor

30 sends information to each race unit 52 to control position and/or velocity. Each race unit 52 sends information of its position and velocity to the center processor 30.

The center control unit or controller 12 randomly determines race result and race progression data based on strength and other attributes of participating horses in the race. The center control unit or controller 12 generates movie data of the race by 3D rendering software engine based on the race progression data et al.

The center control unit or controller 12 periodically sends command and controls each race unit 52 so as to show race progression based on the race progression data. The center control unit or controller 12 may also display the movie data on the center display 16 through graphic controller 32 and provide streaming data derived from the movie data to each gaming station 14.

Figure 3:
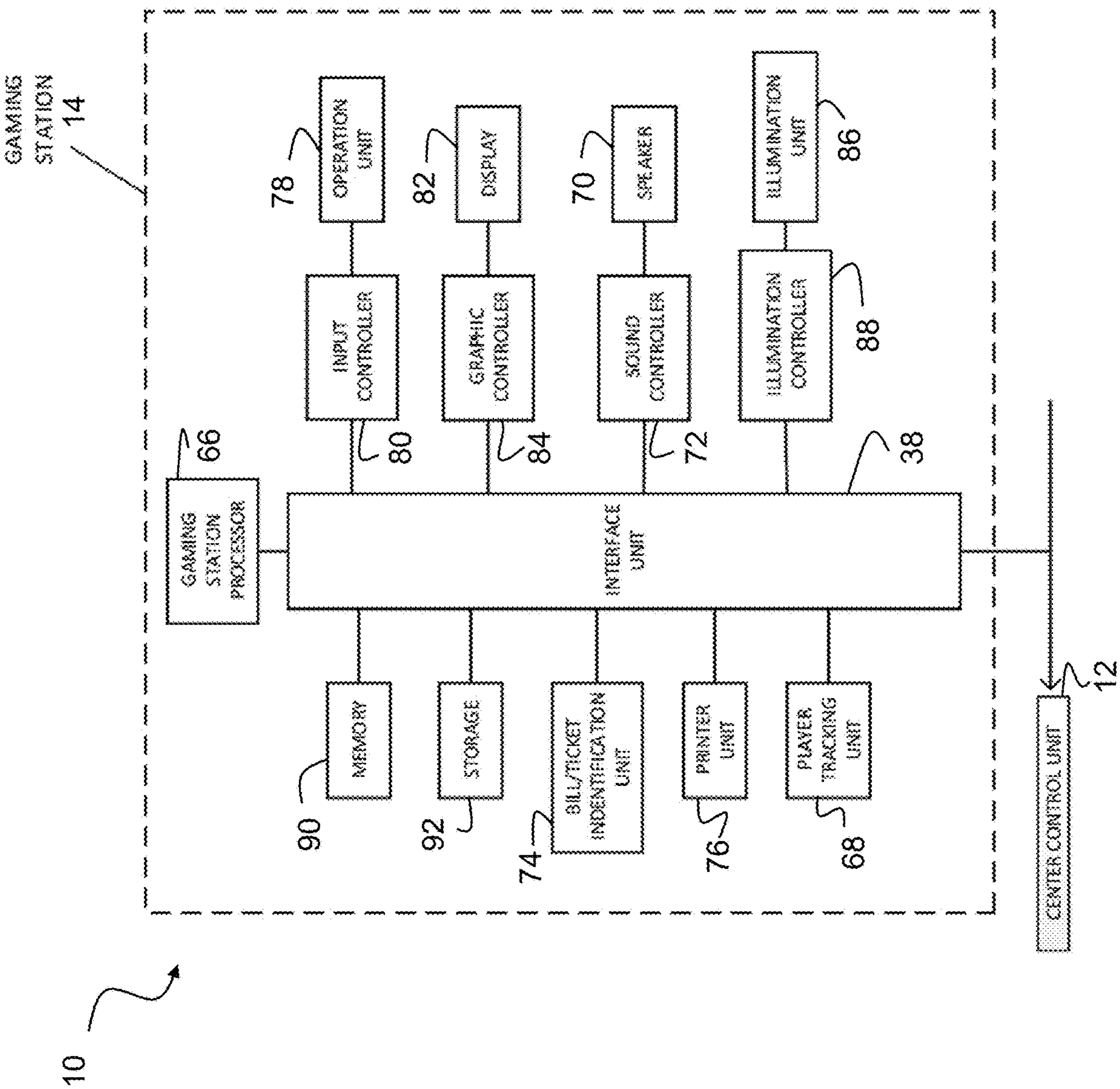
FIG. 3 is a block diagram of one of the gaming stations of the gaming system of FIG. 1, according to an embodiment of the present invention.

With reference to FIG. 3, each gaming station 14 includes a gaming station processor 66. The gaming station processor 66 communicates to the center control unit 12 through the interface unit 38. Each gaming station 14 includes a cabinet providing a display unit 82, a control panel and may also house a player tracking or ranking unit 68. The cabinet also houses the gaming station processor 66 that controls each part of the gaming station 14 (see below). The gaming station processor 66 and/or the center control unit 12 may also implement a random number generator (RNG). Each gaming station 14 includes one or more speaker(s) 70 that are provided on the cabinet, and controlled by the gaming station processor 66 through a sound controller 72. Further, a bill/ticket identification unit 74, a printer unit 76, and an operation unit 78 may be provided on the control panel. The operation unit 78 allows player input through one or more buttons. The gaming station processor 66 receives communication from the operation unit 78 via an input controller 80. The gaming station 14 controls the display unit 82 via a graphic controller 84. Additional gaming station lighting may be provided by an illumination unit 86 that is controlled by the gaming station processor 66 via an illumination controller 88.

In the illustrated embodiment, the player tracking unit 68 is housed in the cabinet. The player tracking unit 68 may include a card reader that recognizes a player identification card, a display that presents data to the player, and a keypad that receives input by the player. This type of player tracking unit reads information recorded on the player identification card inserted by the player into the card reader, and displays the information and/or information acquired by communicating with the external system on the display, by cooperatively operating with the gaming station processor 66 mentioned below, or an external system. Further, input from the player is received by the keypad, the display of the display is changed according to the input, and communication with the external system is carried out as necessary.

The bill/ticket identification unit 74 is disposed on the control panel in a state where the insertion opening that a bill or ticket is inserted into is exposed, an identification part that identifies a bill/ticket by various sensors on the inside of the insertion opening is provided, and a bill/ticket storage part is provided on the outgoing side of the identification part. The bill/ticket identification unit 74, receives and identifies bills and tickets (including vouchers and coupons) that are the game value as a game executing value, and notifies the gaming station processor 66.

The printer unit 76 is disposed on the control panel in a state where the ticket output opening that a ticket is output from is exposed, a printing part that prints predetermined information on a printing paper on the inside of the ticket output opening is provided, and a housing part that houses the printing paper inside the paper inlet side of the printing part is provided. The printer unit 76, under the control of the gaming station processor 66 mentioned below prints information on paper and outputs a ticket according to credit payout processing from the gaming station 14. The output ticket can use the payout credit as game play by being inserted into the bill/ticket identification unit 74 of another gaming machine or system, or, can be exchanged for cash by a kiosk terminal inside of the casino or a casino cage.

The operation unit 78 receives the operation of the player. The operation unit 78 includes a group of setting buttons that receives various instructions from the player on the gaming station 14 to interface with the center control unit 12. The memory 90 can be configured to include RAM that is a volatile storage medium, ROM that is a nonvolatile storage medium, and EEPROM that is a rewritable nonvolatile storage medium. The storage 92 provides the gaming station processor 66 as an external storage device function, can use reading devices such as a memory card that is a removable storage medium, and a magneto optical disk and the like, hard disk drives (HDD) and/or steady state drives (SSD).

The gaming station 14, which includes memory 90 and storage 92, controls each part by executing a program stored in the memory 90 and the storage 92, and provides, along with the central control unit 12, a game to the player. Here, for example, the memory 90 and storage 92 may be configured to store a program and data of an operating system and subsystem that provide the basic functions of the gaming station 14 to the EEPROM of the memory 90, and stores a program and data of an application that provides a game to the storage 92. Further, the gaming station 14 may be a multiprocessor configuration that has a plurality of CPUs.

Each block connected to the gaming station processor 66 is described below. The bill/ticket identification unit 74 receives bills or tickets in the insertion opening, and notifies the gaming station processor 66 of identifying information corresponding to the assortment of bills, or the payout processing of credits. The bill/ticket identification unit 74 notifies the information to the gaming station processor 66, and the gaming station processor 66 increases the usable credit amount inside of the game according to the notified content. The printer unit 76 is under the control of the gaming station processor 66 which receives an operation of the payout button of the group of setting buttons and prints information corresponding to the credit payout processing from the gaming station 14 on a printed ticket.

The player tracking unit 68 cooperatively operates with the gaming station processor 66, and sends and receives information and the like of the player from the casino management system. The graphic controller 84 controls the display unit 82 under the control of the gaming station processor 66, and displays a display image that includes various graphic data. The sound controller 72 drives the speaker 70 under the control of gaming station processor 66, and provides various sounds such as an announcement, sound effects, BGM and the like.

Further, the interface unit 38, has various communication interfaces for communicating with the exterior of the gaming station 14, for example, the interface unit 38 can communicate with an external network by Ethernet or wireless LAN and a serial output. In the present embodiment, one example shows when there is communication between a well-known server side gaming network, a G2S network, and a slot information system, respectively.

In general, each gaming station 14 may receive a respective player's bet or wager and transmits the bet or wager to the center control unit 12. The gaming stations 14 receive the race result and the video data from the center control unit 12 to display on the respective display 82. A touch screen display may be used as an input device and a display. The data of race result is transmitted from the center control unit 12 to the gaming stations 14 by using connection-mode protocol (ex. TCP/IP) enable to provide accurate and reliable communications for important data. The data of race video may be transmitted from the center control unit 12 to the gaming stations 14 by using connectionless-mode protocol (ex. UDP) enable to provide efficient transmitting.

In one aspect of the present invention, the center control unit 12 is configured to provide a main game to a plurality of players. In one aspect, the main game is a simulated race game, such as a horse race. The simulated race game has a plurality of virtual participants, e.g., horses. The center control unit 12 may be configured to randomly establish an outcome of the main game from a plurality of potential outcomes. For instance, the plurality of potential outcomes may include a winner of the race. Additionally, each potential outcome may also include the finish or end position of each of the virtual participants in the race.

Each gaming station 14 may be configured to accept a wager on the main game from a respective one of the plurality of players. After the wagers have been placed, the center control unit 12 may establish the outcome of the main game and send the outcome to each of the gaming stations 14. The gaming stations 14 may receive the outcome of the main game from the center control unit 12 and pay an award to the respective player as a function of the outcome of the main game and the wager made by the player.

As discussed above, the gaming system 10 may also provide a bonus game. In one embodiment of the present invention, the center control unit 12 is further configured to randomly establish one of the players as eligible for a bonus game. For the bonus game eligible player, the center control unit 12 selects one of the potential outcomes of the main game as a bonus game eligible outcome. If the bonus game eligible outcome is the outcome of the main game, the center control unit 12 provides a bonus game to the bonus game eligible player. In one embodiment, if a player selects one of the participants as the winner of the race and the center control unit 12 selects the winning of the race by the same participant as the bonus eligible outcome and the one of the participants wins the race, then the center control unit 12 awards the player the opportunity to play the bonus game.

In one embodiment, the plurality of potential outcomes includes at least one outcome that identifies at least one of the virtual participants as a winner of a contest. In another embodiment, the plurality of potential outcomes includes at least one combination outcome that identifies at least two of the virtual participants. For example, each outcome may include the first, second and third place winners. Alternatively, the position of each participant in the finish of the race may be included.

In one embodiment, the system 10 includes a center field unit 18 coupled to the center control unit 12. The center field unit 18 includes a plurality of physical members or race units 52, a representation of a racetrack. Each physical member or race unit 52 is associated with a respective one of the virtual participants. The center field unit 18 under control of the center control unit 12, is configured to move the physical members or race unit 52 along the racetrack to represent the outcome of the main game.

In one embodiment, the outcome of the main game includes a finishing order of the virtual participants in the race. Additionally, the outcome of the main game may also include race progression data. The race progression data may include, for example, the position, speed, etc., of each participant during the race.

In one embodiment of the present invention, the center control unit 12, in providing the bonus game to the bonus game eligible player, randomly establishes an outcome of the bonus game. After the outcome of the bonus game has been determined, the center control unit 12 controls the respective gaming station 14 to present the bonus game to the bonus game eligible player. Then, the center control unit 12 awards the bonus game eligible player an award as a function of the outcome of the bonus game.

In one embodiment of the bonus game, the gaming station 14 presents to the bonus game eligible player a plurality of bonus game indicia. The gaming station 14 is configured to allow the player to select one of the plurality of bonus game indicia and to display the outcome of the bonus game in response to the player selecting one of the plurality of bonus game indicia.

In one embodiment, the center control unit 12 is further configured to provide the bonus game to another one of the players. The center control unit 12 may be further configured to randomly establish a second one of the players as eligible for the bonus game. For the second bonus game eligible player, the center control unit 12 may select one of the potential outcomes of the main game as a second bonus game eligible outcome. If the second bonus game eligible outcome is the outcome of the main game, the center control unit 12 may provide a bonus game to the second bonus game eligible player. The second bonus game eligible outcome may be different or the same as the bonus game eligible outcome.

Figure 10:
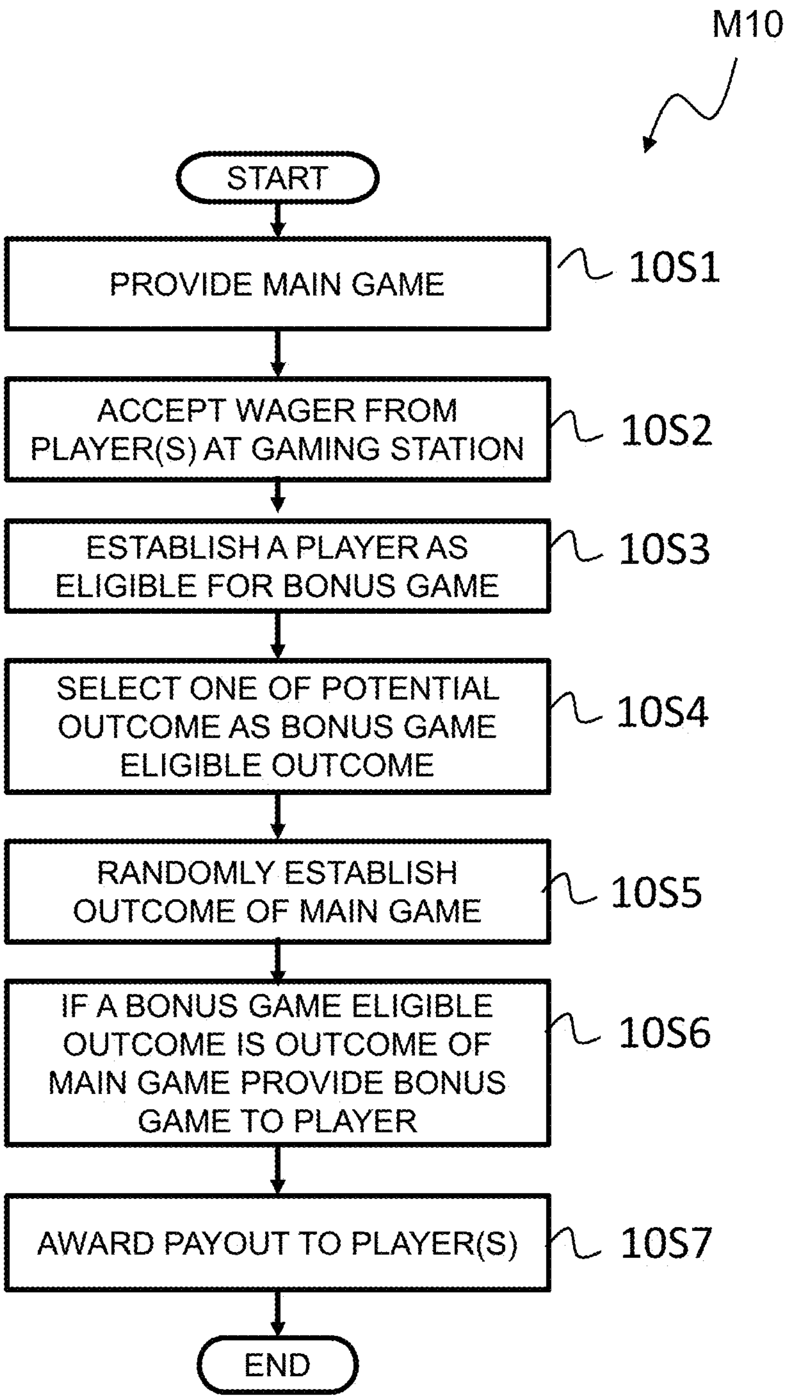
FIG. 10 is a flow chart describing the operation of the gaming system of FIG. 1, according to an embodiment of the present invention

With reference to FIG. 10, in another aspect of the present invention, a control method M10 for a gaming system 10 to provide a game to a player is provided. The game includes a main game and a bonus game. The gaming system 10 includes a center control unit 12 and a plurality of gaming stations 14. In a first step 10S1, the main game is provided to a plurality of players using the center control unit 12. The main game has a plurality of virtual participants. In a second step 10S2, a wager on the main game is accepted from a plurality of players at respective gaming stations 14.

In a third step 10S3, the center control unit 12 randomly establishes one of the players as eligible for a bonus game. For the bonus game eligible player, the center control unit 12 selects one of the potential outcomes of the main game as a bonus game eligible outcome in a fourth step 10S4. In a fifth step 10S5, an outcome of the main game is randomly established or selected from a plurality of potential outcomes by the center control unit 12. In a sixth step 10S6, if the bonus eligible outcome is the outcome of the main game, the center control unit 12 provides the bonus game to the bonus game eligible player. In a seventh step 10S7, the award payout is provided to each player of the respective gaming station 14 based on the outcome of the main game and the bonus game.

With reference to FIGS. 2, 7, 8, 9, and 11A-11C, an example of the center field unit 18 will now be explained. An example in which the present invention is applied to a horseracing game machine will now be described by reference to the accompanying drawings.

In the illustrated embodiment, the gaming stations 14 surround the center field unit 18 which includes a representation of a racing track on which the race models 58 of the race units 52 are moved about the racing track to simulate a race. Each of the gaming stations 14 includes wagering handling mechanisms (see above) for effecting entry/payout of wagers, a control panel, such as a voting control key, and indicators for indicating various types of information items.

As shown, the center field unit 18 includes an upper field 54 over which the race models 58 are to travel (hereinafter, referred as a racing track), and a lower field 56 over which self-propelled members 94 are to travel (hereinafter, simply referred as traveling field). The self-propelled members 94, which travel over the lower field 56 attract the race models 58 such that the race models 58 are caused to compete with each other, by magnetic force originating from magnets 96 provided in the tops of respective self-propelled members 94 located below the corresponding race models 58 and at the bottoms of the race models 58.

In the basic structure of the center field unit 18, the self-propelled members 94 are caused to travel along a rail, and the traveling direction of the self-propelled members 94 is regulated by the rail. Hence, travel control to be effected for racing is limited solely to travel control. As shown in FIG. 8, guidelines 62 are alternately provided and printed on the lower field 56 along a traveling direction.

Figure 11A:
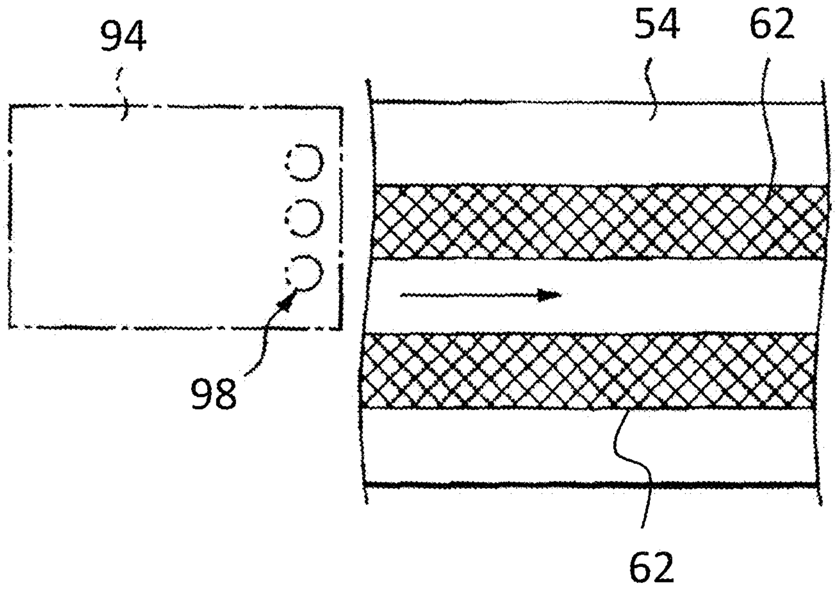
FIG. 11A is a diagrammatic illustration of a portion of the lower field unit of FIG. 8, including a plurality of guidelines.

In one embodiment as shown in FIG. 11A, three photodiodes 98 are provided side by side on the lower face of each self-propelled member 94 in a widthwise direction, thus constituting a guideline detector. If the center photodiode 98 and either the right or left photodiode 98 detect the guideline 62 and if the remaining photodiode 98 fails to detect the guideline 62, the self-propelled member 94 is determined to have deviated toward the photodiode 98 which does not detect the guide line 62. Such deviation is determined by a travel controller 100 provided in each self-propelled member 94, and the course of the self-propelled member 94 is corrected through feedback control. In this way, the self-propelled member 94 follows the guideline 62, while reliably sensing small deviations thereof. As a result, the self-propelled member 94 follows the black line (i.e., guideline) 62 accurately and travels smoothly.

In one embodiment, two or three optical sensors (not shown) may be provided in a rear portion of the self, skewed travel of the self-propelled member 94 relative to the guideline can also be detected. Hence, the accuracy of a control operation for tracking a guideline, particularly a curved guideline, can be enhanced.

Figure 11B:
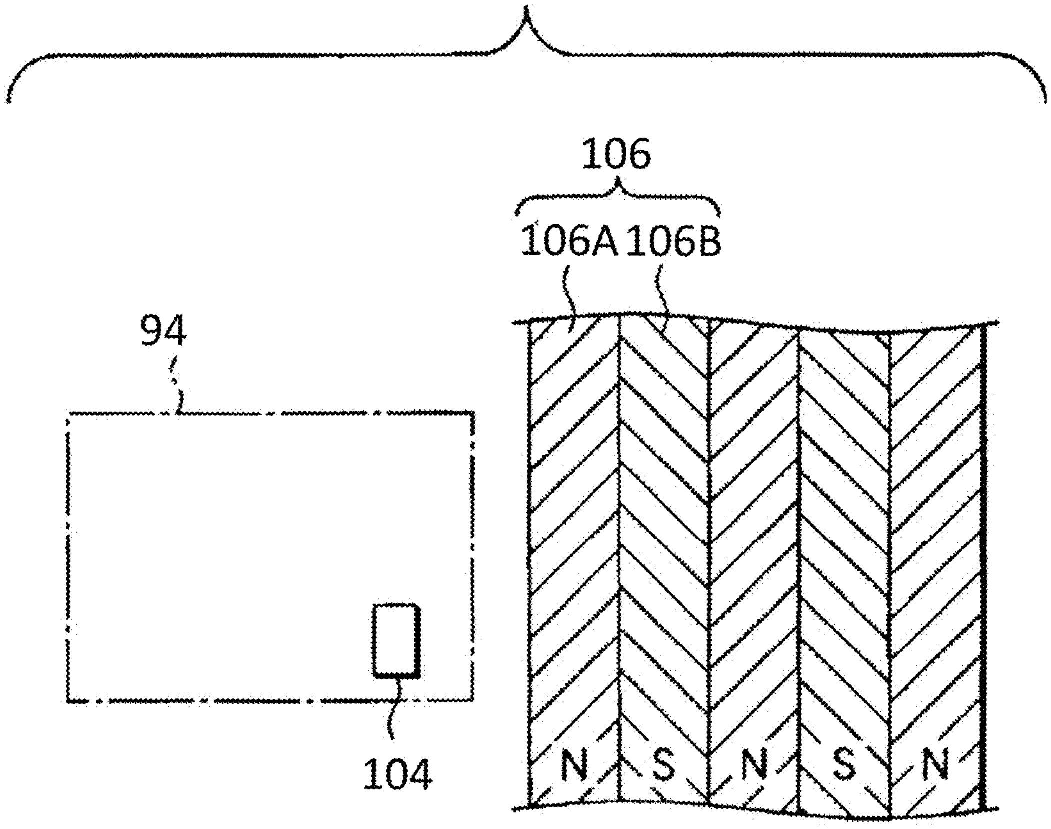
FIG. 11B is a diagrammatic illustration of a portion of the lower field unit of FIG. 8, including a plurality of progress lines.
Figure 11C:
FIG. 11C is an illustration of a detection signal associated with the central field unit, according to an embodiment of the present invention.

The order of arrival of the race models 58 is generally determined before a game is started. To this end, as shown in FIG. 11B, progress lines 102 orthogonal to the guidelines 62 are provided on the track at high density. The progress lines 102 are detected by a hole sensor 104 provided in the lower face of each self-propelled member 94. The number of progress lines 102 which the self-propelled member 94 has run across is counted, to thereby detect progress. In the illustrated embodiment, an N-pole magnetic line 106A and an S-pole magnetic line 106B are provided alternately. When the self-propelled member 94 runs across these magnetic lines, the hole sensor 104 detects the lines as a detection signal, such as that shown in FIG. 11C. As a result of the detection signal being converted through analog-to-digital conversion, the number of progress lines 102 which the self-propelled member 94 has run across can be detected. The thus-detected progress information is transmitted from each self-propelled member 94 to the center control unit or controller 12 (see FIG. 11C).

Figure 11D:
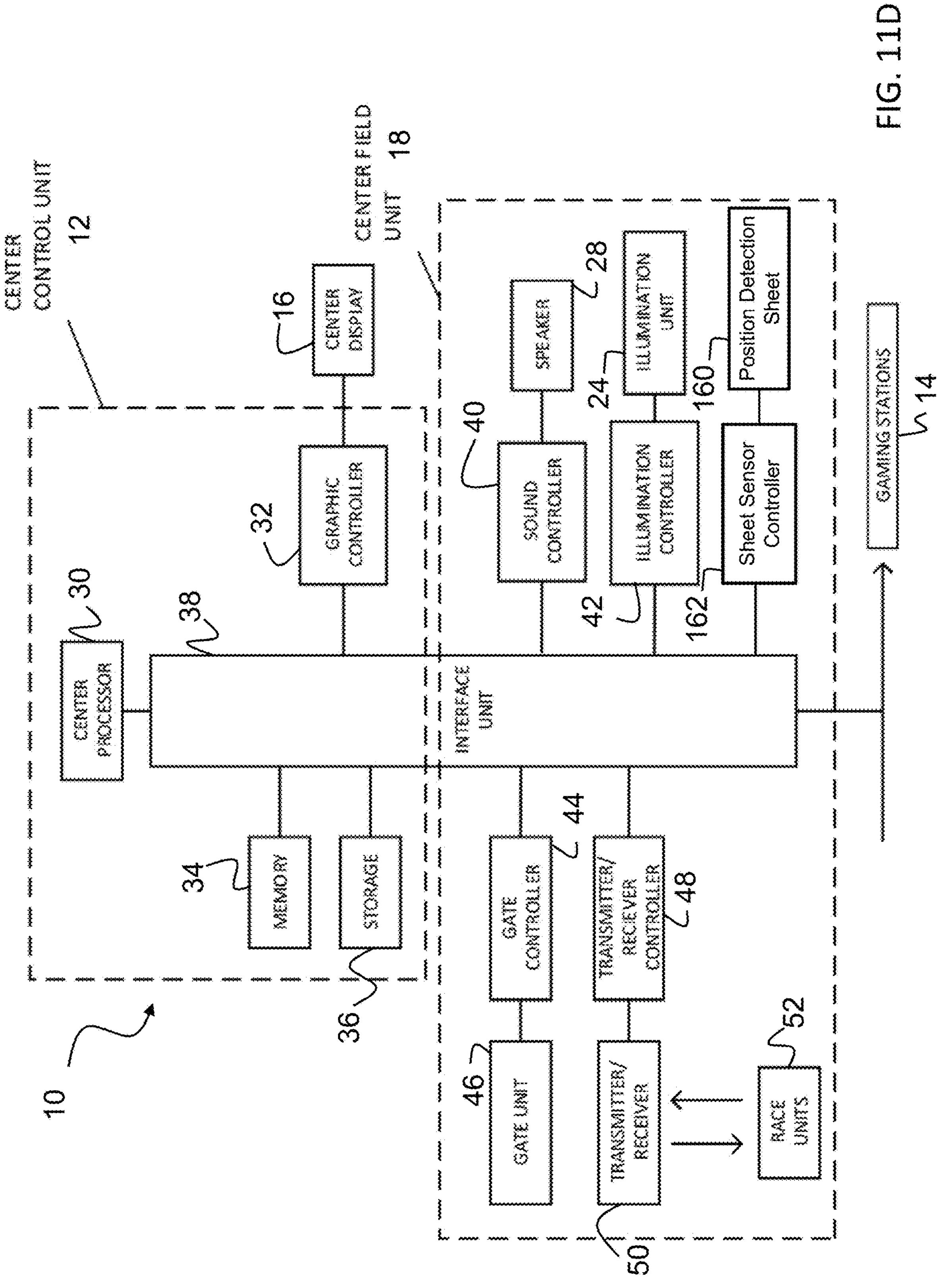
FIG. 11D is a hardware diagram of a central control unit with a position detection sheet, according to an embodiment of the present invention.
Figure 11E:
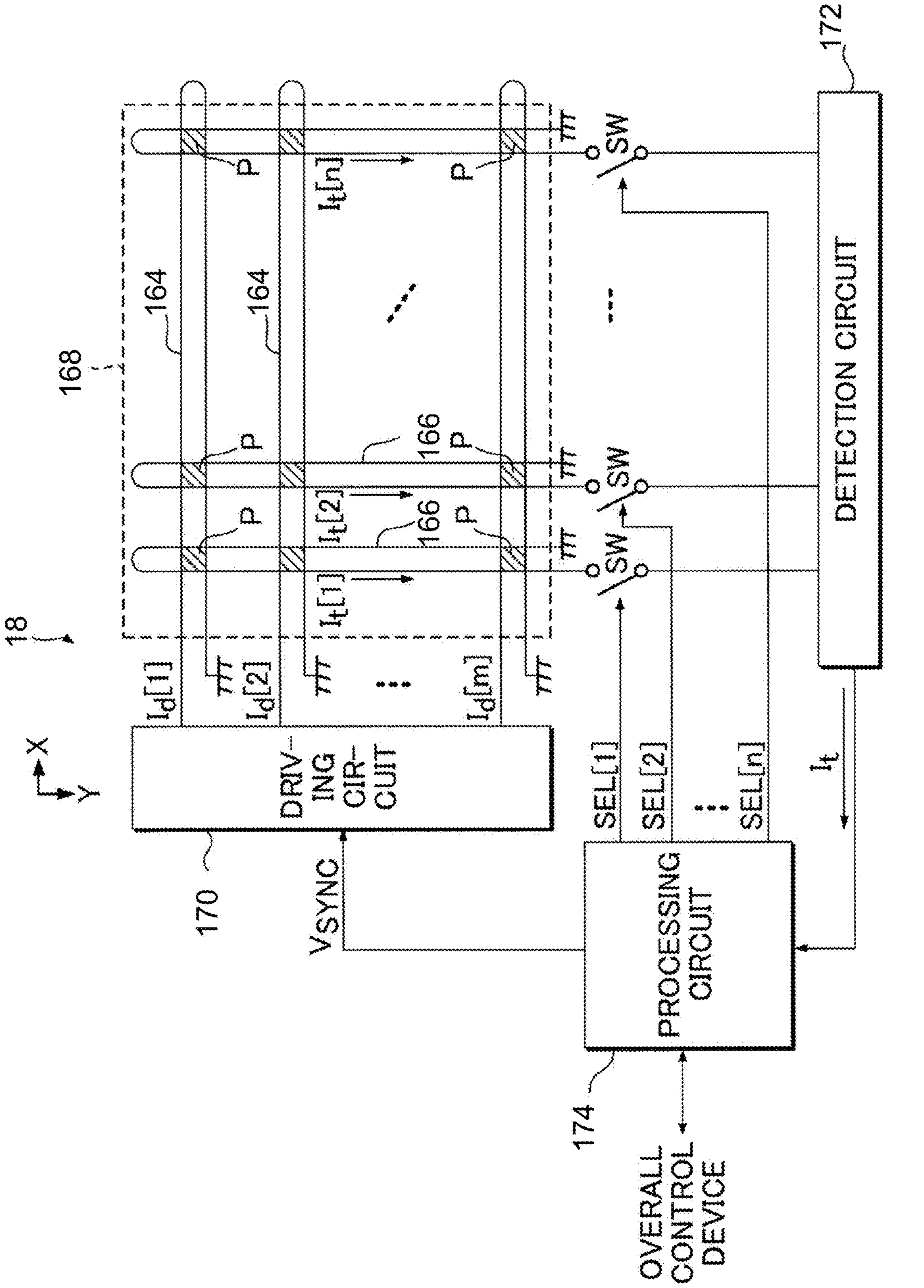
FIG. 11E is a schematic of the position detection sheet of FIG. 11D, according to an embodiment of the present invention.

With reference to FIGS. 11D-11E, in an alternative embodiment a position detection sheet 160 may be used to detect to acquire the positions of the self-propelled members 94. The position detection sheet 160 may be controlled by a sheet sensor controller 162. The sheet sensor controller 162 acquires the positions of the self-propelled members 94 on the position detection sheet 160 and transmits the position data to the center controller/processor 30.

In one embodiment, the position detection sheet 160 may be composed of multiple driving coils extending in the X direction and multiple detection coils extending in the Y direction, which is concisely disclosed in US2012/0329539A1 (U.S. Ser. No. 13/582,135).

With specific reference to FIG. 11E, on the surface of the position detective sheet 160, m driving coils 164 (driving lines) extending in the X direction and n detection coils 166 (detected lines) extending in the Y direction, orthogonal to the X direction, are formed. The interval between neighboring driving coils 164 and the interval between neighboring detection coils 166 are set to 10 mm. However, these values may be set freely. From the point of view of the vertical plane to FIG. 11E, parallel parts of the detection coils 166 are orthogonal to parallel parts of the driving coils 164. However, although not shown, the layer in which the detection coils 166 are placed is different from the layer in which the driving coils 164 are placed. These layers are arranged in parallel, and there is another layer of a non-conductive material between these layers.

Electromagnetic couplings are made at intersections of the multiple driving coils 164 and multiple detection coils 166. In this embodiment, the intersections of the detection coils 166 and the driving coils 164 are referred to as cells P. Consequently, on the surface of the position detection sheet 160, multiple cells P are arranged in a matrix of m rows and n columns. Although detailed illustration is omitted, the surface of the position detective sheet 160 on which the multiple cells P are formed in a matrix is covered with a transparent acrylic plate. The self-propelled members 94 travel on the acrylic plate.

As shown in FIG. 11E, the position detection sheet 160 includes a cell part 168 on which the multiple cells P are deployed, a driving circuit 170, a detection circuit 172, and a processing circuit 174 for controlling overall operations and for executing various processes. Each of the self-propelled members 94 includes a pair of discoid pieces (not shown) made of an electric conductor. The discoid pieces are fixed to the bottom surface of the self-propelled members 94 in such a manner that the centers of the detected pieces 108F and 108R and are detected by the position detection sheet 160. The position detection sheet 160 and its operation are disclosed more fully in US Patent Application 2012/0329539, published on Dec. 27, 2012, which is hereby incorporated by reference.

The center control unit or controller 12 acquires progress information from the self-propelled members 94, thereby ascertaining the positions of the self-propelled members 94 and the condition of a group of race models 58 on the basis of the positional relationship between the race models 58.

The principal traveling speed of each self-propelled member 94 is controlled on the basis of a speed control program assigned to a travel controller 100 of the self-propelled member 94 before a game is started, and in accordance with the characteristics of the self-propelled member 94 (e.g., a shake-off type, a last-spurt type, a sprinter type, or a long-distance runner type) and the strengths, weaknesses, and peculiarities of a jockey (the self-propelled members 94 assigned to win and place are controlled by a special speed control program after they have substantially passed by the third corner). Under the ever-changing condition of a group of horses, and under central control, a determination is made as to whether to change the current guideline to another guideline, on the basis of conditions for determination; that is, the presence or absence of orientation of the self-propelled member 94 toward the inner or outer side of the traveling course, and the presence or absence of the chance of the self-propelled member 94 interfering with an adjacent self-propelled member 94.

A path-switching signal is sent to the self-propelled member 94 which satisfies any one of the above conditions so that the traveling path of the subject self-propelled member 94 is switched to an inner guideline or an outer guideline. In the present embodiment, if a self-propelled member 94 is oriented (programmed) toward an inner side of the traveling path, priority is placed on path-switching to the inner side. In contrast, if a self-propelled member 94 is oriented toward an outer side of the traveling course, priority is placed on path-switching toward the outer side. If no chance of the self-propelled member 94 interfering with an adjacent self-propelled member 94 is ascertained, an instruction for path-switching the course to a required direction is immediately issued.

Although the principal traveling speed is taken as a basic speed, a deceleration instruction is issued if there is a chance of occurrence of collision. A determination is made as to whether or not collision is impending, on the basis of a difference in the speed of a self-propelled member 94 of interest and the speed of a self-propelled member 94 running ahead or behind, and a distance between the self-propelled members 94. Here, a speed signal indicating a decelerated speed or a signal for instructing a reduction in speed may be issued. Moreover, principal traveling speed signals to be sent to the travel controllers 100 of the respective self-propelled members 94 may be transmitted collectively, or in several transmissions on a per-segment basis.

In reality, path-switching control and deceleration control are performed on the basis of sequential determination operation allowing for various requirements set forth. In principle, one race is carried out through path-switching control and deceleration control on the basis of the above-described requirements.

Figure 12:
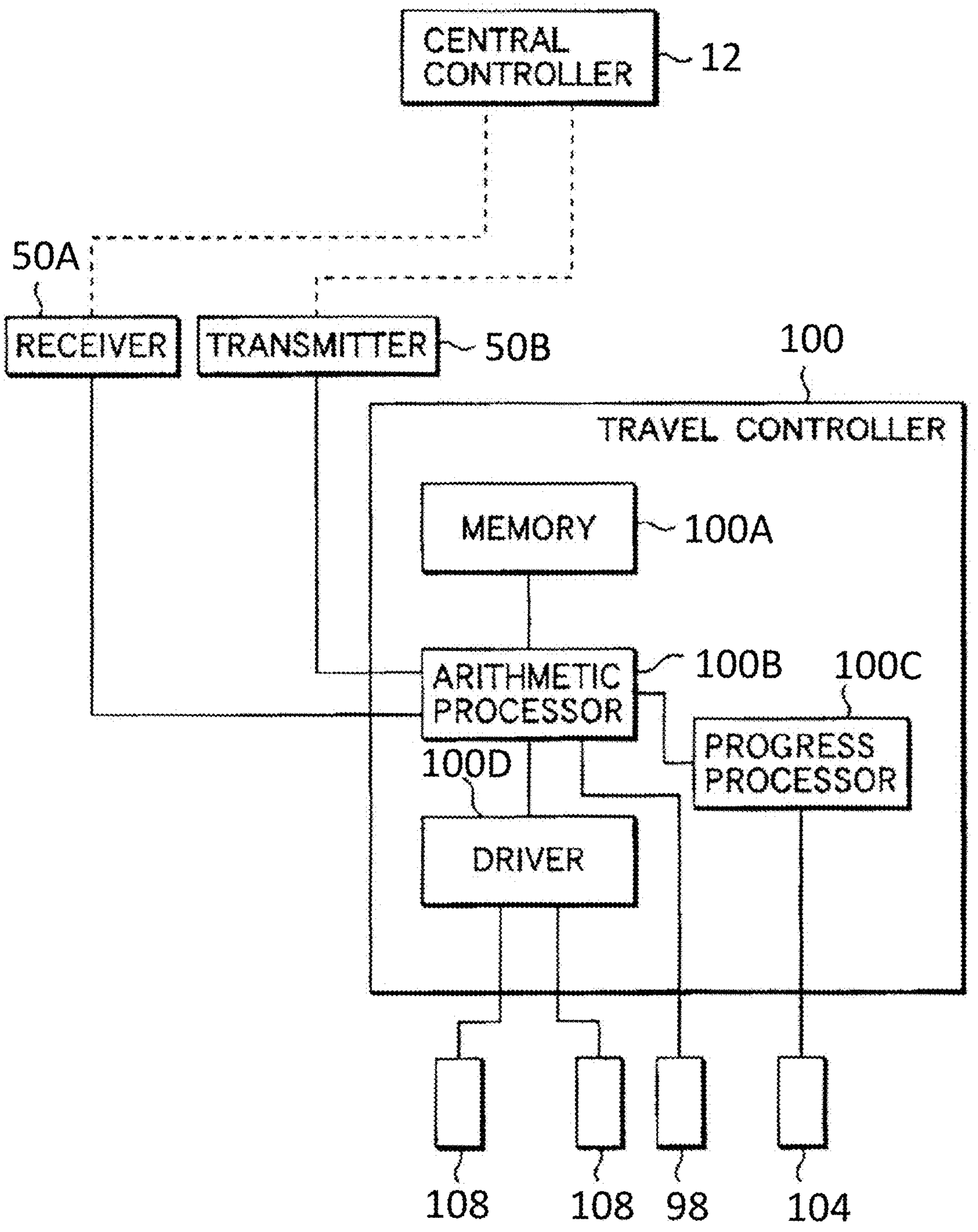
FIG. 12 is a block diagram of a portion of the central field unit, according to an embodiment of the present invention.
Figure 13:
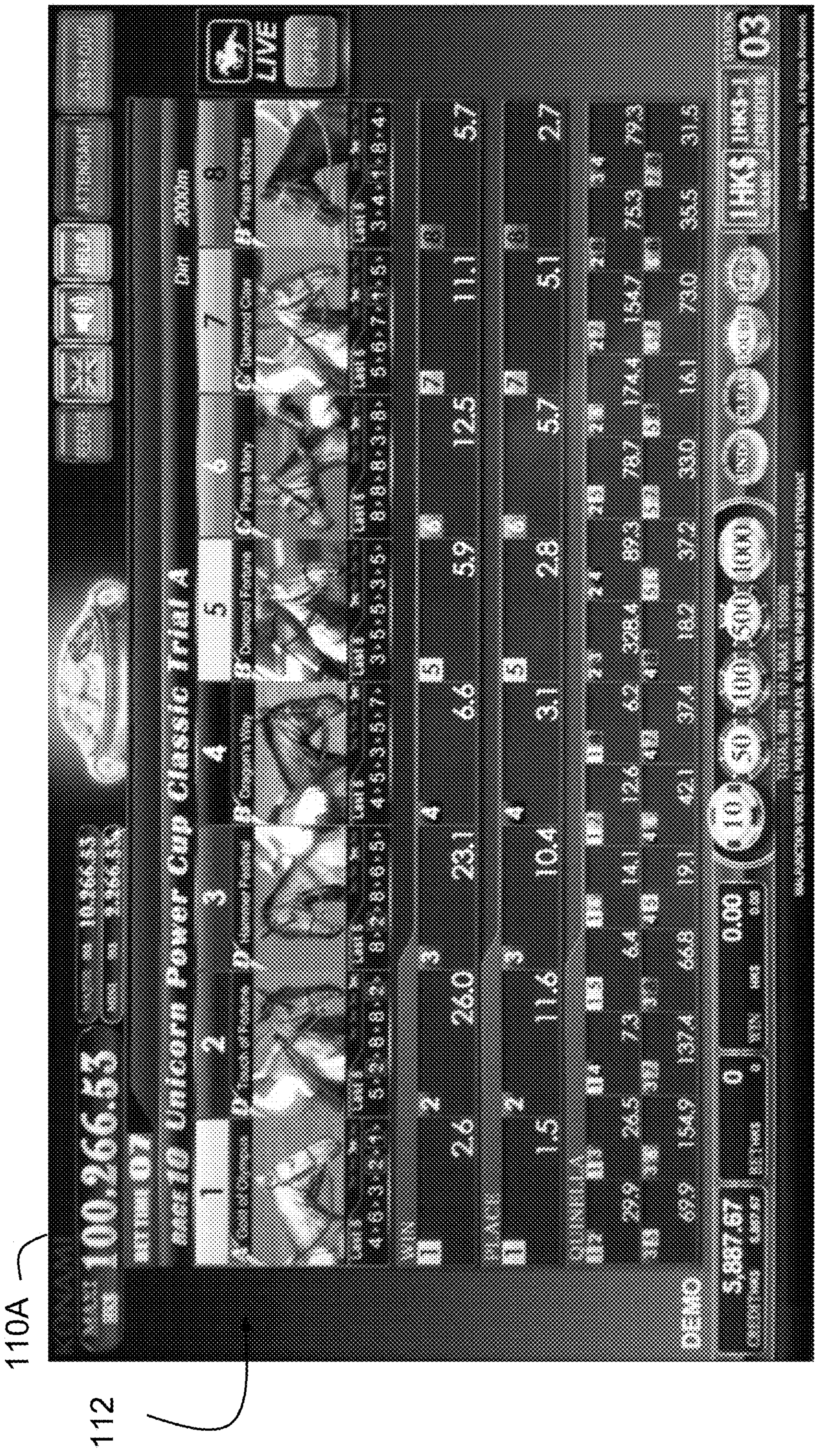
FIG. 13 is an exemplary screenshot during a bet phase of operation of the gaming system, according to an embodiment of the present invention.

The functions of the travel controller 100 of the self-propelled member 94 and those of the center control unit or controller 12 are shown in FIG. 12. The signal transmitted from the center control unit or controller 12 to the travel controller 100 of the self-propelled member 94 includes principal speed data corresponding to the characteristic of each miniature to be transmitted before a race is started, a signal for steering the self-propelled member 94 at the start of a race, and path-switching and deceleration signals to be issued during a race. Data pertaining to the principal speed to be employed for one race is output as principal traveling speeds for respective segments, provided that a race track is divided into a plurality of segments.

In the present embodiment, the entire race track for one race is divided into seven segments; namely, a straight segment between a starting line and the first corner; the first corner; the second corner; a straight segment between the second and third corners; the third corner; the fourth corner; and a segment between the fourth corner and a finish line. The principal traveling speed of the self-propelled member 94 does not always differ from one segment to another segment. The characteristic of a horse is represented by the number of segments. In view of simulation of a real horserace, provision of seven segments is sufficient.

A single principal traveling speed may be assigned to an individual self-propelled member 94. In this embodiment, the speeds of the self-propelled members 94 are controlled separately on a per-segment basis in accordance with the characteristics of the miniatures.

The information transmitted from the travel controller 100 of the self-propelled member 94 to the center control unit or controller 12 constitutes progress information.

The travel controller 100 of the self-propelled member 94 controls rotational speeds of right and left wheel drive motors 108 so as to cause the self-propelled member 94 to travel, while tracking a guideline 62 on the basis of the principal traveling speed signal. In response to a path-switching or deceleration instruction output from the center control unit or controller 12, the travel controller 100 accelerates or decelerates the wheel drive motors 108. If no path-switching or deceleration instruction is issued, the self-propelled member 94 travels at the traveling speed matching the principal traveling speed data on the basis of the characteristics of the self-propelled member 94 from the start to the finish while following a single guideline.

The travel controller 100 has memory 100A for storing information output from the center control unit or controller 12, a driver 100D for controlling and activating an arithmetic processor 100B and drive motors 108, and a progress processor 100C. The signal output from the center control unit or controller 12 is received by a receiver 50A, and required data is saved in the memory 100A.

The travel controller 100 receives guideline detection signals output from the three photodiodes 98 of the self-propelled member 94. In accordance with the detection signals, the travel controller 100 detects a rightward or leftward deviation from the guideline 62. The travel controller 100 causes the self-propelled member 94 to travel and follow the guideline 62 while correcting deviations therefrom. On the other hand, the progress processor 100C computes progress from a progression line 64 based on detection signal output from the hole sensor 104. The resultant progress information is sent to the center control unit or controller 12 by way of a transmitter 50B.

On the basis of the progress information items sent from the respective self-propelled members 94, the center control unit or controller 12 successively ascertains the condition of a group of participants/horses and, in accordance with the predetermined conditions for determination, makes a determination as to a necessity for path-switching a guideline or deceleration, thereby sequentially sending path-switching and deceleration signals to the respective self-propelled members 94.

The center control unit or controller 12 successively ascertains the condition of a group of horses and controls required path-switching operation or traveling speed on the basis of the thus-ascertained condition. Feedback of information about progress in a self-propelled member 94 to progress control is not required; the only requirement for enhancing the accuracy of progress tracking is to cause the center control unit or controller 12 or the controller provided in the self-propelled member 94 to perform feedback control.

Figure 9A:
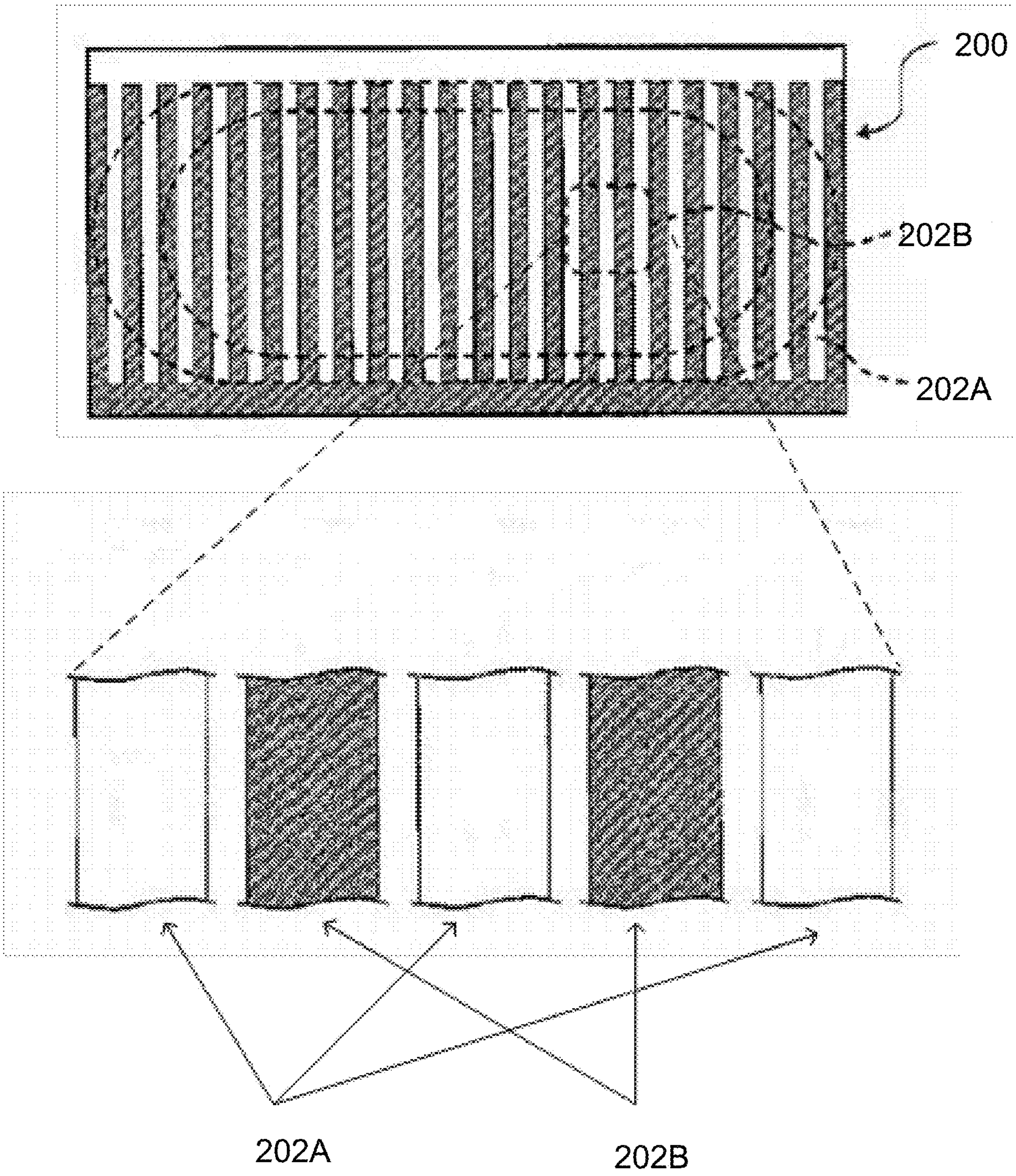
FIG. 9A is a diagrammatic illustration of a power feed plate located on a lower side of an upper field of the center field unit, according to an embodiment of the present invention.

With reference to FIG. 9A, in one aspect of the present invention, a power feeder plate 200 provides power to the self-propelled members 94. In the illustrated embodiment, the race units 52 may be miniature horse figures which perform on a miniature racetrack on the center field unit 18. Each race unit 52 is magnetically coupled to one of the self-propelled members 94 housed in the center field unit 18. In the embodiment shown in FIG. 9A, the self-propelled members 94 are supplied power from the power feeder plate 200 housed in the center unit. The power feeder plate 200 may be mounted on the lower side or surface of the upper field 54 and includes multiple anode-lines 202A and cathode-lines 202B. The anode-line 202A and the cathode-line 202B are alternately disposed on the surface of the upper field with a constant distant. For example, each line may have a width of 8 mm, and the distant between the anode-line and the cathode line may be 2.5 mm.

The self-propelled members 94 receive power from the power feeder plate 200 via power receiver pins. At least one of the power receiver pins touches one of the anode-lines 202A, and further at least one of the power receiver pins touches one of the cathode-lines 202B, at any time, as the self-propelled member 94 travels under the power feeder plate 200.

Figure 9B:
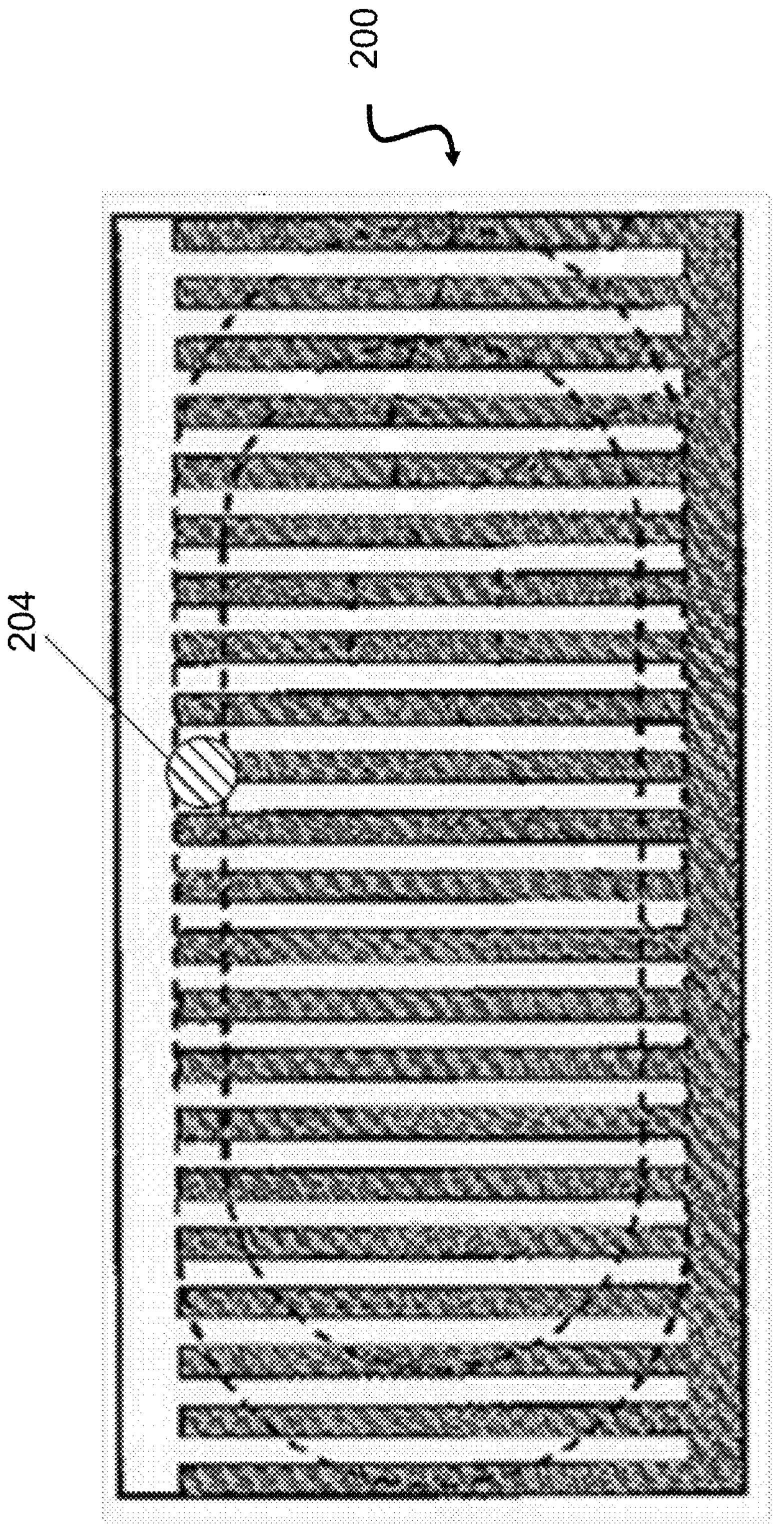
FIG. 9B is a diagrammatic illustration of the power feed plate of FIG. 9A having a fault condition.

With reference to FIGS. 9B-9M, in one embodiment of the present invention a cleaning system 210 may be provided to clean a contact surface of the power feeder plate 200. As the self-propelled members 94 move the power receiver pins of the self-propelled members 94 scrape against the power feeder plate 200. This may mar the surface of the power feeder plate 200 allowing dust, debris or other contaminants to adhere to the power feeder plate 200. When the power feeder plate 200 gets filthy or dirty, the power feeder plate 200 may not be able to supply electricity effectively to the self-propelled members 94. FIG. 9B illustrates an exemplary area 204 in which power cannot be efficiently or effectively supplied to the self-propelled members 94.

In general, the cleaning system 210 operates below the power feeder plate 200 and wipes the contact surface of the power feeder plate 200 with a wiping cloth and cleaner solution automatically. As a result, debris and dust may be removed from the contact surface of the power feeder plate 200. Accordingly, the risk of contact failure on the power feeder plate 200 may be reduced and the power feeder plate 200 can thus, effectively and efficiently supply electricity to the self-propelled member 94.

Figure 9C:
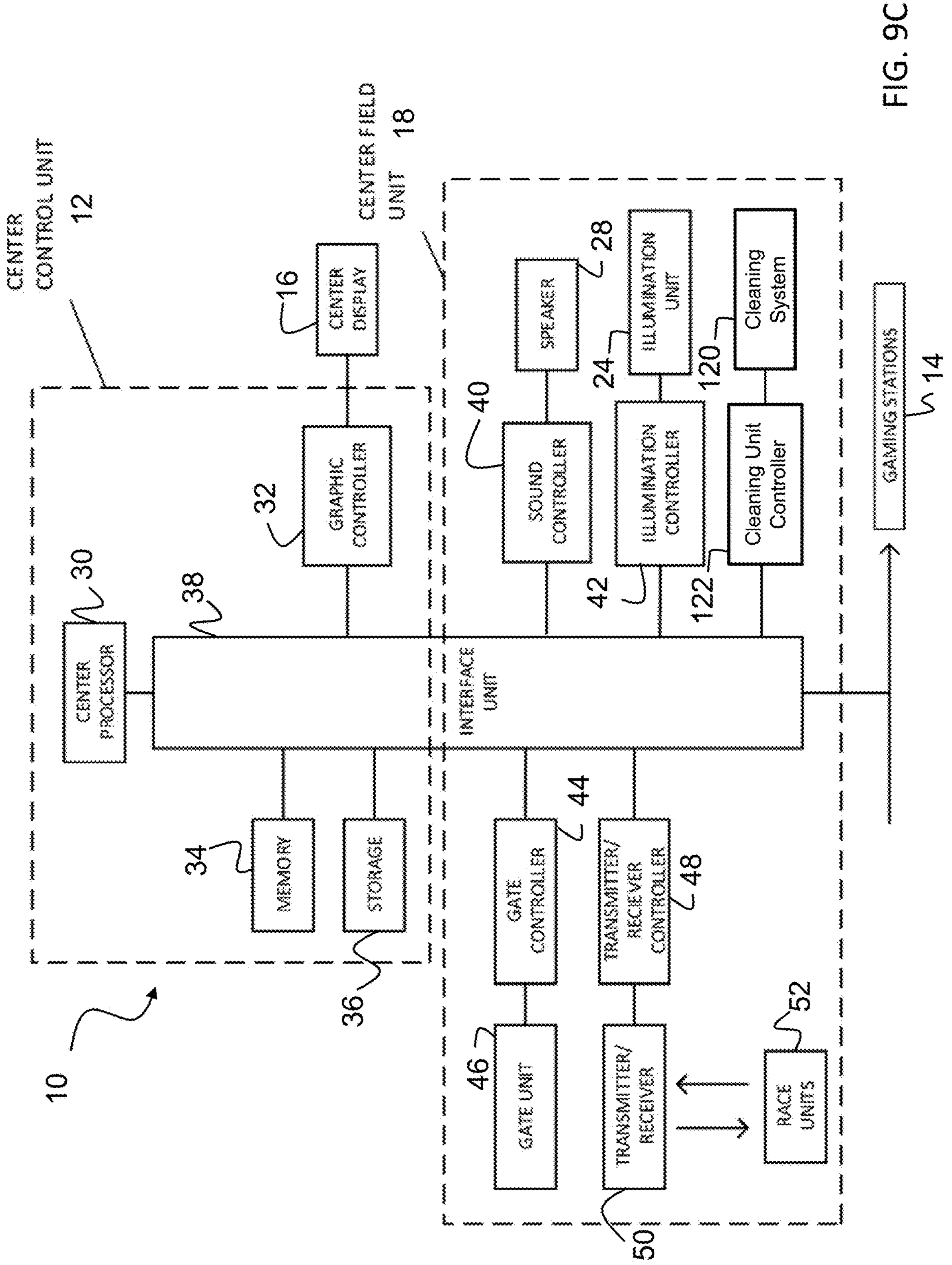
FIG. 9C is a hardware diagram of a central control unit with a cleaning unit, according to an embodiment of the present invention.

A revised block diagram of the center control unit 12 and the center field unit 18 is shown in FIG. 9C. The center field unit 18 may further include a cleaning system 120. As discussed in further depth below, the cleaning system 120 may include one or more cleaning units 124. The cleaning units 124 may be controlled by the center processor 30 via a cleaning unit controller 122. The center processor 30 sends commands to the cleaning unit controller 122 to control the cleaning unit(s) 124 at a predetermined time or times or in response to a specific operation performed by a person, e.g., service personnel. As discussed in further detail below, the cleaning unit controller 122 controls the cleaning unit(s) 124 according to the commands received from the center processor 30.

Figure 9D:
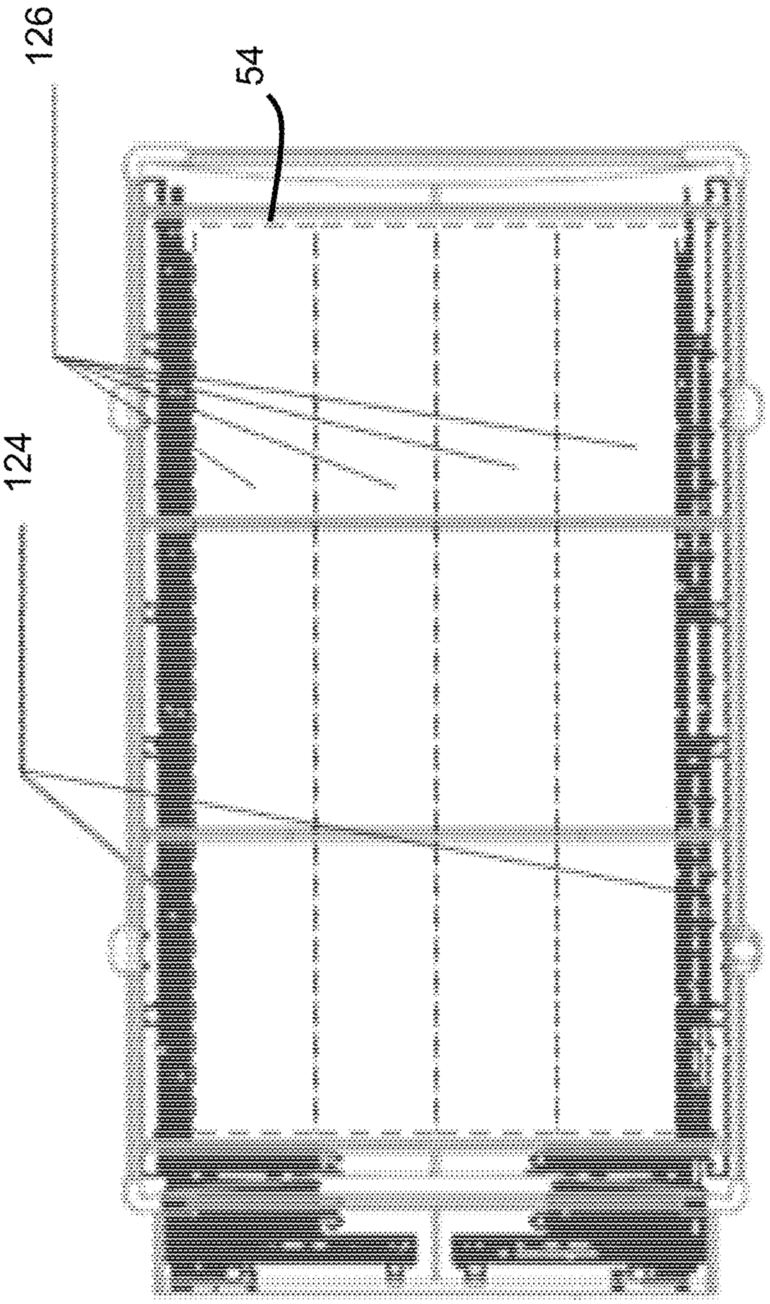
FIG. 9D is a top view of a cleaning system mounted between an upper field and a lower field of the center field unit, according to an embodiment of the present invention.
Figure 9E:
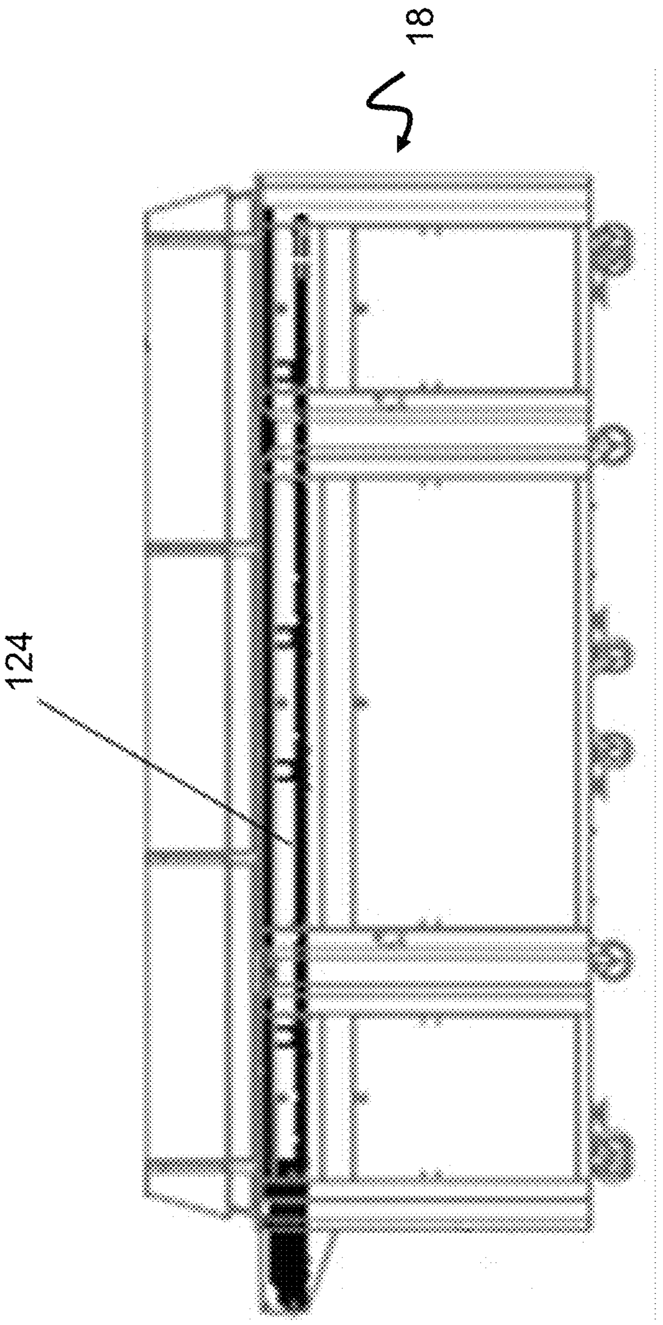
FIG. 9E is a side view of the cleaning system of FIG. 9D.

In the illustrated embodiment, the cleaning system 120 includes two cleaning units 124 mounted between the upper field 54 and the lower field 56 of the center field unit 18. The power feeder plate 200 is mounted on a lower side or surface of the upper field 54. With specific reference to FIG. 9D, the upper field 54 has four cleaning lanes 126 (indicated by the dashed lines. With reference to FIGS. 9C and 9D, the cleaning units 124 are mounted in the center field unit 18 and each cleaning unit 124 moves/cleans one half of the power feed plate 200, i.e., two of the four cleaning lanes 126.

Figure 9F:
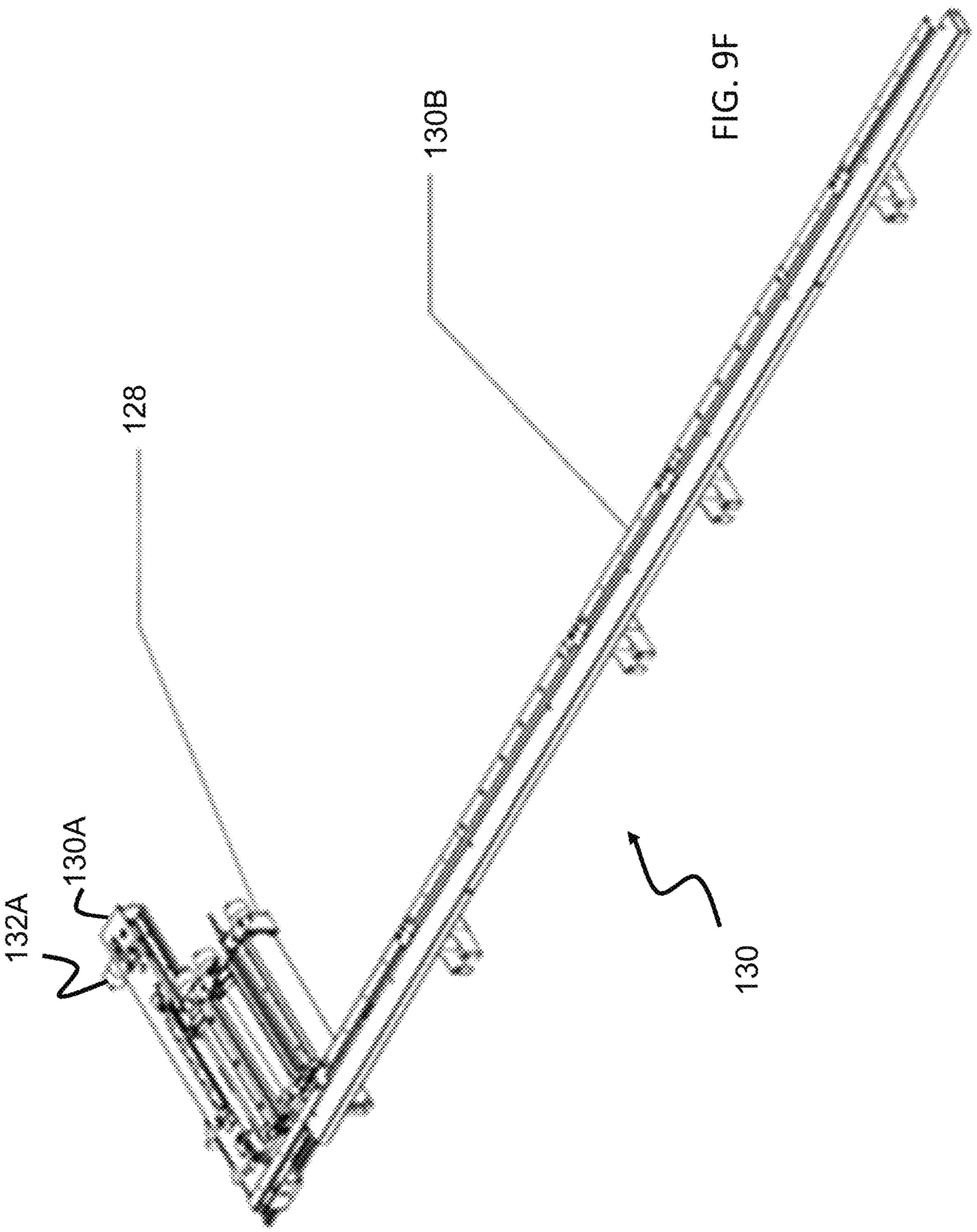
FIG. 9F is a perspective view of a portion of the cleaning system including a main body of a cleaning unit and a portion of an XY-table, according to an embodiment of the present invention.
Figure 9G:
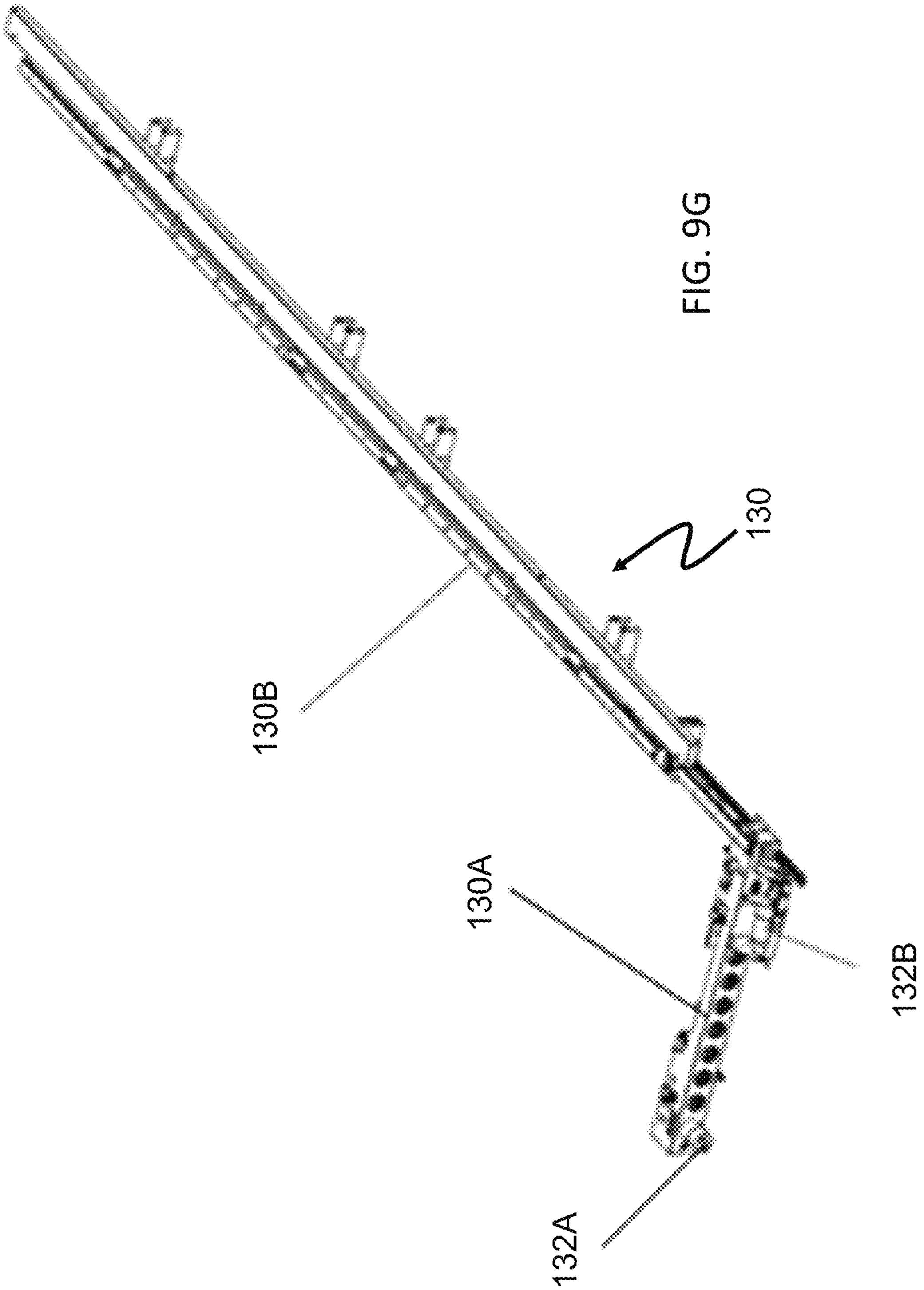
FIG. 9G is a second perspective view of the portion of the cleaning system of FIG. 9F.
Figure 9H:
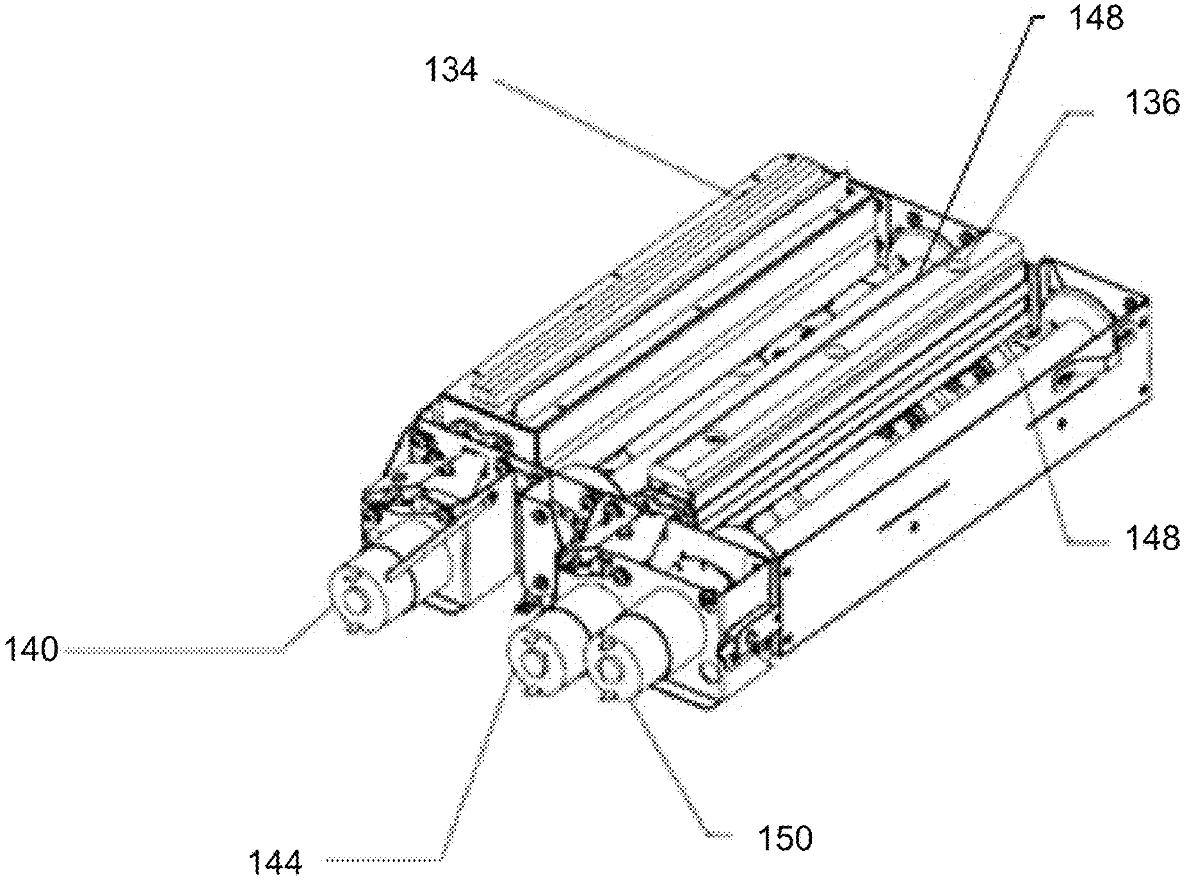
FIG. 9H is an upper perspective view of a main body of a cleaning unit, according to an embodiment of the present invention.
Figure 9I:
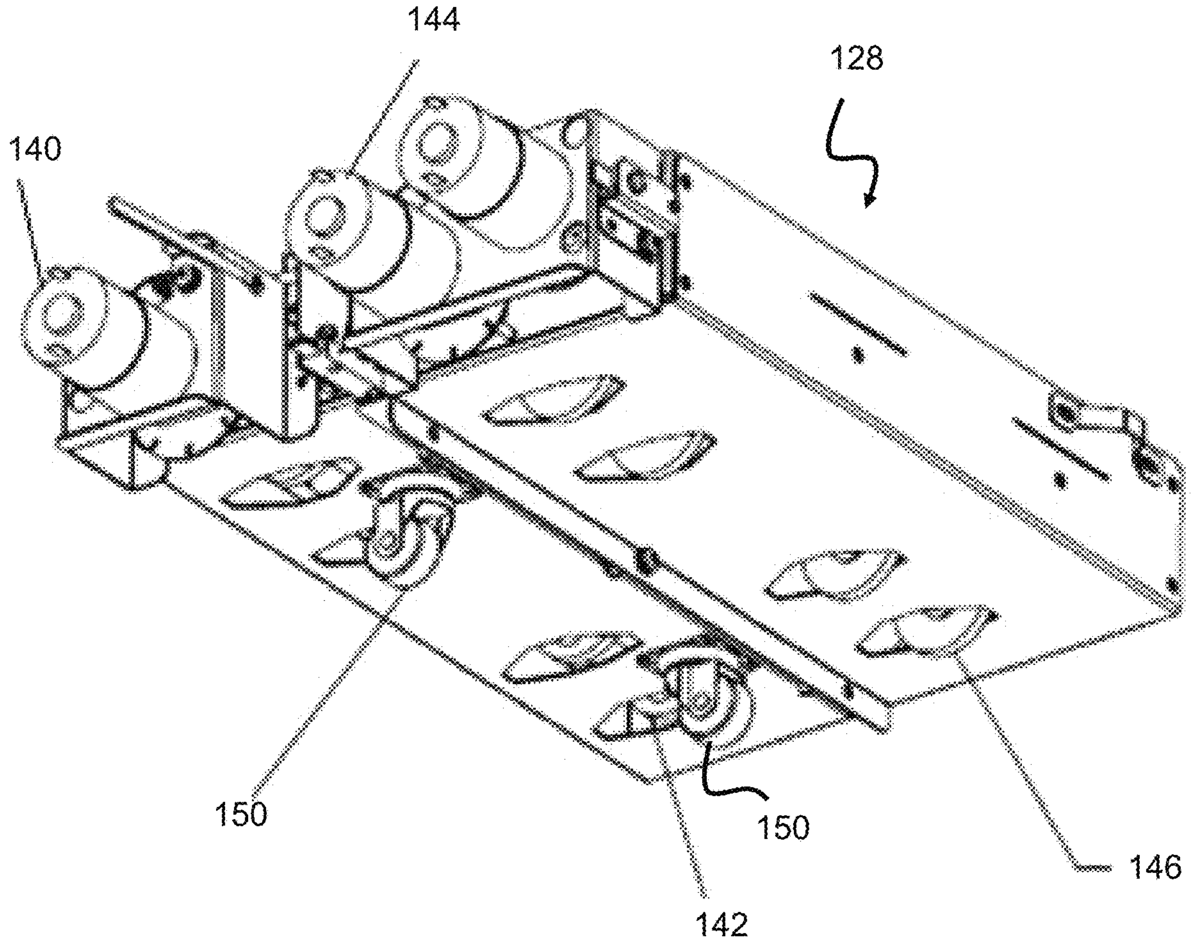
FIG. 9I is a lower perspective view of the main body of the cleaning unit of FIG. 9H.
Figure 9J:
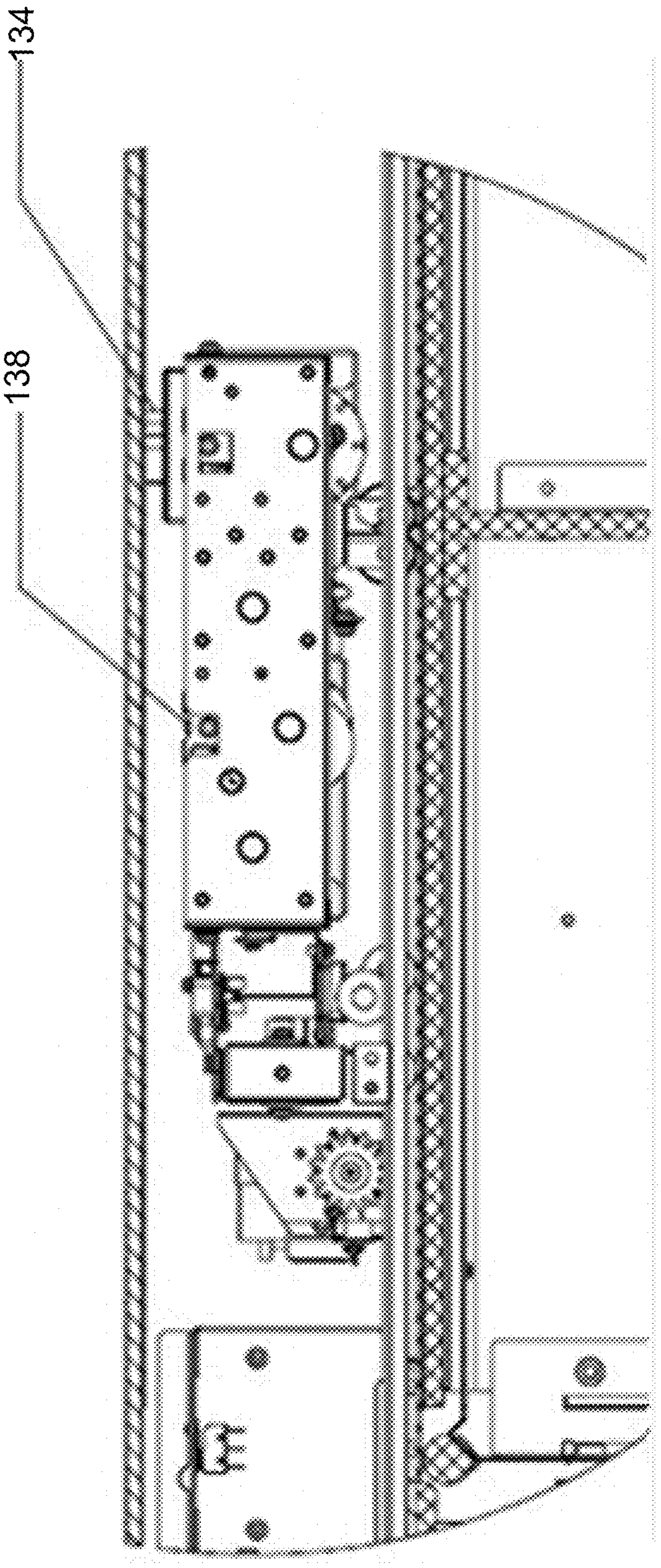
FIG. 9J is a side view of the main body of the cleaning unit of FIG. 9H during use.
Figure 9K:
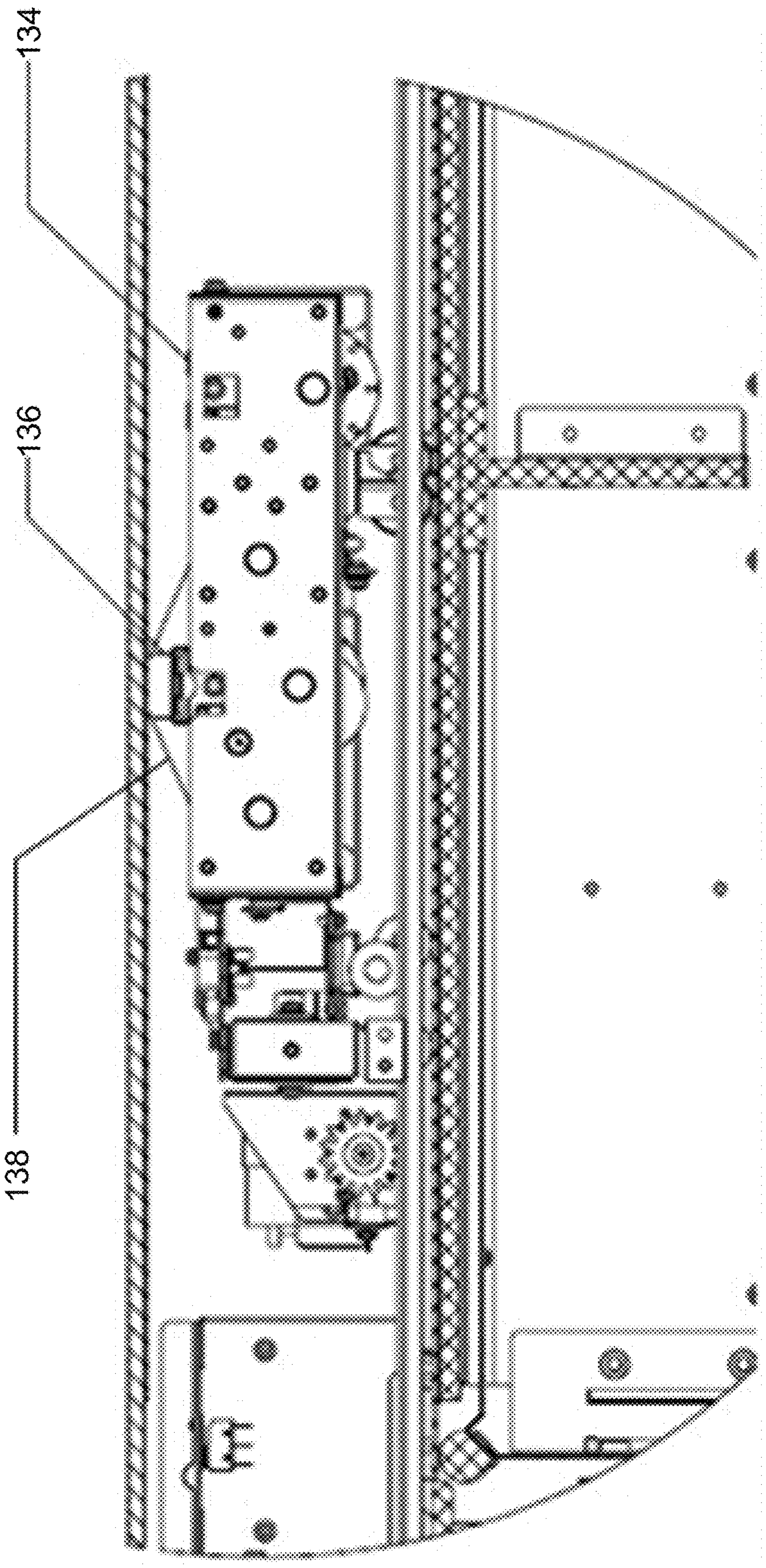
FIG. 9K is a second view of the main body of the cleaning unit of FIG. 9I during use.

With reference to FIGS. 9F and 9G, each cleaning unit 124 includes a main body 128 and an XY table 130. The XY table 130 includes an X-axis rail 130A and a Y-axis rail 130B and the X-axis rail 130A moves along the Y-axis rail 130B. A first motor 132A, mounted on the X-axis rail 130A, is adapted to move the main body 128 in two directions along the X-axis rail 130A. The first motor 132A drives a gear which interfaces with a movable "toothed" track which is fixed on the main body 128 and the main body 128 moves with the movable "toothed" track along the X-axis rail 130A. A second motor 132A, mounted on the X-axis rail 130A, is adapted to move the X-axis rail 130A with the main body 128 in two directions along the Y-axis rail 130B. The second motor 132A drives a gear which interfaces with a static "toothed" track which is fixed on the Y-axis rail 130B and the X-axis rail 130A moves with the main body 128 along the Y-axis rail. As discussed below, the first and second motors 132A, 132B may be controlled by the center processor 30 via the cleaning unit controller 122 to move along associated cleaning lanes 126.

Under control of the center processor 30, the main body 128 of each cleaning unit 124 moves along the X-axis rail 130A and Y-axis 130B rail when the main body 128 cleans the power feeder plate 200. The two motors 132A, 132B are mounted on the XY-table 130 to move the main body 128 along each rail 130A, 130B.

The cleaning unit 124 traverses the cleaning lanes 126 and performs three operations: (1) removes debris and dust from the power feeder plate 200, (2) applies a cleaner solution, and (3) removes excess cleaner solution. With reference to FIGS. 9H-9K, the main body 128 of each cleaning unit 124 includes an application pad 134, a wiping pad 136 and a wiping cloth 138. As the main body 128 traverses the cleaning lane 126, the application pad 134 applies a cleaner solution to the power feeder plate 200. The wiping pad 136 and wiping cloth 138 are used to remove dust and debris from the power feed plate 200 and to remove excess cleaner solution. In one embodiment of the present invention the cleaning unit 124 traverses each cleaning three times. In a first pass, the wiping pad 136 and wiping cloth 138 are used to remove dust and debris from the power feeder plate 200. In a second pass, the application pad 134 is used to apply cleaner solution to the power feeder plate 200. In a third pass, the wiping pad 136 and the wiping cloth 138 are used to remove excess cleaner solution from the power feeder plate 200.

In the illustrated embodiment, the wiping cloth 138 is positioned on top of the wiping pad 136. The wiping pad 136 moves in an upward direction (from the main body 128 towards the power feeder plate 200) to press the wiping cloth 138 into contact with the surface of the power feeder plate 200.

The application pad 134 is moved upward by a combination of an application pad motor 140 and an application pad disc cam 142 when the application pad 134 applies the cleaner solution to the surface of the power feeder plate 200. The application pad motor 140 for moving the application pad 134 vertically is controlled by the cleaner unit controller 122.

The wiping pad 136 and the wiping cloth 138 are moved upward by a combination of a wiping pad motor 144 and a wiping pad disc cam 146 when the wiping cloth 138 removes debris and dust from the surface of the power feeder plate 200 or it levels off the amount of the cleaner solution on the surface of the power feeder plate 200.

In one embodiment, the wiping cloth 138 is provided in a roll form on a first rotor 148 which may be rolled out (and gathered on an opposite rotor 148). A wiping cloth motor 150 may be provided for rotating the rotors 148 to spool/unspool the wiping cloth 138. The wiping pad motor 144 for moving the wiping pad 136 vertically and the wiping cloth motor 150 for rolling up the wiping cloth 138 are controlled by the cleaning unit controller 122. A pair of casters 152 allow the main body 128 to move along the Y-axis rail 130B.

Figure 9L:
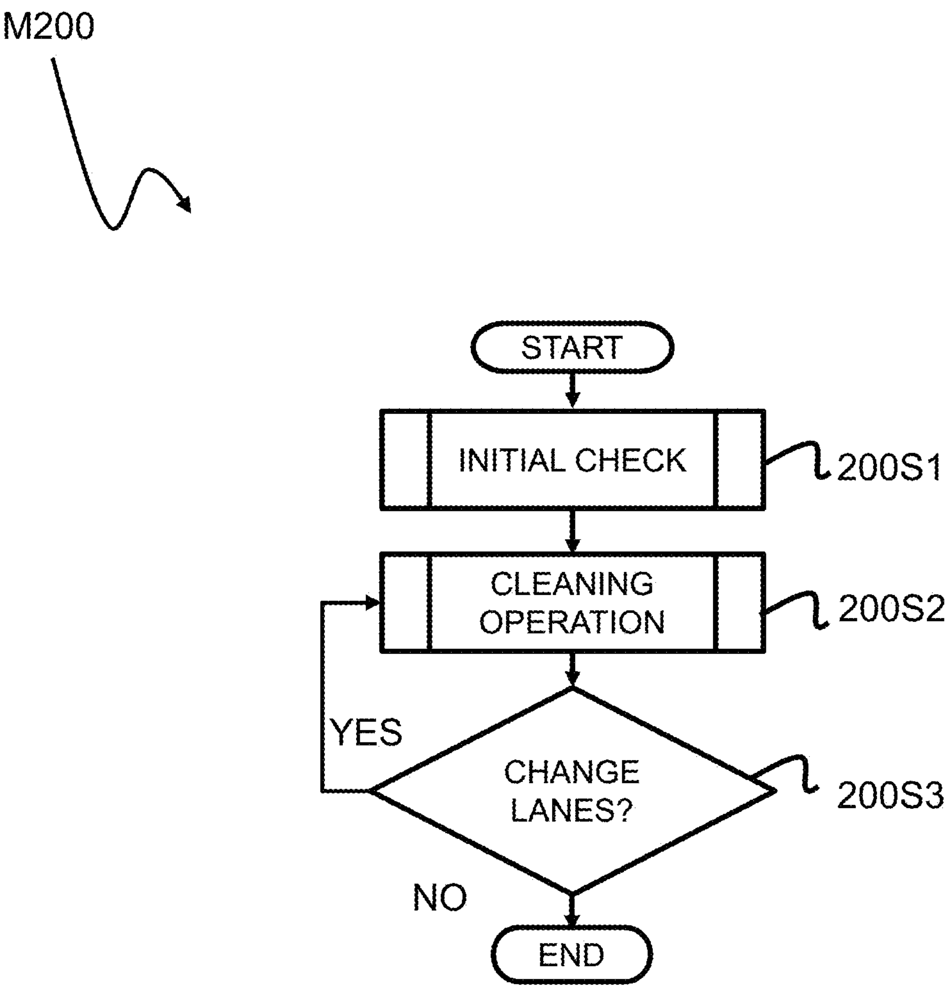
FIG. 9L is a first flow diagram of a cleaning process associated with the cleaning system of FIG. 9D.

With reference to FIG. 9L, an overall method M200 of a cleaning process using the cleaning system 210 is shown. In a first step 200S1, each component of the cleaning system 210 is checked to confirm that it moves/operates properly. In a second step 200S2, the surface of the power feeder plate 200 is cleaned by using the wiping pad 136, the wiping cloth 138 and the application pad 134. In a third step 200S3, the cleaning unit 124 is moved to the next lane if another lane needs to be cleaned and the method 200M returns to the second step 200S2. Otherwise, the method 200M ends.

Figure 9M:
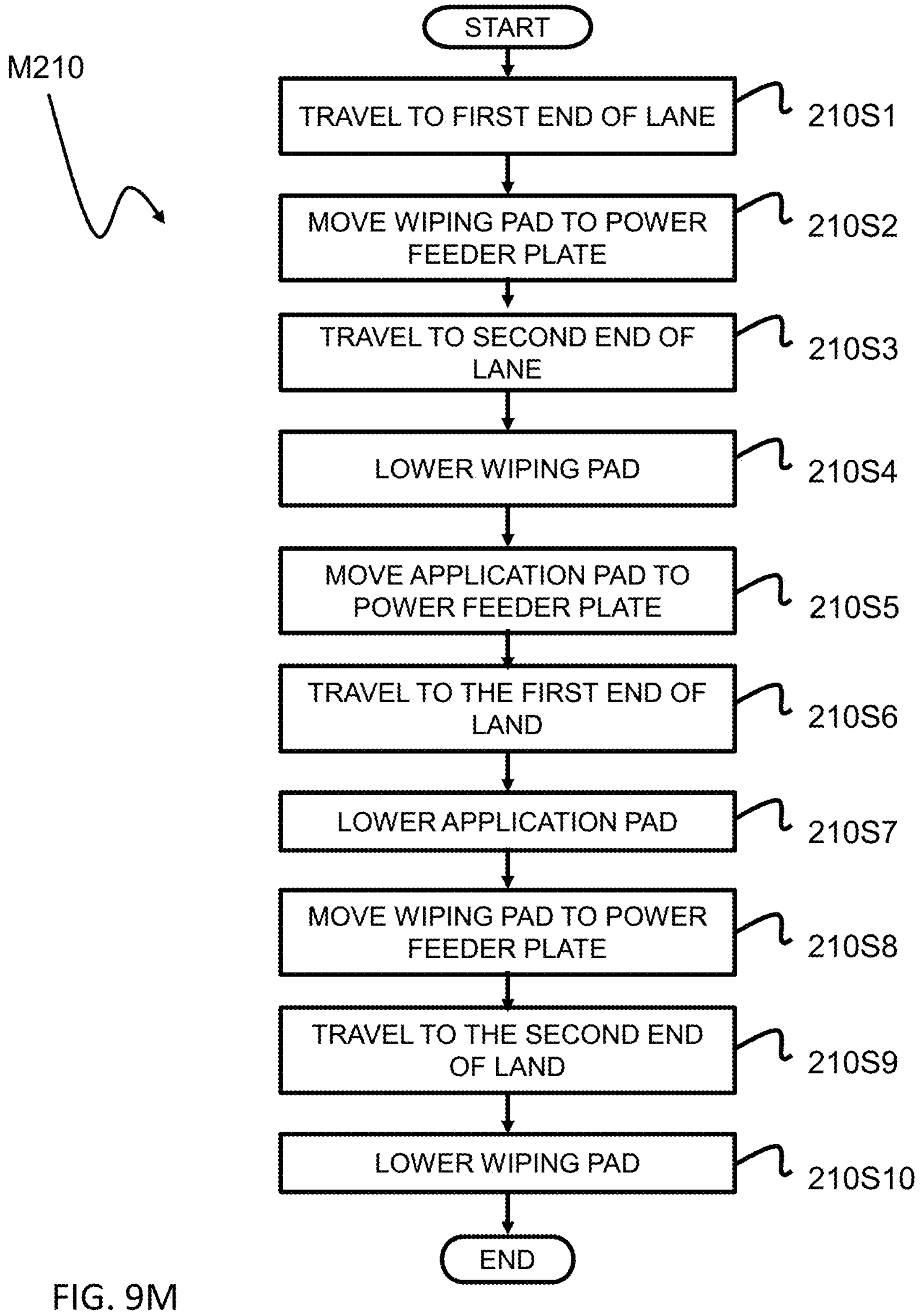
FIG. 9M is a second flow diagram of the cleaning process associated with the cleaning system of FIG. 9D.

With reference to FIG. 9M, the general process of the cleaning process in step 200S2 is shown. In a first step 210A1, the cleaning unit 124 is moved to an end point (the first end) of the lane 126. In a second step 210S2, the wiping pad 136 is moved upward by the wiping pad motor 144 until the wiping pad 136 is in contact with the power feeder plate 200. In a third step 210S3, the cleaning unit 124 is moved to the opposite end (the second end) of the lane 126 to remove dust and debris from the power feeder plate 200. Once the cleaning unit 124 reaches the second end of the lane, the wiping pad 136 is lowered in a fourth step 210S4.

In a fifth step 21055, the application pad 134 is raised by the application pad motor 140 until the application pad 134 is in contact with the power feeder plate 200. In a sixth step 210S6, the cleaning unit 124 is moved to back to the first end of the lane 126 to apply cleaner solution. Once the cleaning unit 124 reaches the first end of the lane 126, the application pad 134 is lowered in a seventh step 210S7. In an eighth step 210S8, the wiping pad 136 is moved upward by the wiping pad motor 144 until the wiping pad 136 is in contact with the power feeder plate 200. In a ninth step 210S9, the cleaning unit 124 is moved to the second end of the lane 126 to remove excess cleaner solution from the power feeder unit 200. In a tenth step 210S10, the wiping pad 136 is lowered.

With reference to FIGS. 13-16, a set of exemplary of screen shots during different phases of operation of the present invention according to an embodiment are shown. With specific reference to FIG. 13, an exemplary screenshot 110A during a "bet" or "wager" phase, during which each gaming station 14 is able to receive a bet or wager from the player is shown. As shown, the wager screenshot 110A includes a list 112 of the horses running in the race for which wagers are being taken. In the illustrated embodiment, the list 112 includes the horses in the race, a graphic or picture of the horse, and the results of the last races run by the horse. As indicated above, the horses in the race may be selected from different groups of horses. The groups may be indicative of the rank of the horse, for example, S, A, B, C, D group. Horses in higher ranking groups have a higher probability of winning. The listing may also include an indication of a type associated with of each horse, e.g., a front-runner or a follow-up runner, etc.

In the illustrated embodiment, the player can place a bet on a horse by selecting the horse (horse 1-8) and the betting position (win or place). The player selects the amount of the wager selecting one of coins displayed on the display (10, 50, 100, etc.). The player can place a bet by dragging the selected coin to the betting position which includes "WIN", "PLACE", "QUINELLA". In the illustrated embodiment, the display shows the odds of each betting position. In one embodiment, the main game may consist of one or more preliminary races and a final race.

For the preliminary race(s), the eight horses participating in the race can be determined randomly. In the preliminary race, the eight horses are selected randomly from each rank of horse group (S, A, B, C, D). The number of horses for each rank can be determined randomly.

Figure 14:
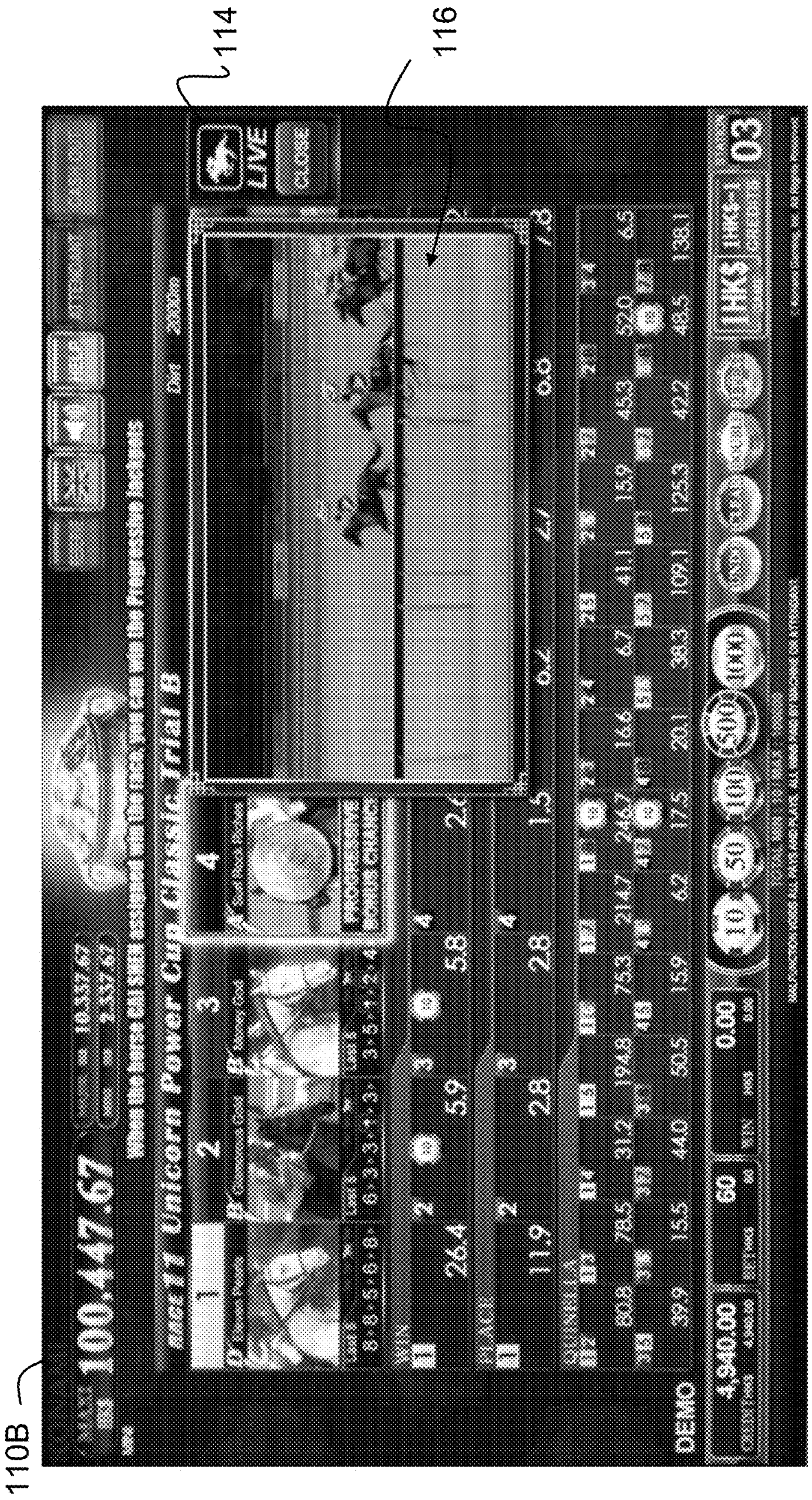
FIG. 14 is an exemplary screenshot during a race phase of operation of the gaming system, according to an embodiment of the present invention.

With specific reference to FIG. 14, an exemplary screen shot 110B during a race stage or phase is shown. The race phase presents or shows the progression of the race by displaying a race movie on the displays 82 of the individual gaming stations 14 and/or the center display 16 and using the race units 52 on the center field unit 18. After the players have made wagers and the race has started, a "LIVE" button 114 is used to display the race video 116 on the display 82 of the respective gaming station 14. The live video of the race may also be displayed on the center display 16. In one embodiment, a number symbol of each horse can appear in the race video which helps the player to recognize a position of each horse.

In one embodiment, a first part of the video is produced by the center graphic controller 32 before an end of the betting phase based on information of the horses without referring to the race result. A second part of the video is produced after the race result is generated based on the information of the horses and the race result.

Figure 15:
FIG. 15 is an exemplary screenshot during a result display phase of operation of the gaming system, according to an embodiment of the present invention.

With specific reference to FIG. 15, an exemplary screen shot 110C during a "Result Display Phase" is shown. There is a stage to show the result of the race on the gaming stations 14 and the center display 16. In one embodiment, the horses that took the 1st and the 2nd place in the preliminary race can proceed to the final race. The final race starts after two preliminary races are completed.

Figure 16:
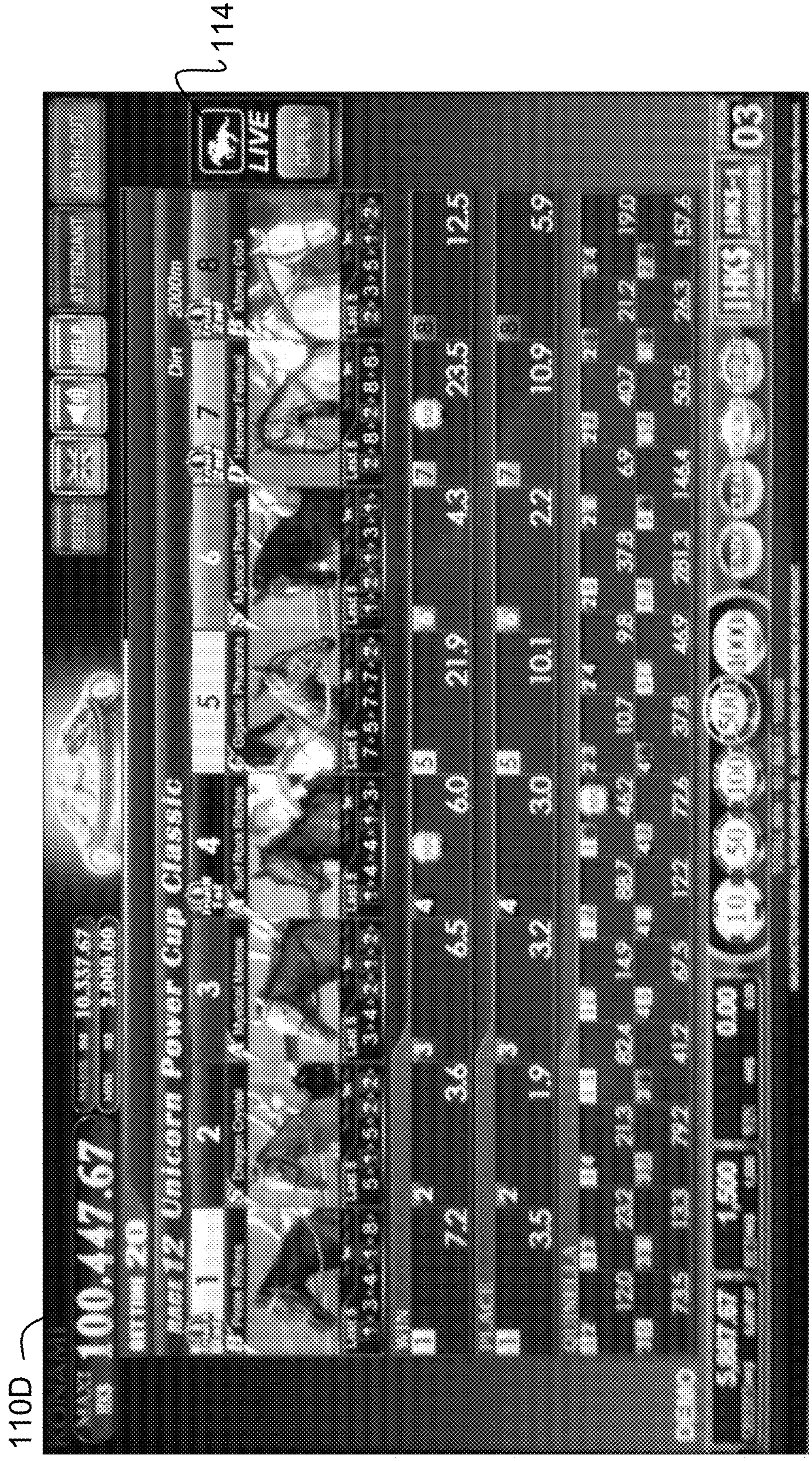
FIG. 16 is an exemplary screenshot during a bet phase of a final race of operation of the gaming system, according to an embodiment of the present invention.

With specific reference to FIG. 16, an exemplary screen shot 110D during a wager or bet phase of the final race is shown. In the final races, the top two horses from the two preliminary races are entered. Four additional horses are determined randomly without an additional preliminary race. In one embodiment, the four horses are selected from groups of higher ranks (S, A, B). In a final race betting phase, the horses that took the 1st and the 2nd place in the preliminary race may be identified with particular symbols (ex. Trial A 1st, Trial B 2nd etc.).

Figure 17A:
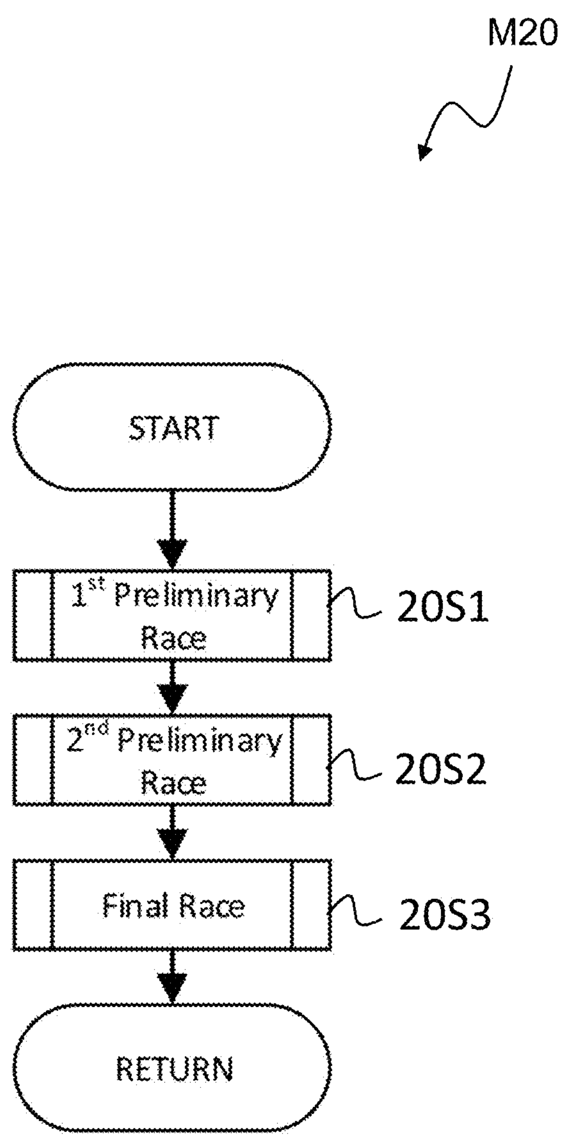
FIGS. 17A-17F are portions of a flow chart describing the operation of the gaming system of FIG. 1, according to an embodiment of the present invention.

With reference to FIGS. 17A-17F, flow diagrams of the operation of the system 10 and associated methods M20-M70, according to an embodiment of the present invention, are shown. With reference to FIG. 17A, in one embodiment each game (including the main game and any bonus game awarded) includes two preliminary races and a final race. In a first step 20S1 of the method M20, the first preliminary race is run. In a second step 20S2, the second preliminary race is run. And in a third step 20S3, the final race is run.

Figure 17B:
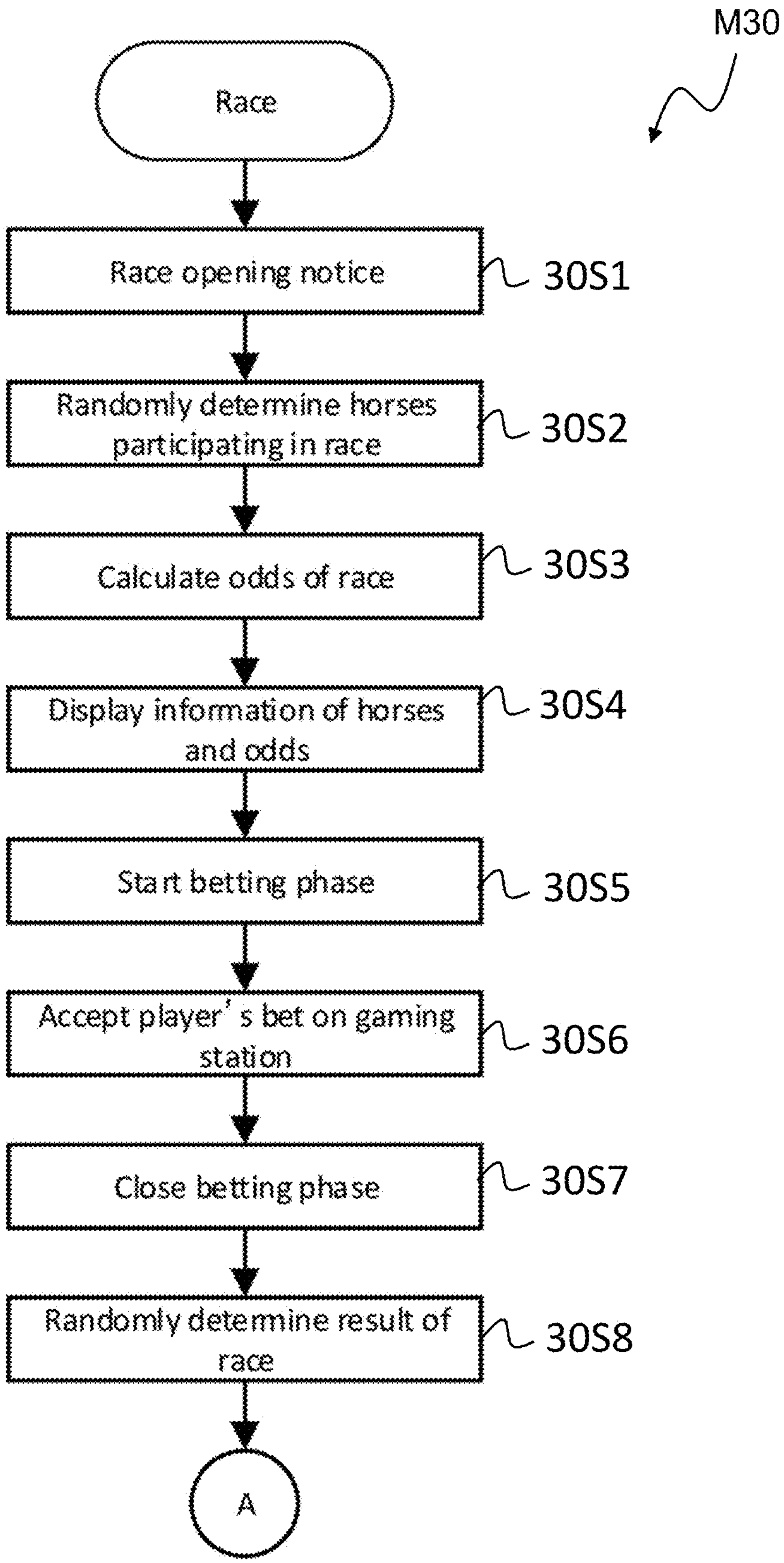
Figure 17C:
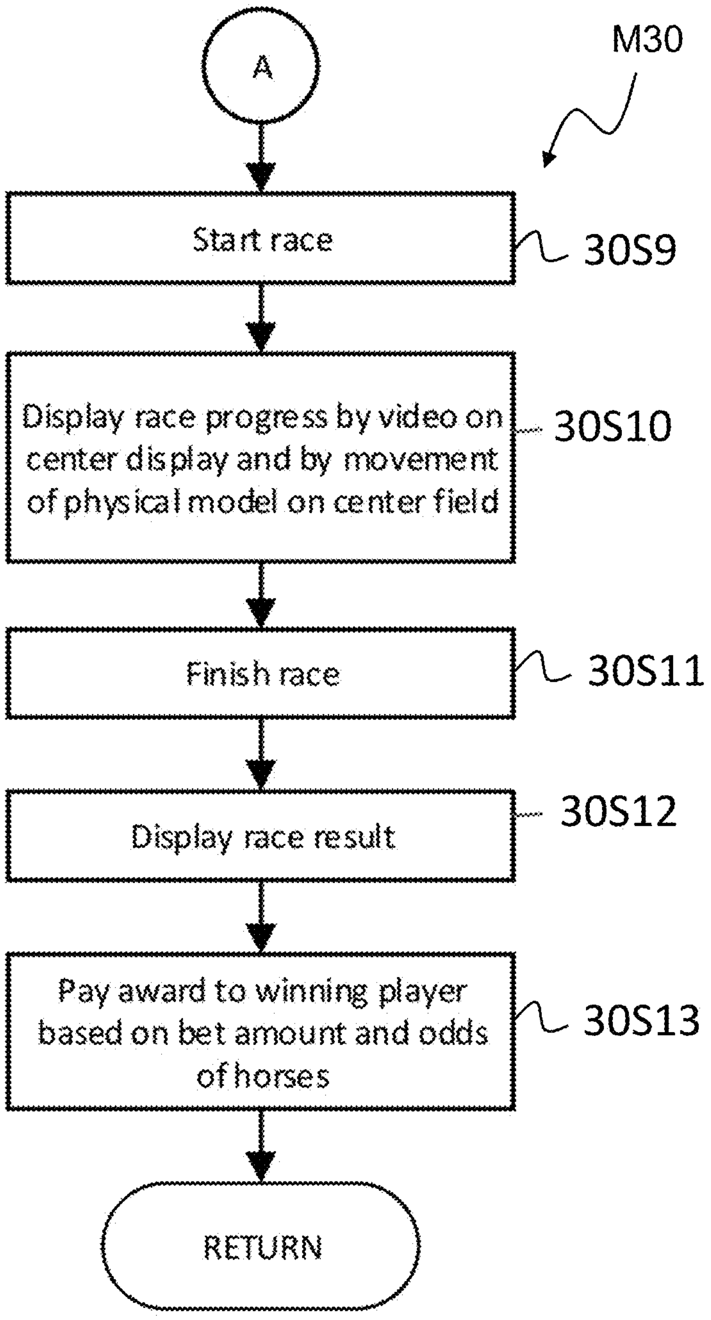

With reference to FIGS. 17B and 17C, a method M30 associated with each race, i.e., the preliminary races and the final race, is shown. In a first step 30S1, a race opening notice or animation is displayed on the display 82 of each gaming station 14 and/or the center display 16 of the center control unit 12. In a second step 30S2, the horses participating in the subject race are determined. Each horse has a set of parameters. Some of the parameters may be fixed, and other parameters may be based on previous race results. In a third step 30S3, the odds associated with each participant/horse based on the parameters of each horse are determined. The participants or horses participating in the race are displayed, along with information related to the participants, and the odds are displayed on the display 82 of each gaming station 14 and the center display 16 in a fourth step 30S4.

In a fifth step 30S5, the betting phase is started. In a sixth step 30S6, wagers or bets from the players on respective gaming stations 14 are accepted. The betting phase is closed in a seventh step 30S7. The results of the race are determined in an eighth step 30S8.

In a ninth step 30S9, the race is started. In a tenth step 30S10, the race progress is displayed as video on the center display 16 and/or the displays 82 of the gaming stations 14. Additionally, the race progress is reflected by movement of the race units 52. The race is finished in the eleventh step 30S11. The race results are displayed on the center display 16 and/or the displays 82 of the gaming stations 14 in a twelfth step 30S12.

In general, the horses in the preliminary races are selected randomly from each rank of horse group (S, A, B, C, D). In the final race, a part of the horses for the preliminary race are selected based on the result of the preliminary race, e.g., the winning horses of the preliminary race, and any remaining horses are selected randomly from the higher ranks of horse groups (ex. S, A, B) which did not participate in the preliminary race.

Figure 17D:
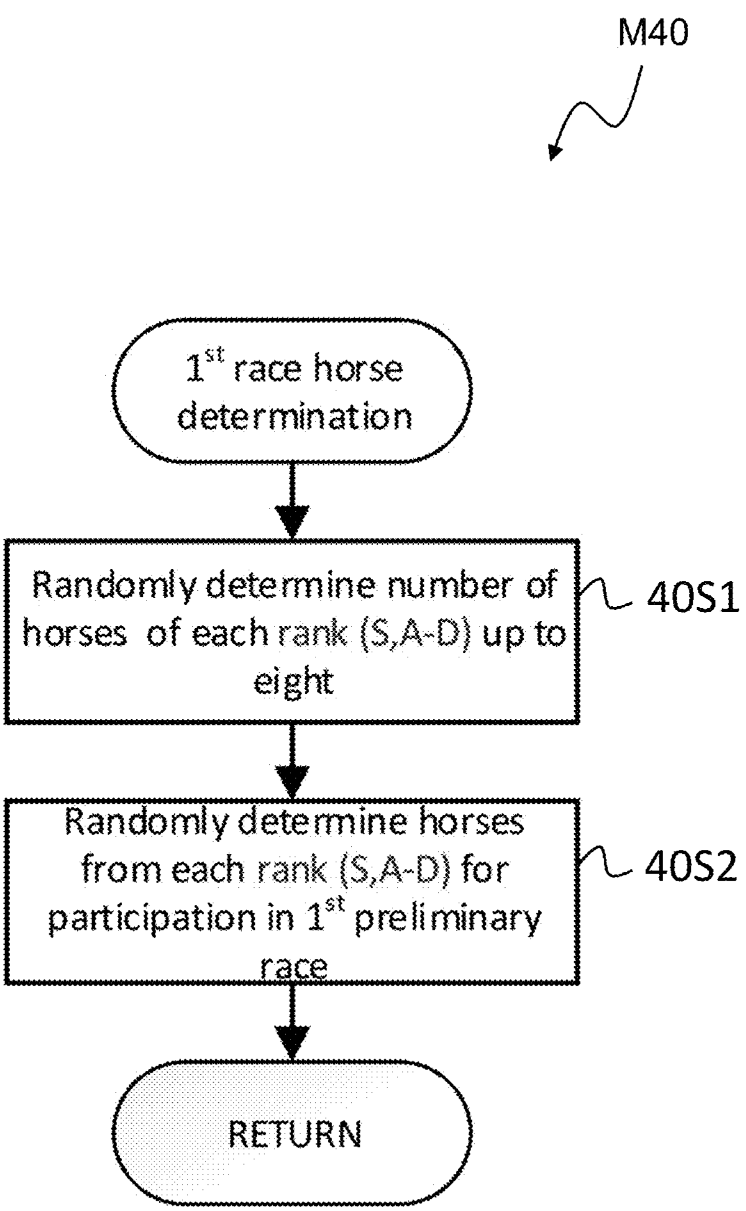

With reference to FIG. 17D, a method M40 for determining the participants or horses in the first preliminary race is shown. In a first step 40S1, the number of participants or horses from each rank is randomly determined. For example, in one embodiment, there are five ranks or horses: S, A, B, C, and D. The number of horses from each rank are as follows:

S->0 horse
A->1 horses
B->3 horses
C->3 horses
D->1 horses

In one embodiment, there are 5 ranks or groups of participants (S and A-D). In the illustrated embodiment, there are up to 8 participants or horses in the first preliminary race. In a second step 40S2, the horses from each rank are randomly determined.

Figure 17E:
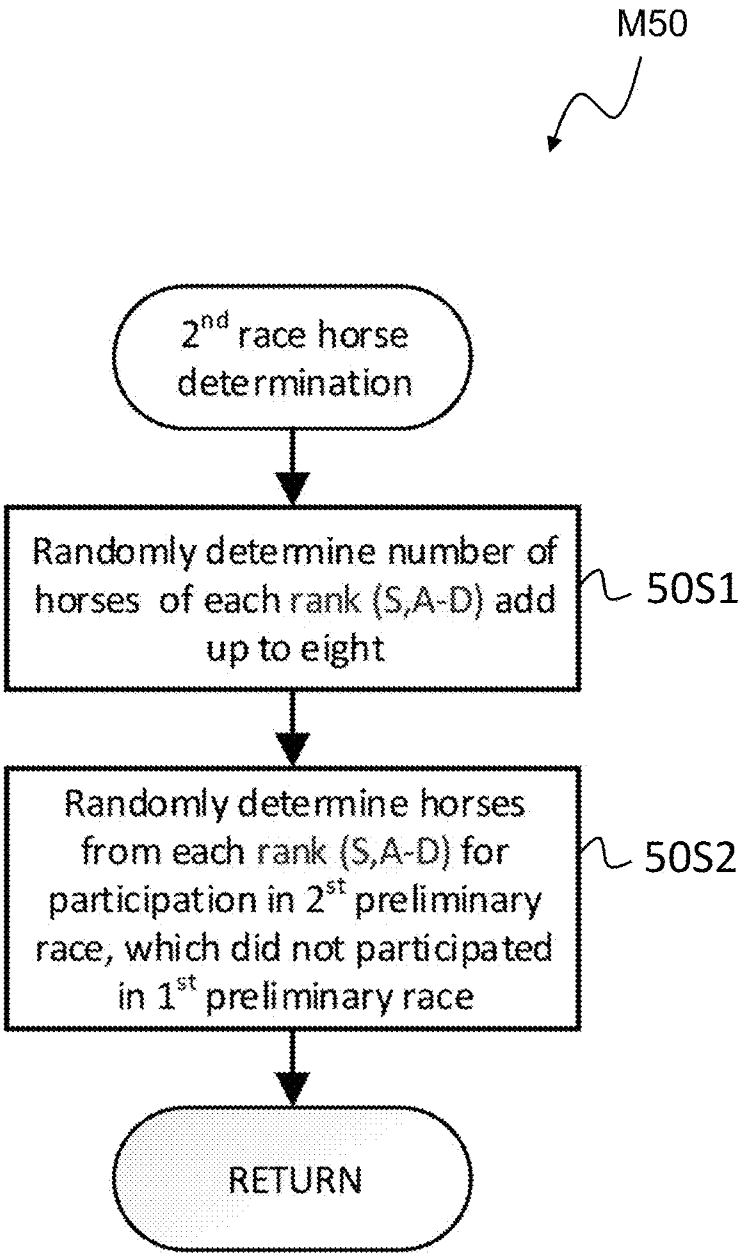

With reference to FIG. 17E, a method M50 for determining the participants or horses in the second preliminary race is shown. In a first step 50S1, the number of participants or horses from each rank is randomly determined. In one embodiment, there are 5 ranks or groups of participants (S and A-D). In the illustrated embodiment, there are up to 8 participants or horses in the first preliminary race. In the illustrated embodiment, horses that participated in the first preliminary race cannot participate in the second preliminary race. In a second step 50S2, the horses from each rank are randomly determined.

Figure 17F:
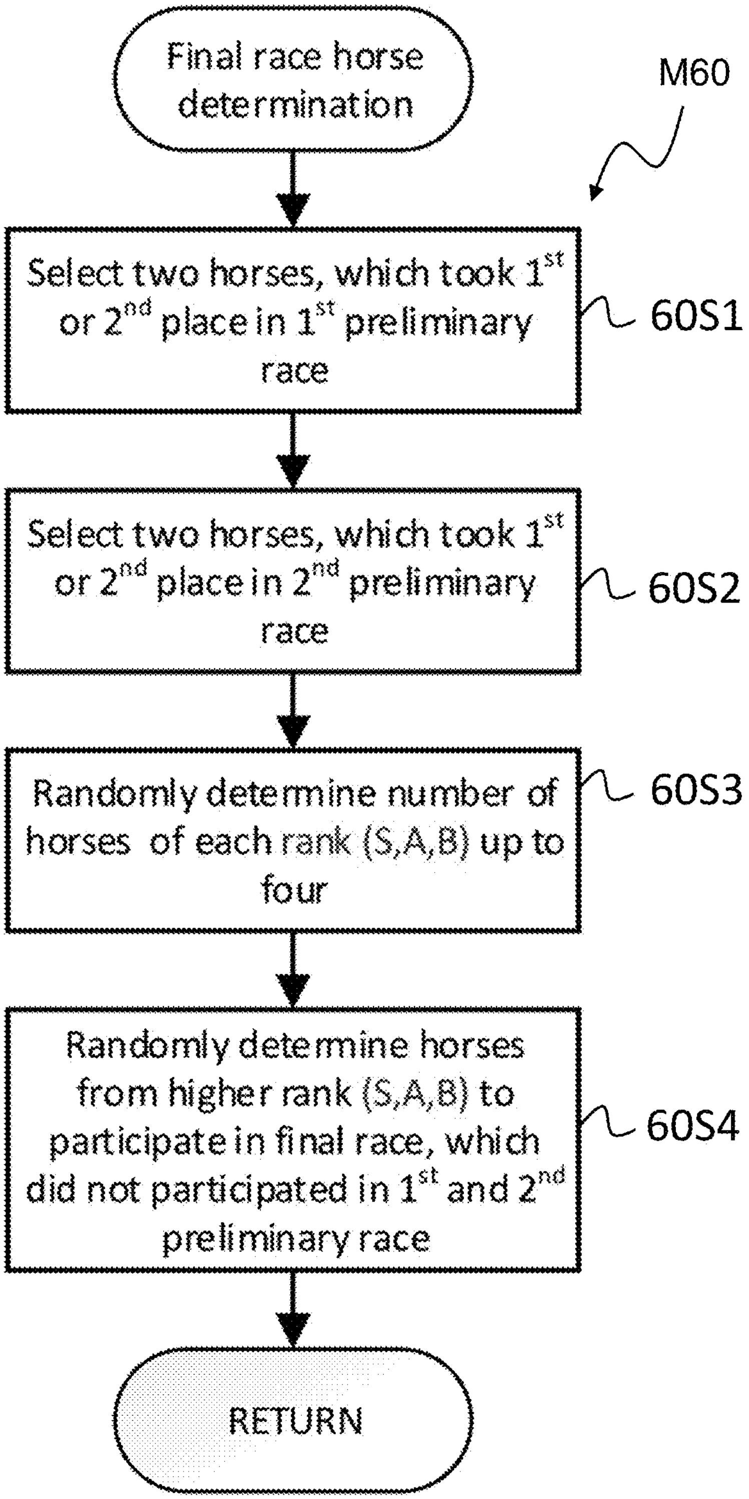

With reference to FIG. 17F, a method M60 for determining the participants or horses in the final race is shown. In a first step 60S1, the horses that finished first and second in the first preliminary race are selected as participants or horses in the final race. In a second step 60S2, the horses that finished first and second in the second preliminary race are selected as participants or horses in the final race. In the illustrated embodiment, there are up to 8 participants or horses in the final race. In a third step 60S3, the number of participants or horses from each rank is randomly determined (up to 4 participants or horses). In the illustrated embodiment, horses that participated in the first and second preliminary race cannot participate in the final race unless the participant/horse finished in the first or second places in one of the preliminary races. In a second step 60S2, the horses from each rank are randomly determined.

Figure 18:
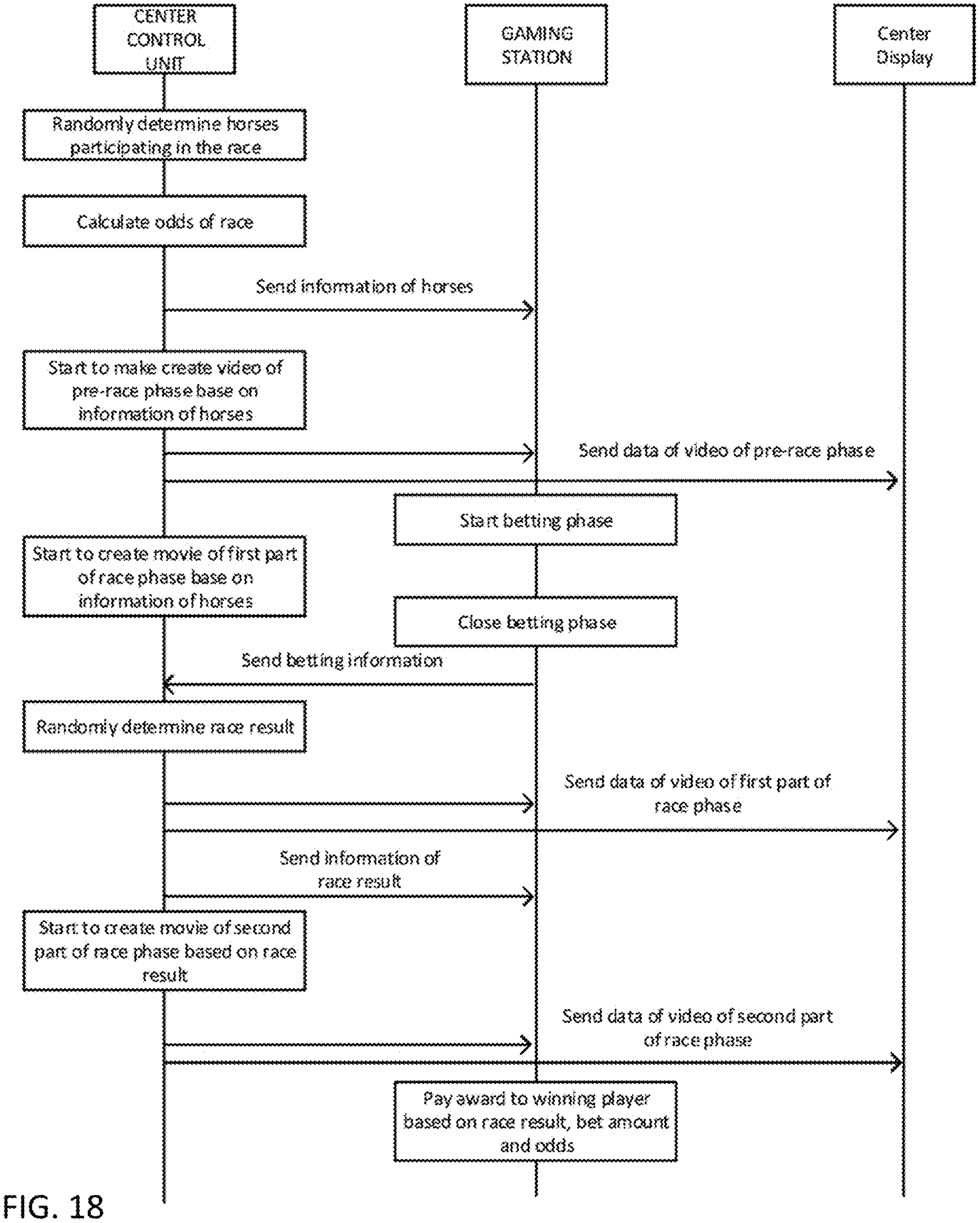
FIG. 18 is a system data flow diagram associated with the gaming system of FIG. 1, according to an embodiment of the present invention.

With reference to FIG. 18, a different view of the methods M20-M60 from the perspective of the data flow between the center control unit 12, the gaming stations 14, and the center display 16 is shown.

Figure 19:
FIG. 19 is an exemplary screenshot during a symbol assign phase of an exemplary bonus game, according to an embodiment of the present invention.
Figure 20:
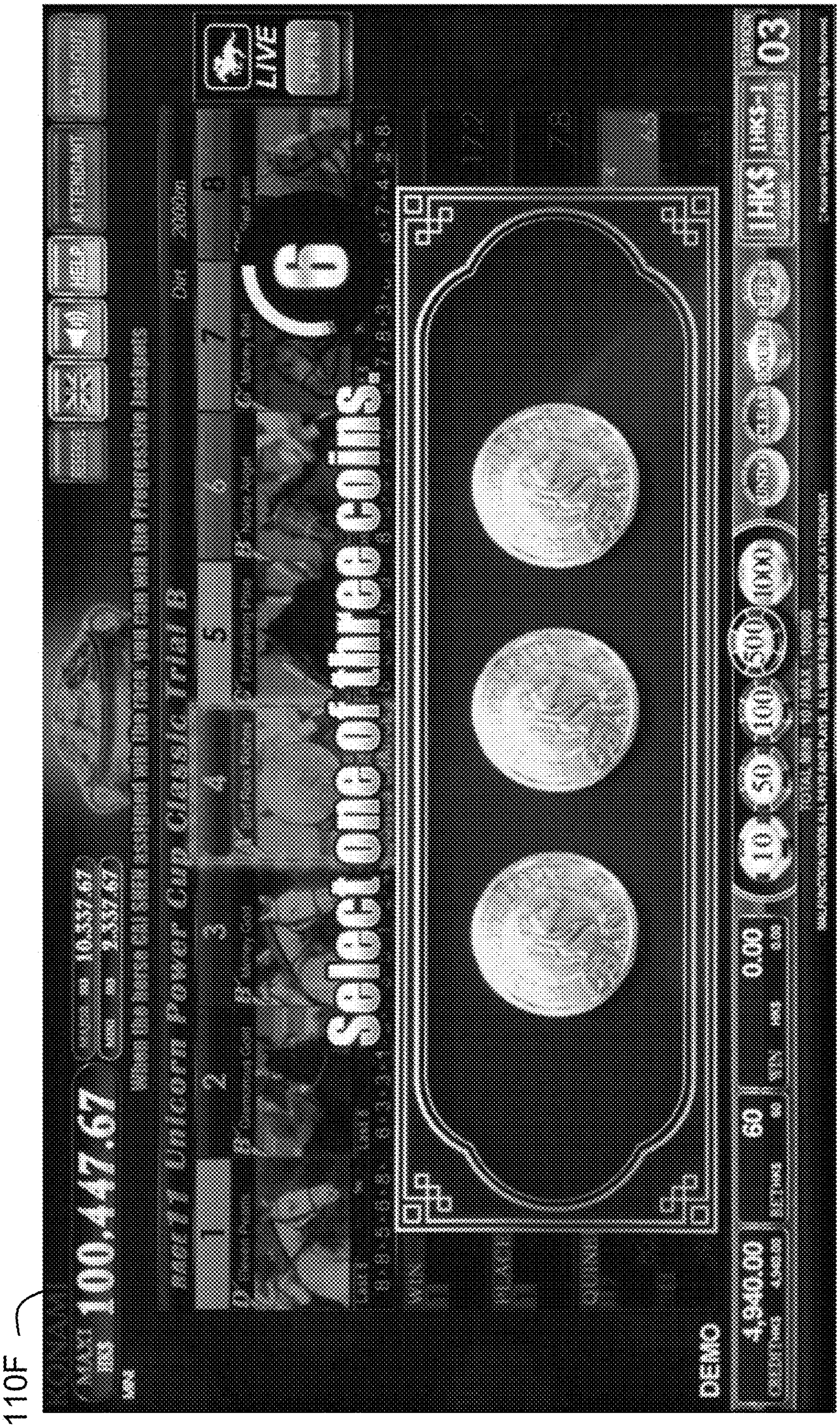
FIG. 20 is an exemplary screenshot during a bonus selection phase of an exemplary bonus game, according to an embodiment of the present invention.
Figure 21:
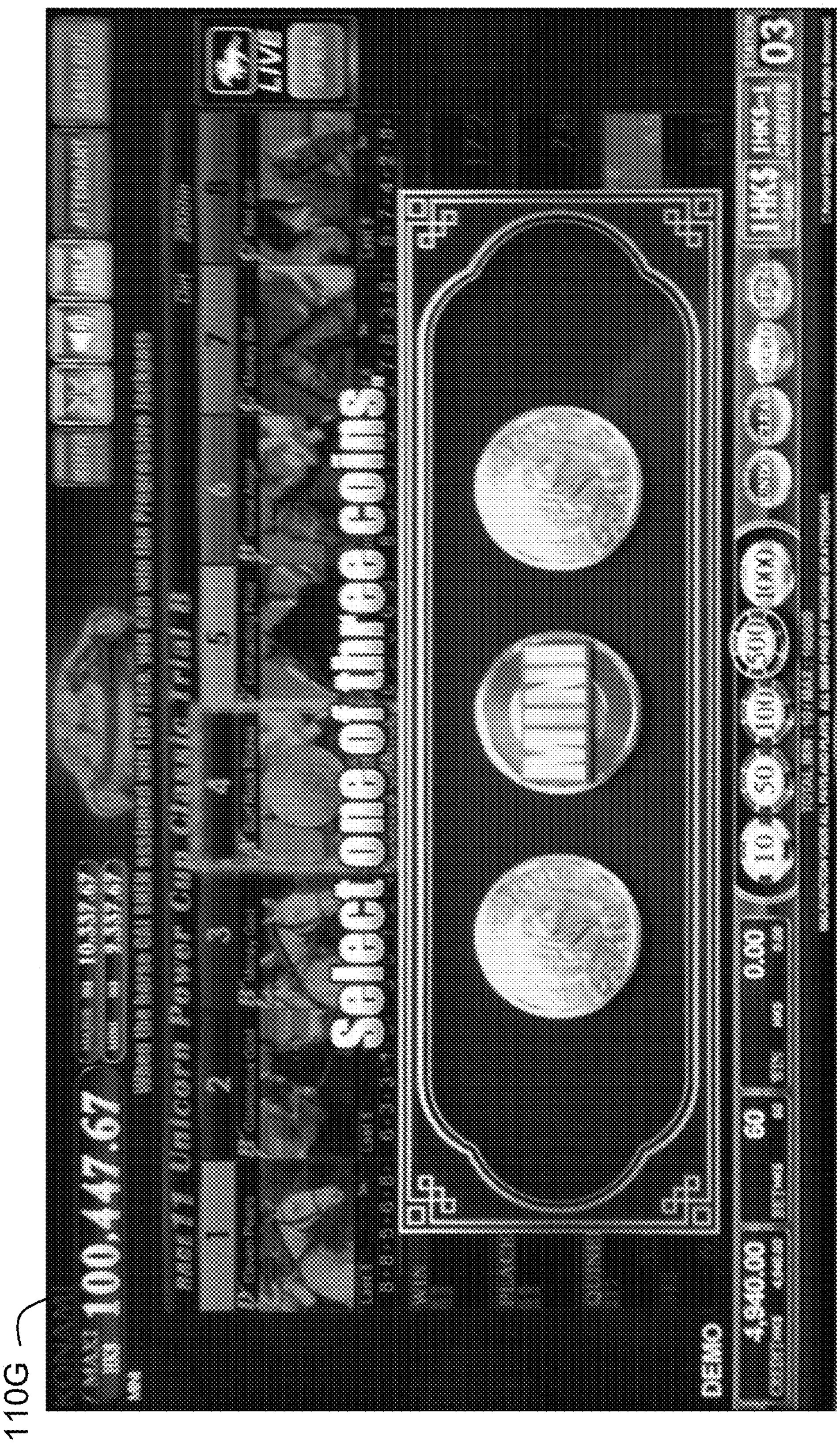
FIG. 21 is an exemplary screenshot during a bonus reveal phase of an exemplary bonus game, according to an embodiment of the present invention.

With reference to FIGS. 19, 20, and 21, screen shots of an exemplary bonus game are illustrated. In the illustrated embodiment, the exemplary bonus game is shown as a pick game. However, other types of games may be utilized as the bonus game.

With reference to FIG. 19, an exemplary screen shot during a "Symbol Assign" phase or stage is shown. In the illustrated embodiment, the symbol assign stage occurs during the wager or bet stage (see above) and is aimed at providing, to the players, a chance for a bonus.

In the illustrated embodiment, a bonus chance symbol may be assigned to one of the eight horses. In the shown example, the bonus chance symbol has been assigned to the number 4 ("Surf Rock Riches"). In one embodiment, the bonus symbol appears at the position of the horse that has the highest probability to win. The probability of the appearance of the bonus chance symbol may be increased based on an amount of a player's bet. For example, a bet of 200 credits may give a double chance compared to a bet of 100 credits. Further, in one embodiment, the appearance of a bonus chance symbol is individual to each player. In other words, each player has a chance at obtaining a bonus chance symbol. The appearance of a bonus chance symbol is for that player only.

In one embodiment, the bonus symbol may appear at only one gaming station at the same time. In this case, only one player can obtain a chance of bonus award. In another embodiment, the bonus symbol may appear at two or more stations at the same time and the symbol may appear on a different position on a display of each station. For example, the bonus symbol appears on "No. 3 horse" at gaming station 1 and the bonus symbol appears on "No. 8 horse" at gaming station 8.

In another embodiment, the bonus symbol may appear at the "PLACE" position and "QUINELLA" positions. The bonus symbol may appear at multiple positions at the same time. For example, one bonus symbol appears at a position of the highest probability of winning and another bonus symbol appears at a position of the second highest probability of winning.

In one embodiment, if the horse or wager position, e.g., "PLACE" or "QUINELLA", is consistent with the winning outcome of the main race, then a corresponding player is awarded an opportunity to win a bonus award. The award of the opportunity to win the bonus award may be dependent upon the player placing a wager on the corresponding horse or wager position on which the bonus symbol appears.

If the horse or wager position, e.g., "PLACE" or "QUINELLA", is consistent with the winning outcome of the main race, then a corresponding player is awarded an opportunity to win a bonus award.

In the illustrated embodiment, if the player is awarded an opportunity to win a bonus award, the player will win a bonus award. The bonus award awarded may be randomly determined. With reference to FIG. 20, a screen shot 110F during a bonus selection phase is shown. The player is presented with three coins and prompted to select one of the coins. In one embodiment, three coins appear on the display 82 of the gaming station 14 when a symbol assigned horse won at the gaming station 14. After that, an opportunity to select one of the coins is provided to the player and the selected coin turns over to reveal an amount of the bonus.

In one embodiment, the bonus amount may be bonus credits and/or progressive awards, for example, mini, max, and mega progressive jackpot awards. The bonus amount associated with each coin may be predetermined by the center controller 12. In the illustrated embodiment, the bonus amount may depend on which coin the player selects. In another embodiment, the center controller may predetermine the bonus award being provided to the player. In this case, the bonus amount doesn't depend on which coin the player selects.

Figure 22A:
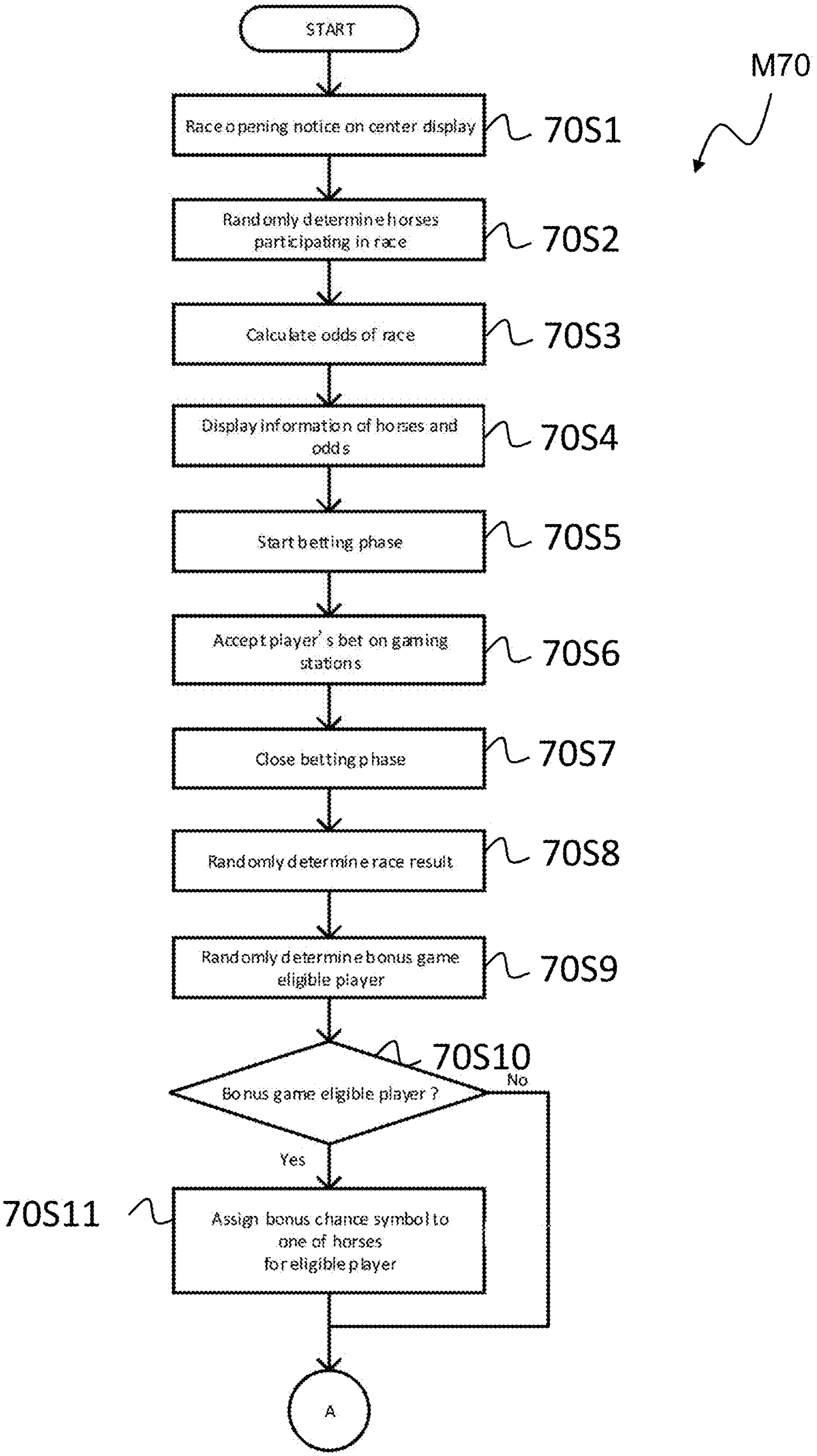
FIGS. 22A-22B are portions of a flow chart describing the operation of the bonus game, according to an embodiment of the present invention.
Figure 22B:
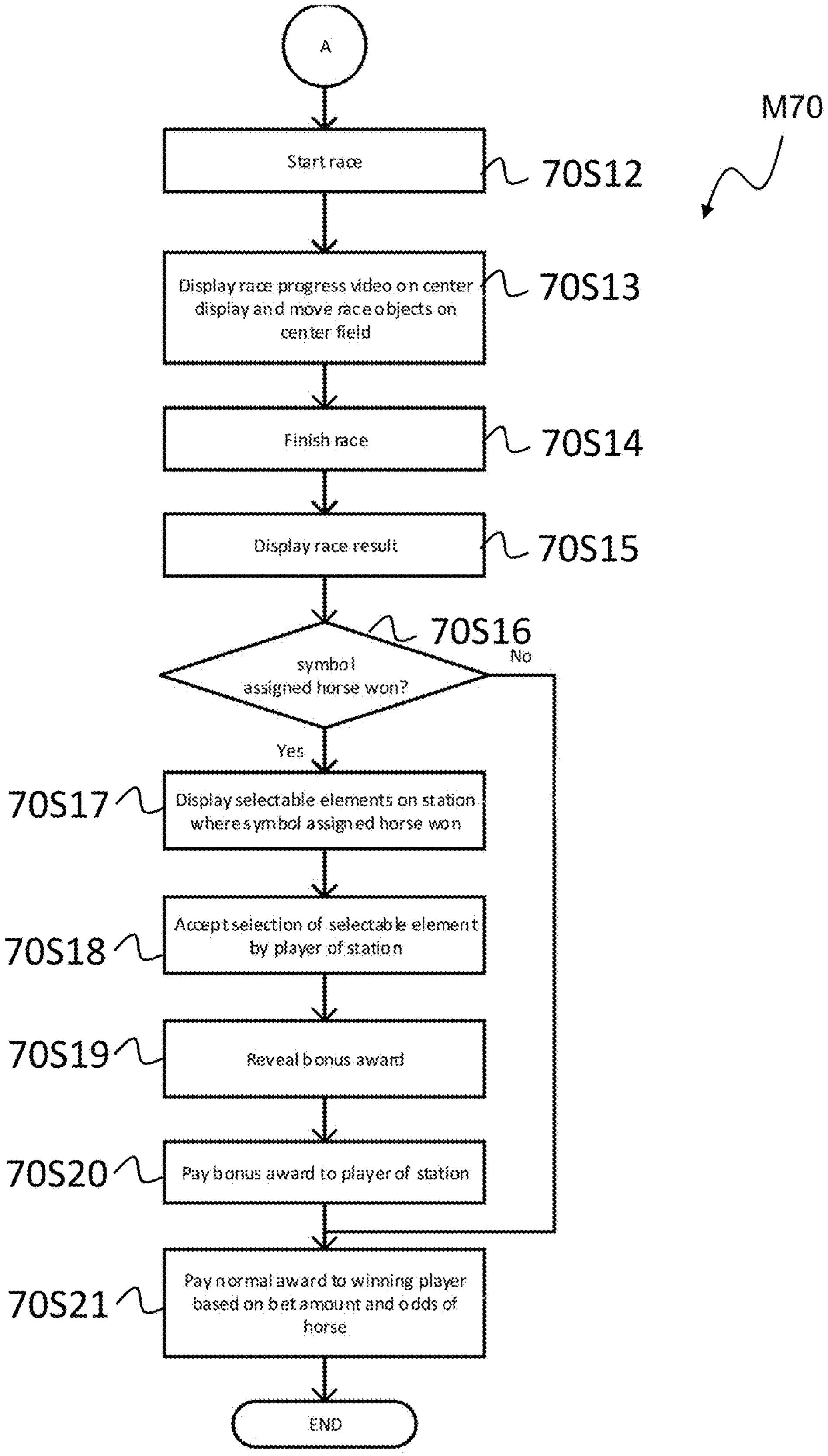

With reference to FIGS. 22A and 22B, a method M70 for providing a main game and a bonus game according to an embodiment of the present invention is shown. In a first step 70S1, a race opening notice or animation is displayed on the display 82 of each gaming station 14 and/or the center display 16 of the center control unit 12. In a second step 70S2, the horses participating in the subject race are determined. Each horse has a set of parameters. Some of the parameters may be fixed, and other parameters may be based on previous race results. In a third step 70S3, the odds associated with each participant/horse based on the parameters of each horse are determined. The participants or horses participating in the race are displayed, along with information related to the participants and the odds are displayed on the display 82 of each gaming station 14 and the center display 16 in a fourth step 70S4.

In a fifth step 70S5, the betting phase is started. In a sixth step 70S6, wagers or bets from the players on respective gaming stations 14 are accepted. The betting phase is closed in a seventh step 70S7. The results of the race are determined in an eighth step 70S8.

In a ninth step 70S9, one or more bonus game eligible players are randomly determined. For each player that is eligible, a bonus chance symbol is assigned to one of the horses (tenth and eleventh steps 70S10, 70S11).

In a twelfth step 70S12, the race is started. In a thirteenth step 70S13, the race progress is displayed as video on the center display 16 and/or the displays 82 of the gaming stations 14. Additionally, the race progress is reflected by movement of the race units 52. The race is finished in the fourteenth step 70S14. The race results are displayed on the center display 16 and/or the displays 82 of the gaming stations 14 in a fifteenth step 70S15.

In a sixteenth step 70S16, for each bonus eligible player, if the bonus symbol assigned participant/horse has not won, then the method 70 proceeds to a twenty-first step 70S21. In the twenty first step 70S21, the normal award for the main game is paid to any winning player based on the outcome of the main game and the winning player's bet and the odds of the winning horse(s).

Otherwise, the method M70 proceeds to a seventeenth step 70S17. In the seventeenth step 70S17, a number of selectable elements, e.g., coins are displayed on the gaming station 14 of the bonus eligible player(s). In an eighteenth step 70S18, player selection of one of the selectable elements is accepted by the gaming station 14.

In a nineteenth step 70S19, the bonus award is revealed. And in a twentieth step 70S20, the bonus award is paid to the bonus eligible player. The method M70 then proceeds to the twenty-first step 70S21.

Figure 23:
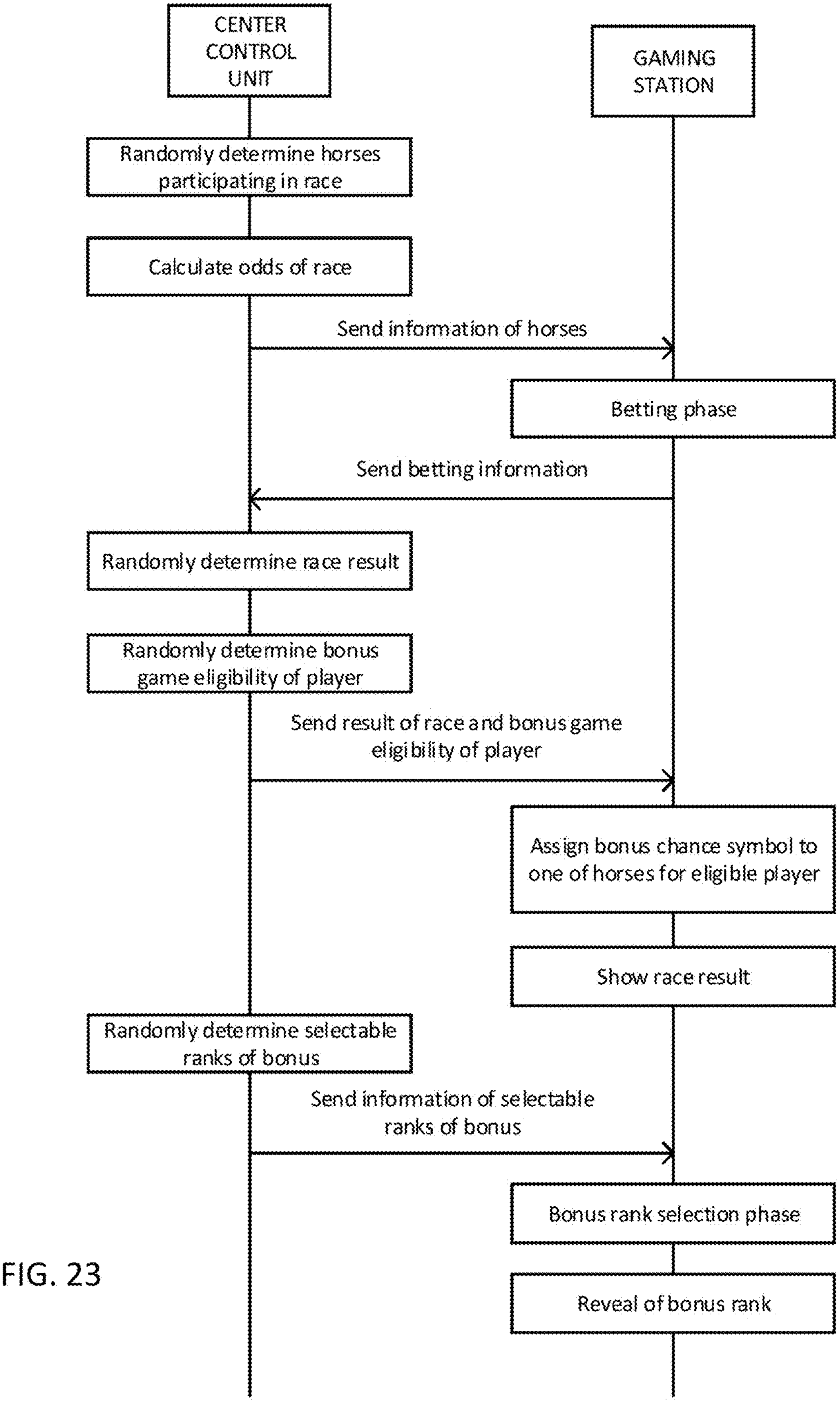
FIG. 23 is a system data flow diagram associated with the bonus game, according to an embodiment of the present invention; and, FIG. 24 is a flow chart describing operation of the bonus game, according to a first alternative embodiment.

With reference to FIG. 23, a different view of the method M70 from the perspective of the data flow between the center control unit 12 and the gaming stations 14 is shown.

Figure 24:
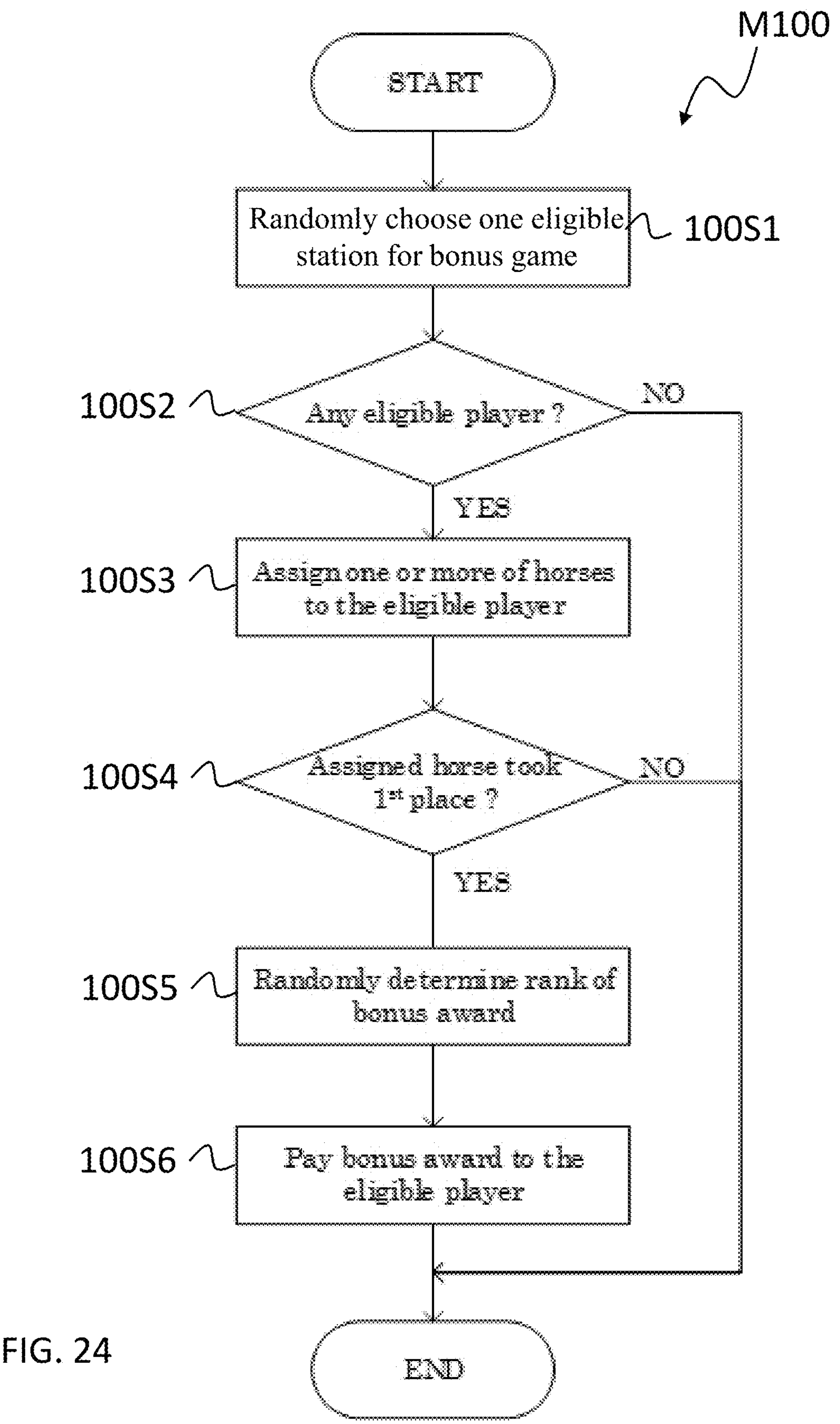

With reference to FIG. 24, a method M100 for providing a bonus game during the main game according to a first alternative embodiment is shown. As in the method M70 described above, the chance of being awarded a bonus game is provided to only one player at most during each main game. In the first alternative embodiment, more than one horse may be assigned to the eligible player. If one of the assigned horses wins the race, then the player is awarded a bonus award. The amount of the bonus award, i.e., the rank of the bonus award, is randomly determined and awarded automatically to the player. In other words, the player is presented with three options or "coins" and not required to select one of the options or coins.

In a first step 100S1, the method M100 determines if a bonus game is to be provided to one player or not, i.e., one of the game stations 14 is randomly selected or none of the game stations 14 are selected. In a second step 100S2, if one of the game stations 14 is selected, then there is an eligible player and the method M100 proceeds to a third step 100S3. Otherwise, the method M100 ends.

In the third step 100S3, the eligible player is assigned one or more horses. In one embodiment, the number of horses assigned to the eligible player is set. In another embodiment, the number of horses assigned to the eligible player is randomly determined. The horse(s) assigned to the eligible player may be randomly determined.

In a fourth step 100S4, if one of the assigned horse(s) took first place (in the main game), then the method M100 proceeds to a fifth step 100S5. Otherwise, the method M100 ends.

In the fifth step 100S5, the amount (or rank) of the bonus award is randomly determined and in a sixth step 100S6, the bonus award is automatically paid to the eligible player.

Figure 25:
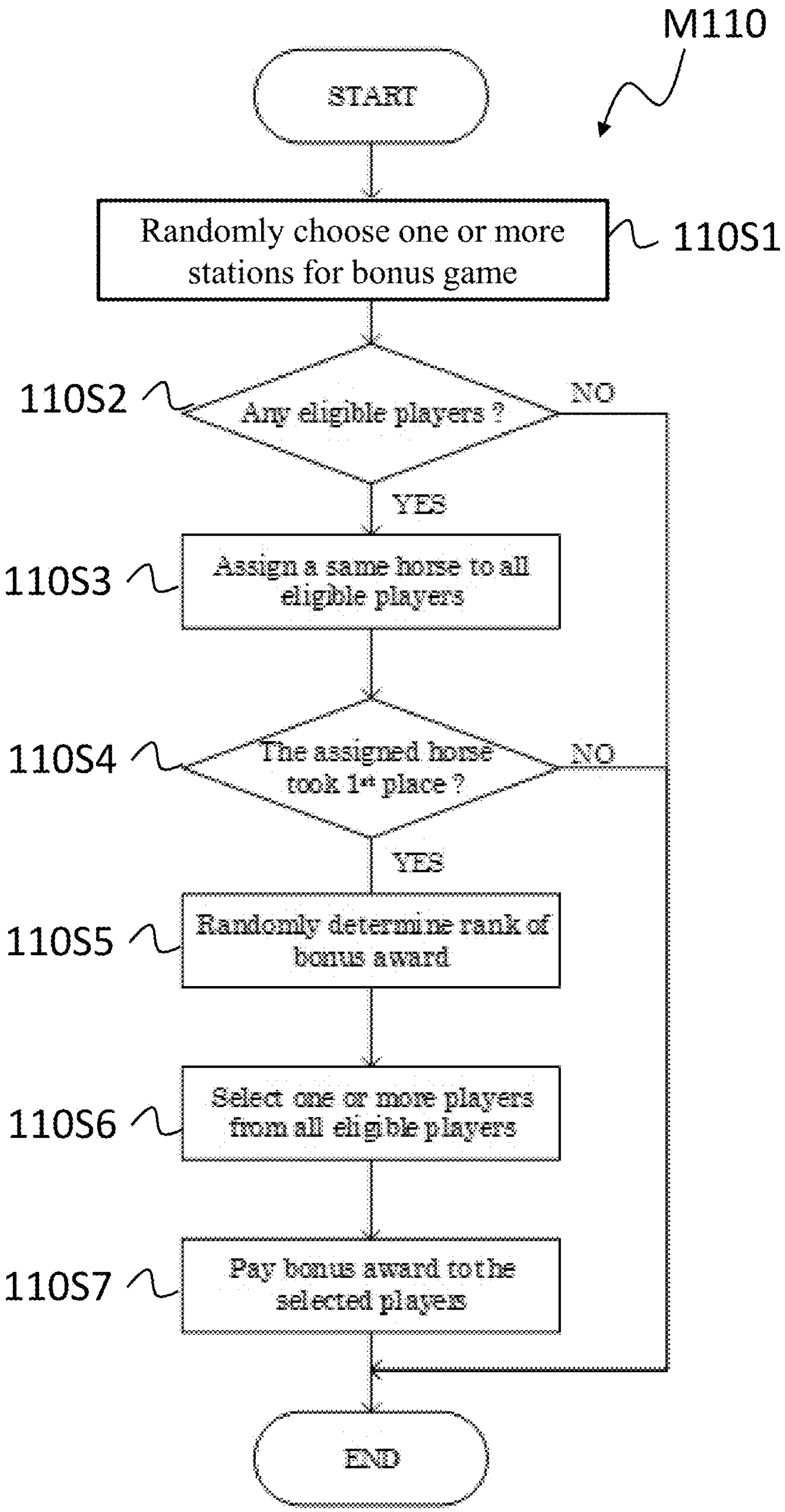
FIG. 25 is a flow chart describing operation of the bonus game, according to a second alternative embodiment.

With reference to FIG. 25, a method M110 for providing a bonus game during the main game according to a second alternative embodiment is shown. In the second alternative embodiment, the chance of being awarded a bonus game may be provided to more than one player during each main game. Additionally, the same horse is assigned to all of the eligible players. In the second alternative embodiment, if the assigned horse wins the race (in the main game) one or more of the eligible players are randomly selected and awarded the bonus award.

In a first step 110S1, the method M110 determines if a bonus game is to be provided to one or more player(s) or not, i.e., one or more of the game stations 14 are randomly selected or none of the game stations 14 are selected. In a second step 11052, if one or more of the game stations 14 are selected, then there are one or more eligible players and the method M110 proceeds to a third step 110S3. Otherwise, the method M110 ends.

In the third step 110S3, the eligible players are assigned one of the horses. In one embodiment, the horse assigned to the eligible players may be randomly determined.

In a fourth step 11054, if the assigned horse took first place (in the main game), then the method M110 proceeds to a fifth step 110S5. Otherwise, the method M110 ends.

In the fifth step 110S5, the amount (or rank) of the bonus award is randomly determined. In a sixth step 110S6, one or more of the players from the eligible players are randomly selected. The bonus award is automatically paid to the selected player(s) from the eligible players in a seventh step 110S7. In the second alternative embodiment, the selected player(s) from the eligible players are awarded the same bonus award.

Figure 26:
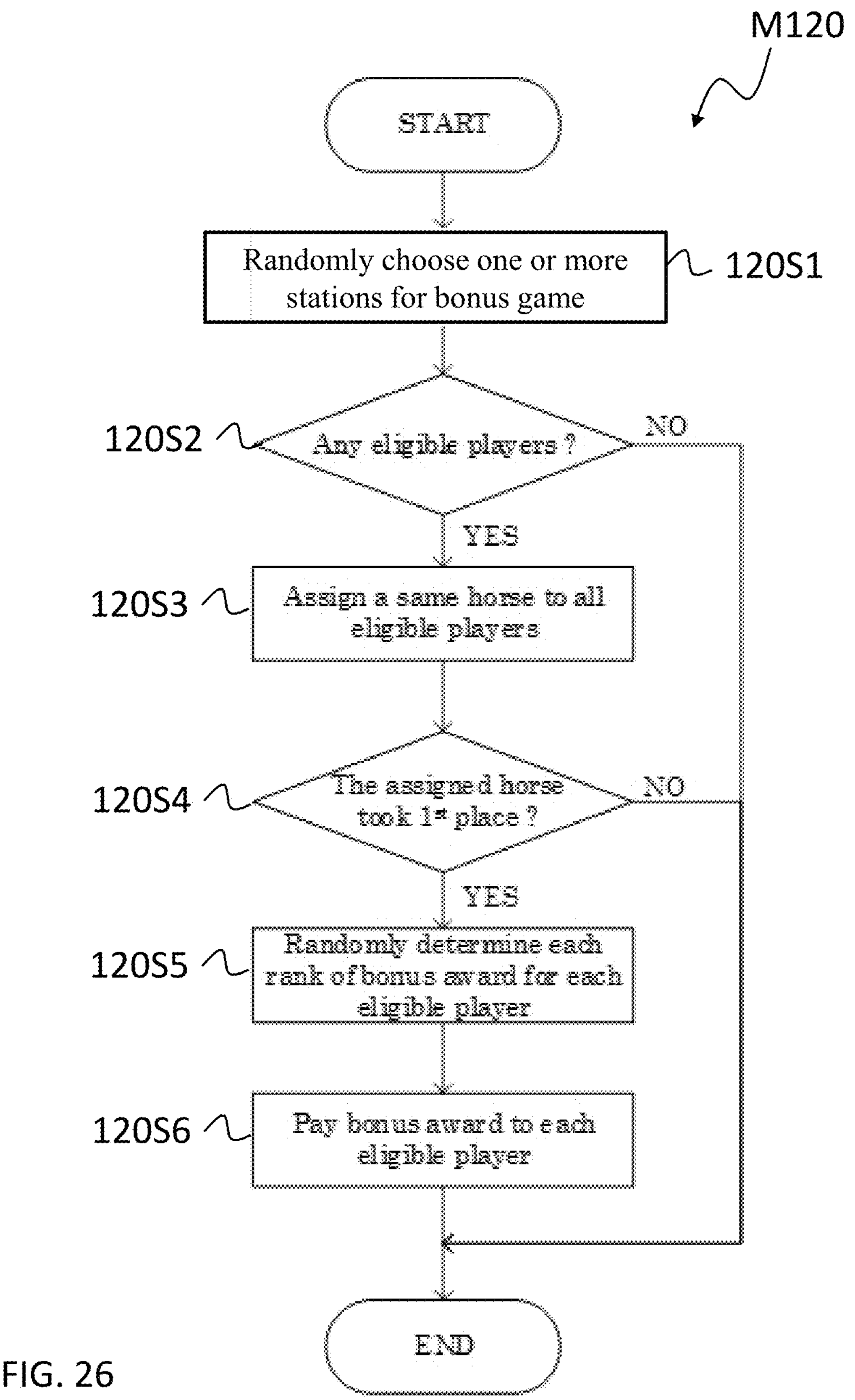
FIG. 26 is a flow chart describing operation of the bonus game, according to a third alternative embodiment.

With reference to FIG. 26, a method M120 for providing a bonus game during the main game according to a third alternative embodiment is shown. In the third alternative embodiment, the chance of being awarded a bonus game may be provided to more than one player during each main game. Additionally, the same horse is assigned to all of the eligible players. In the third alternative embodiment, if the horse assigned to one or more of the eligible players wins the race in the main game, then a bonus award is selected for each eligible player.

In a first step 120S1, the method M120 determines if a bonus game is to be provided to one or more player(s) or not, i.e., one or more of the game stations 14 are randomly selected or none of the game stations 14 are selected. In a second step 120S2, if one or more of the game stations 14 are selected, then there are one or more eligible players and the method M120 proceeds to a third step 120S3. Otherwise, the method M120 ends.

In the third step 120S3, the eligible player(s) are assigned one of the horses. In one embodiment, the horse assigned to the eligible player(s) may be randomly determined.

In a fourth step 120S4, if the assigned horse took first place (in the main game), then the method M120 proceeds to a fifth step 120S5. Otherwise, the method M120 ends.

In the fifth step 120S5, the amount (or rank) of the bonus award is randomly determined for each of the eligible player(s). The bonus award is automatically paid to the eligible players in a sixth step 120S6.

Figure 27:
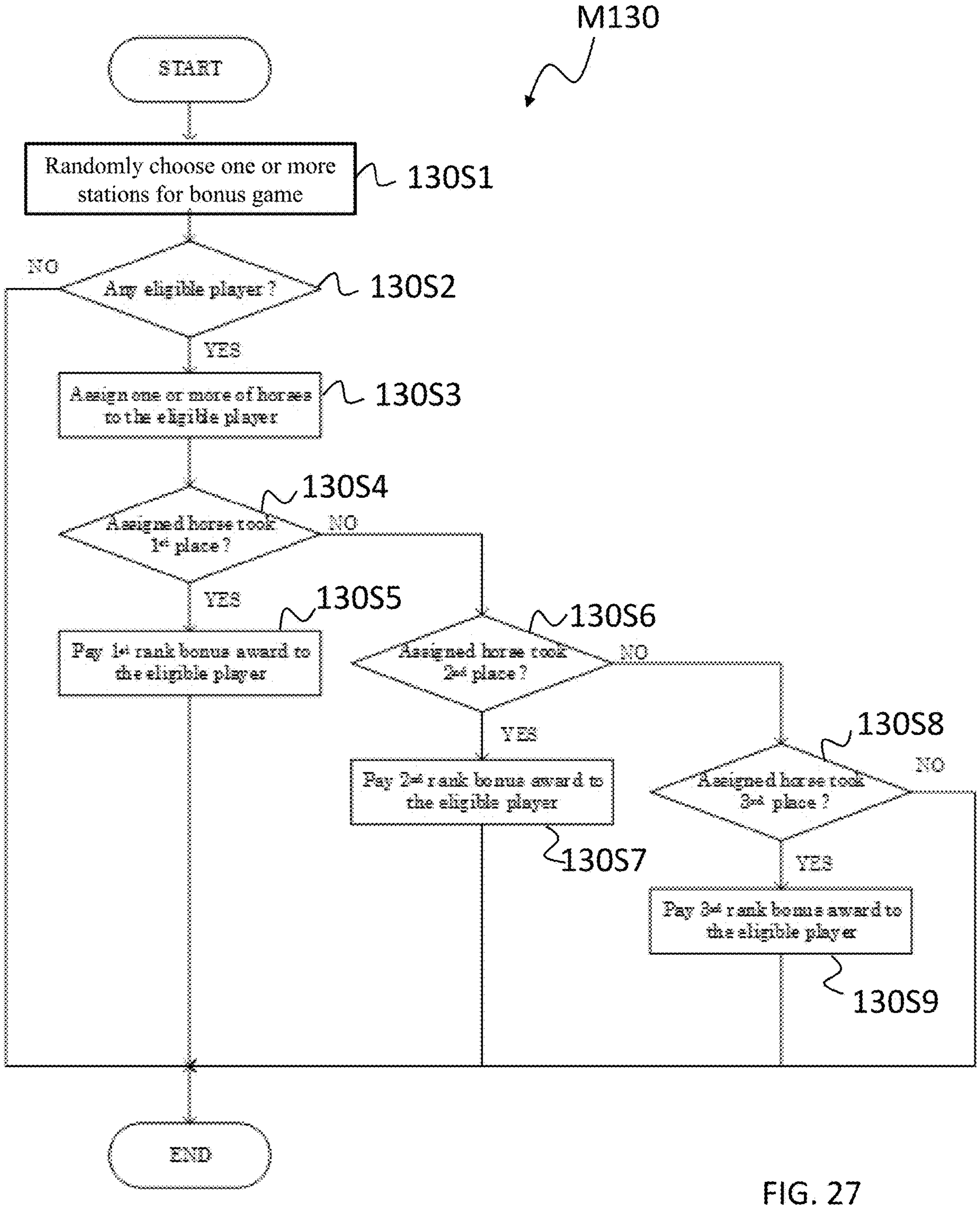
FIG. 27 is a flow chart describing operation of the bonus game, according to a fourth alternative embodiment.

With reference to FIG. 27, a method M130 for providing a bonus game during the main game according to a fourth alternative embodiment is shown. In the fourth alternative embodiment, the rank or amount of the bonus award is based on the outcome of the race, i.e., the main game. For example, if the horse assigned to a player comes in first place, then the $1^{st}$ rank bonus award is awarded. If the horse assigned to a player comes in second place, then the $2^{nd}$ rank bonus award is awarded and if the horse assigned to a player comes in third place, then the $3^{rd}$ rank bonus award is awarded.

In a first step 130S1, the method M130 determines if a bonus game is to be provided to one or more player(s) or not, i.e., one or more of the game stations 14 are randomly selected or none of the game stations 14 are selected. In a second step 130S2, if one or more of the game stations 14 are selected, then there are one or more eligible players and the method M130 proceeds to a third step 130S3. Otherwise, the method M130 ends.

In the third step 130S3, the eligible player(s) are assigned one of the horses. In one embodiment, the horse(s) assigned to the eligible player(s) may be randomly determined. Additionally, the same horse(s) may be assigned to each eligible player or different horse(s) may be assigned.

In a fourth step 130S4, if one of the horse(s) assigned to the player(s) took first place in the main game, then the first rank bonus award, i.e., the highest award, is awarded to the eligible player(s) in a fifth step 130S5. Otherwise, the method M130 proceeds to a sixth step 130S6.

In the sixth step 130S6, if one of the horse(s) assigned to the player(s) took second place in the main game, then the second rank bonus award, i.e., the second highest award, is awarded to the eligible player(s) in a seventh step 130S7. Otherwise, the method M130 proceeds to an eighth step 130S8.

In the eighth step 130S8, if one of the horse(s) assigned to the player(s) took third place in the main game, then the third rank bonus award, i.e., the third highest award, is awarded to the eligible player(s) in a ninth step 130S9. Otherwise, the method M130 ends.

Figure 28:
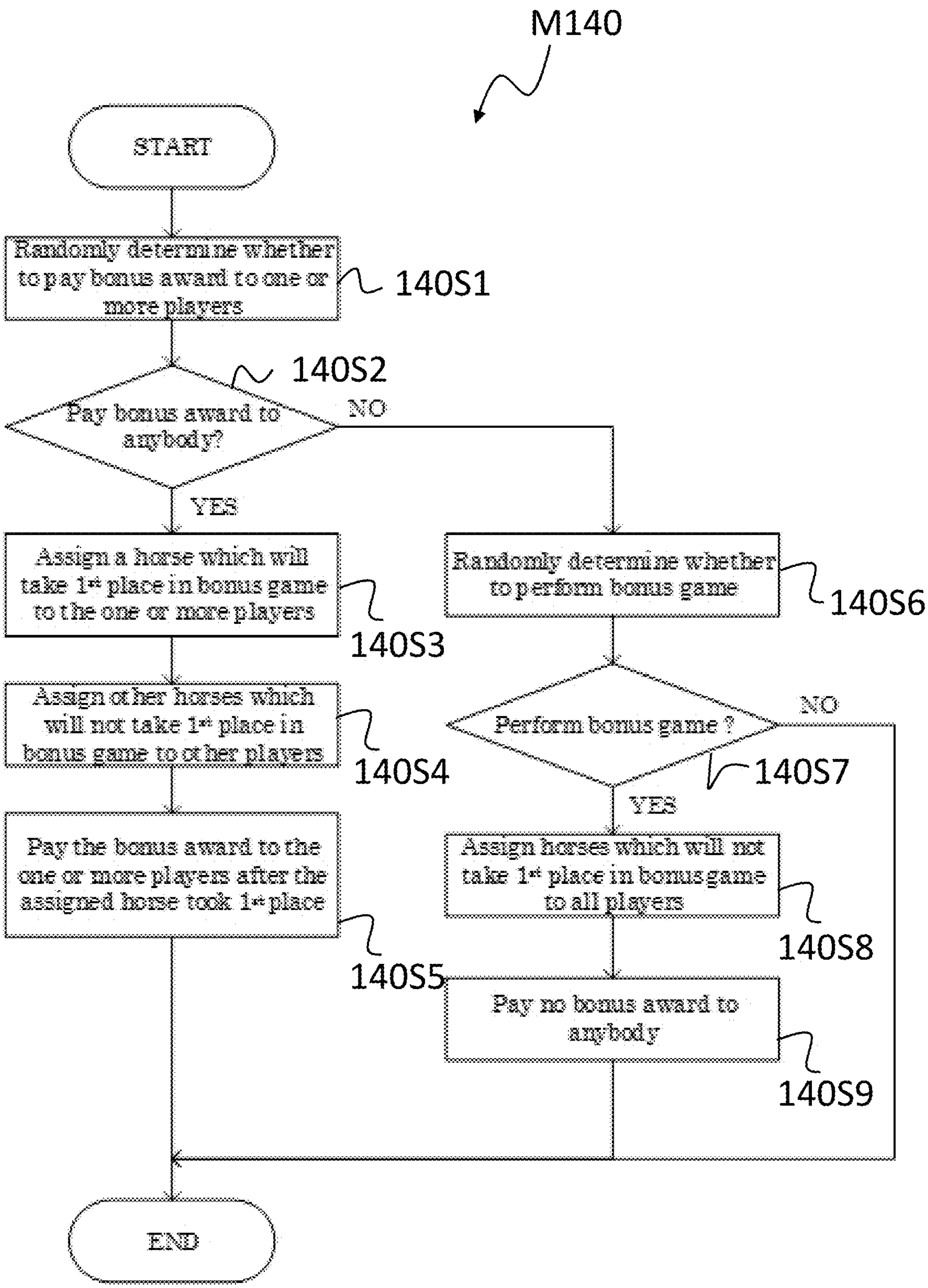
FIG. 28 is a flow chart describing operation of the bonus game, according to a fifth alternative embodiment; and, FIG. 29 is a flow chart describing operation of the bonus game, according to a sixth alternative embodiment.

With reference to FIG. 28, a method M140 for providing a bonus game during the main game according to a fifth alternative embodiment is shown. In the fifth alternative embodiment, the method M140 initially determines if a bonus award is to be paid to any player. If a bonus award is to be paid to any player, then the bonus game is played.

If it is determined that a bonus award is not to be paid to any player, then the method M140 randomly determines whether or not play, i.e., display the bonus game (even though no bonus award will be awarded).

In a first step 14051, the method M140 randomly determines whether or not a bonus award will be awarded to any player. In a second step 140S2, if no bonus award is to be awarded, then the method M140 will proceed to a sixth step 140S6. Otherwise, the method M140 will proceed to a third step 140S3.

In the third step 140S3, a horse which will take $1^{st}$ place in the bonus game/race is assigned to one or more players. In a fourth step 140S4, other horses, i.e., non-first place finishing horses, are assigned to other players. In a fifth step 140S5, the bonus award is paid to the one or more players (after the assigned horse takes $1^{st}$ place).

In the sixth step 140S6, the method M140 randomly determines whether or not to perform/display the bonus game. In a seventh step 140S7, if the bonus game is to be performed, then the method M140 proceeds to an eighth step 140S8. Otherwise, the method M140 ends.

In the eighth step 140S8, horses that will not take first place are assigned to all eligible players. In a ninth step 140S9, none of the players are awarded a bonus award.

Figure 29:
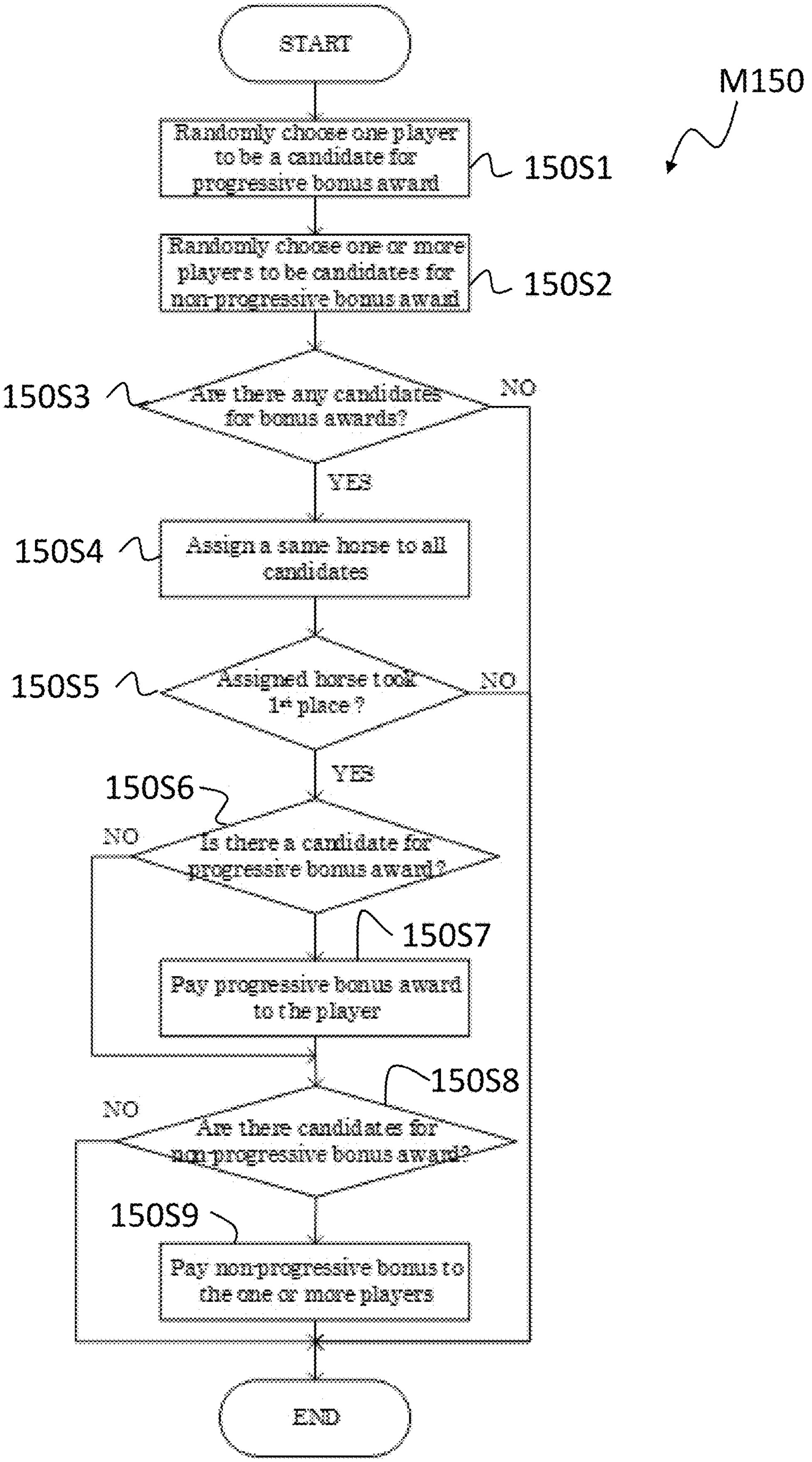

With reference to FIG. 29, a method M150 for providing a bonus game during the main game according to a sixth alternative embodiment is shown. In the sixth alternative embodiment, the bonus game may provide both a progressive bonus award and non-progressive (or fixed) bonus award(s). In the illustrated embodiment, the progressive award may be provided to only player in one game. However, the non-progressive awards may be provided to one or more players in the same game.

In a first step 150S1, the method M150 determines if a progressive bonus award is to be awarded to one player or not, i.e., one of the game stations 14 is randomly selected to be a candidate for receiving a progressive bonus award or none of the game stations 14 (players) are selected. In a second step 150S2, the method M150 determines if a non-progressive bonus award is to be awarded to one or more player(s) or not, i.e., one or more game stations 14 are randomly selected to be candidates for a non-progressive bonus award or none of the game stations 14 (players) are selected.

In a third step 150S3, if there are any candidates for a bonus award, then the method M150 proceeds to a fourth step 150S4. Otherwise, the method M150 ends.

In the fourth step 150S4, the same horse is assigned to all bonus award candidates. In a fifth step 150S5, if the assigned horse took first place (in the main game), then the method M150 proceeds to sixth step 150S6. Otherwise, the method M150 proceeds to the eighth step 150S8.

In the sixth step 150S6, if there is a candidate for the progressive award, then the method M150 proceeds to a seventh step 150S7. Otherwise, the method M150 proceeds to the eighth step 15058.

In the seventh step 150S7, the progressive bonus award is provided to the player and the method proceeds to the eighth step 150S8. In the eighth step 150S8, if there are candidates for the non-progressive bonus award, then the method M150 proceeds to a ninth step 150S9. Otherwise the method M150 ends.

In the ninth step 150S9, the non-progressive bonus is paid to one more of the players.

Next, a description of a program of the gaming system 10 for operating one or a plurality of computers as the center control unit 12 and the gaming stations 14 is provided. The center control unit 12 and the gaming stations 14 store the program in the memory, and can execute the program. The center control unit 12 and the gaming stations 14 can access the program stored in the memory and can operate as the center control unit 12 and the gaming stations 14 of the present embodiment by the program.

Further, the program according to the embodiment, may be provided through a network or stored in a recording medium. Recording media such as a floppy (registered trademark) disk, CD-ROM, DVD, or ROM and the like, or semiconductor memory and the like are exemplified as a recording medium. In this case, a program stored in the memory uses a reading device inside the center control unit 12 and the gaming stations 14 such as a floppy (registered trademark) disk drive device, CD-ROM drive device, and DVD drive device and the like.

The embodiments of the present invention are described above, but the present invention is not limited to such embodiments, a variety of variations are possible.

Referring to FIG. 3, in one embodiment, the operation unit 78 includes a plurality of user input devices that may include an acceptor device which accepts media associated with a monetary value to establish a credit balance, a validator configured to identify the physical media, a cash-out button actuatable to cause an initiation of a payout associated with the credit balance. The acceptor device may include a touchscreen display associated with the display unit 82 and/or the player tracking/ranking unit 74, the bill/ticket identification unit 74, the operation unit 78, a coin slot, a ticket in ticket out (TITO) system, a bill acceptor, and/or any suitable device that enables the gaming station 14 to receive media associated with a monetary value and establish a credit balance for use in playing the gaming machine. In one embodiment, the acceptor device may be configured to receive physical media such as, for example, a coin, a medal, a ticket, a card, a bill, currency, and/or any suitable physical media that enables the gaming station 14 to function as described herein. The acceptor device may also be configured to accept virtual media such as, for example, a player tracking account, a virtual credit balance, reward points, gaming credits, bonus points, and/or any suitable virtual media that enables the gaming machine 10 to function as described herein. For example, in one embodiment, the coin slot may include an opening that is configured to receive coins and/or tokens deposited by the player into the gaming station 14. The gaming station processor 66 converts a value of the coins and/or tokens to a corresponding amount of gaming credits that are used by the player to wager on games played on the gaming station 14. The bill acceptor may include an input and output device that is configured to accept a bill, a ticket, and/or a cash card into the bill acceptor to enable an amount of gaming credits associated with a monetary value of the bills, ticket, and/or cash card to be credited to the gaming station 14. In one embodiment, the bill acceptor also includes a printer (not shown) that is configured to dispense a printed voucher ticket that includes information indicative of an amount of credits and/or money paid out to the player by the gaming machine 10 during a gaming session. The voucher ticket may be used at other gaming devices, or redeemed for cash, and/or other items as part of a casino cashless system.

Further, in the embodiment, a bill or ticket is displayed as game value, and received by these bill/ticket identification devices, and a form where a ticket is output by a printer unit is described, but the present invention is not limited to this. The game value is a concept including tangible objects such as a coin, bill, coin, medal, ticket, and the like, or electronic data that has a value equivalent to these. For example, a coin is received by the coin accepter, and there may be a form where a coin is paid by a coin hopper. A player is identified and credit that is accumulated in an account on a server is used, there may be a form where credit is paid to an account, information of credit stored in a storage medium of a magnetic card, IC card and the like is read and used, and there may be a form where credit is paid by writing to the storage medium.

Exemplary embodiments of a gaming system, gaming stations, and a method of providing an award to a player are described above in detail. The gaming station, system, and method are not limited to the specific embodiments described herein, but rather, components of the gaming device and/or system and/or steps of the method may be utilized independently and separately from other components and/or steps described herein. For example, the gaming system may also be used in combination with other gaming systems and methods, and is not limited to practice with only the gaming system and stations as described herein. Rather, an exemplary embodiment can be implemented and utilized in connection with many other gaming system applications. For instance, the present invention is applicable to a gaming system which is a combination of a community gaming system and individual gaming devices. In such a case, the individual gaming device and the community gaming device provide the feature, the bonus game, and/or the progressive jackpot described herein.

A controller, computing device, or computer, such as described herein, includes at least one or more processors or processing units and a system memory. The controller typically also includes at least some form of computer-readable media. By way of example and not limitation, computer-readable media may include computer storage media and communication media. Computer storage media may include volatile and nonvolatile, removable and non-removable media implemented in any method or technology that enables storage of information, such as computer-readable instructions, data structures, program modules, or other data. Communication media typically embody computer-readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer-readable media.

The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In some embodiments, a processor, as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus, are not intended to limit in any way the definition and/or meaning of the term "processor."

In some embodiments, a database, as described herein, includes any collection of data including hierarchical databases, relational databases, flat file databases, object-relational databases, object oriented databases, and any other structured collection of records or data that is stored in a computer system. The above examples are exemplary only, and thus, are not intended to limit in any way the definition and/or meaning of the term "database." Examples of databases include, but are not limited to only including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, California; IBM is a registered trademark of International Business Machines Corporation, Armonk, New York; Microsoft is a registered trademark of Microsoft Corporation, Redmond, Washington; and Sybase is a registered trademark of Sybase, Dublin, California)

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Other aspects and features of the present invention can be obtained from a study of the drawings, the disclosure, and the appended claims. The invention may be practiced otherwise than as specifically described within the scope of the appended claims. It should also be noted that the steps and/or functions listed within the appended claims, notwithstanding the order of which steps and/or functions are listed therein, are not limited to any specific order of operation.

Although specific features of various embodiments of the invention may be shown in some drawings and not in others, this is for convenience only. In accordance with the principles of the invention, any feature of a drawing may be referenced and/or claimed in combination with any feature of any other drawing.

What is claimed is:

1. A gaming system, comprising:

a center display configured to display video images of a simulated horse race including a plurality of virtual horses;

a center field unit including a model racetrack and a plurality of horse race models configured to travel along the model racetrack;

a plurality of gaming stations positioned adjacent the center field unit, each gaming station including a cabinet, a display unit mounted to the cabinet, and a control panel mounted to the cabinet; and a center control unit coupled to the center display, the center field unit, and to each of the gaming stations, the center control unit including one or more processors programmed to execute an algorithm including the steps of:

executing the simulated horse race by:

rendering a race screen on the display unit of each gaming station displaying images of each virtual horse included in the simulated horse race;

randomly determining an outcome of the simulated horse race from a plurality of potential race outcomes including a winning virtual horse;

randomly selecting one or more eligible gaming stations for a progressive bonus game from the plurality of gaming stations;

randomly selecting a progressive bonus chance virtual horse from the plurality of virtual horses and assign the randomly selected progressive bonus chance virtual horse to each selected eligible gaming station;

modifying a corresponding race screen associated with each selected eligible gaming station to display a progressive bonus chance symbol overlayed onto a corresponding image of the progressive bonus chance virtual horse;

generating a race video associated with the randomly determined outcome of the simulated horse race;

simultaneously displaying the race video on the center display and on the display unit of each gaming station;

operating each of the horse race models to travel around the model racetrack based on the randomly determined outcome of the simulated horse race; and rendering a progressive bonus game display window on each selected eligible gaming station upon determining the progressive bonus chance virtual horse matches the winning virtual horse of the randomly determined outcome of the simulated horse race.

2. The gaming system of claim 1, wherein the one or more processors are programmed to execute the algorithm including the steps of:

randomly selecting the progressive bonus chance virtual horse before randomly determining the outcome of the simulated horse race.

3. The gaming system of claim 1, wherein the one or more processors are programmed to execute the algorithm including the steps of:

initiating a progressive bonus game at the selected eligible gaming stations including:

prior to displaying the race video, randomly determining a placement order of each virtual horse in the simulated horse race; and providing a progressive award based on the placement order of each virtual horse determined in the progressive bonus game and a result of the simulated horse race.

4. The gaming system of claim 3, wherein the one or more processors are programmed to execute the algorithm including the steps of initiating the progressive bonus game upon receiving a qualifying wager via the selected eligible gaming stations.

5. The gaming system of claim 3, wherein the one or more processors are programmed to execute the algorithm including the steps of randomly determining whether to initiate the progressive bonus game.

6. The gaming system of claim 3, wherein the one or more processors are programmed to execute the algorithm including the steps of:

initiating the progressive bonus game at the selected eligible gaming stations by:

prior to displaying the race video, randomly determining a placement order of each virtual horse in the simulated horse race for each of the selected eligible gaming stations such that at least one selected eligible gaming station is associated with a different placement order.

7. The gaming system of claim 1, wherein the one or more processors are programmed to execute the algorithm including the steps of executing a plurality of simulated horse races, each simulated horse race including a different group of virtual horses.

8. A method of operating a gaming system including a center display configured to display video images of a simulated horse race including a plurality of virtual horses, a center field unit including a model racetrack and a plurality of horse race models configured to travel along the model racetrack, a plurality of gaming stations positioned adjacent the center field unit with each gaming station including a cabinet, a display unit mounted to the cabinet, and a control panel mounted to the cabinet, and a center control unit including one or more processors operably coupled to the center display, the center field unit, and to each of the gaming stations, the method including the one or more processors performing an algorithm including the steps of:

executing the simulated horse race by:

rendering a race screen on the display unit of each gaming station displaying images of each virtual horse included in the simulated horse race;

randomly determining an outcome of the simulated horse race from a plurality of potential race outcomes including a winning virtual horse;

randomly selecting one or more eligible gaming stations for a progressive bonus game from the plurality of gaming stations;

randomly selecting a progressive bonus chance virtual horse from the plurality of virtual horses and assign the randomly selected progressive bonus chance virtual horse to each selected eligible gaming station;

modifying a corresponding race screen associated with each selected eligible gaming station to display a progressive bonus chance symbol overlayed onto a corresponding image of the progressive bonus chance virtual horse;

generating a race video associated with the randomly determined outcome of the simulated horse race;

simultaneously displaying the race video on the center display and on the display unit of each gaming station;

operating each of the horse race models to travel around the model racetrack based on the randomly determined outcome of the simulated horse race; and rendering a progressive bonus game display window on each selected eligible gaming station upon determining the progressive bonus chance virtual horse matches the winning virtual horse of the randomly determined outcome of the simulated horse race.

9. The method of claim 8, including the one or more processors performing the algorithm including the steps of:

randomly selecting the progressive bonus chance virtual horse before randomly determining the outcome of the simulated horse race.

10. The method of claim 8, including the one or more processors performing the algorithm including the steps of:

initiating a progressive bonus game at the selected eligible gaming stations including:

prior to displaying the race video, randomly determining a placement order of each virtual horse in the simulated horse race; and providing a progressive award based on the placement order of each virtual horse determined in the progressive bonus game and a result of the simulated horse race.

11. The method of claim 10, including the one or more processors performing the algorithm including the steps of initiating the progressive bonus game upon receiving a qualifying wager via the selected eligible gaming stations.

12. The method of claim 10, including the one or more processors performing the algorithm including the steps of randomly determining whether to initiate the progressive bonus game.

13. The method of claim 10, including the one or more processors performing the algorithm including the steps of:

initiating the progressive bonus game at the selected eligible gaming stations by:

prior to displaying the race video, randomly determining a placement order of each virtual horse in the simulated horse race for each of the selected eligible gaming stations such that at least one selected eligible gaming station is associated with a different placement order.

14. The method of claim 8, including the one or more processors performing the algorithm including the steps of executing a plurality of simulated horse races, each simulated horse race including a different group of virtual horses.

15. A non-transitory computer-readable storage media having computer-executable instructions embodied thereon to operate a gaming system including a center display configured to display video images of a simulated horse race including a plurality of virtual horses, a center field unit including a model racetrack and a plurality of horse race models configured to travel along the model racetrack, a plurality of gaming stations positioned adjacent the center field unit with each gaming station including a cabinet, a display unit mounted to the cabinet, and a control panel mounted to the cabinet, and a center control unit including one or more processors operably coupled to the center display, the center field unit, and to each of the gaming stations, when executed by the one or more processors the computer-executable instructions cause the one or more processors to perform an algorithm including the steps of:

executing the simulated horse race by:

rendering a race screen on the display unit of each gaming station displaying images of each virtual horse included in the simulated horse race;

randomly determining an outcome of the simulated horse race from a plurality of potential race outcomes including a winning virtual horse;

randomly selecting one or more eligible gaming stations for a progressive bonus game from the plurality of gaming stations;

randomly selecting a progressive bonus chance virtual horse from the plurality of virtual horses and assign the randomly selected progressive bonus chance virtual horse to each selected eligible gaming station;

modifying a corresponding race screen associated with each selected eligible gaming station to display a progressive bonus chance symbol overlayed onto a corresponding image of the progressive bonus chance virtual horse;

generating a race video associated with the randomly determined outcome of the simulated horse race;

simultaneously displaying the race video on the center display and on the display unit of each gaming station;

operating each of the horse race models to travel around the model racetrack based on the randomly determined outcome of the simulated horse race; and rendering a progressive bonus game display window on each selected eligible gaming station upon determining the progressive bonus chance virtual horse matches the winning virtual horse of the randomly determined outcome of the simulated horse race.

16. The non-transitory computer-readable storage media of claim 15, wherein the computer-executable instructions cause the one or more processors to perform the algorithm including the steps of:

randomly selecting the progressive bonus chance virtual horse before randomly determining the outcome of the simulated horse race.

17. The non-transitory computer-readable storage media of claim 15, wherein the computer-executable instructions cause the one or more processors to perform the algorithm including the steps of:

initiating a progressive bonus game at the selected eligible gaming stations including:

prior to displaying the race video, randomly determining a placement order of each virtual horse in the simulated horse race; and providing a progressive award based on the placement order of each virtual horse determined in the progressive bonus game and a result of the simulated horse race.

18. The non-transitory computer-readable storage media of claim 17, wherein the computer-executable instructions cause the one or more processors to perform the algorithm including the steps of initiating the progressive bonus game upon receiving a qualifying wager via the selected eligible gaming stations.

19. The non-transitory computer-readable storage media of claim 17, wherein the computer-executable instructions cause the one or more processors to perform the algorithm including the steps of randomly determining whether to initiate the progressive bonus game.

20. The non-transitory computer-readable storage media of claim 17, wherein the computer-executable instructions cause the one or more processors to perform the algorithm including the steps of:

initiating the progressive bonus game at the selected eligible gaming stations by:

prior to displaying the race video, randomly determining a placement order of each virtual horse in the simulated horse race for each of the selected eligible gaming stations such that at least one selected eligible gaming station is associated with a different placement order.

* * * * *